United States Patent
Kawakami et al.

(10) Patent No.: US 11,545,655 B2
(45) Date of Patent: Jan. 3, 2023

(54) STORAGE BATTERY ELECTRODE, MANUFACTURING METHOD THEREOF, STORAGE BATTERY, AND ELECTRONIC DEVICE

(71) Applicant: Semiconductor Energy Laboratory Co., Ltd., Atsugi (JP)

(72) Inventors: Takahiro Kawakami, Atsugi (JP); Yohei Momma, Isehara (JP); Teruaki Ochiai, Atsugi (JP); Tatsuya Ikenuma, Kakegawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 144 days.

(21) Appl. No.: 17/171,042

(22) Filed: Feb. 9, 2021

(65) Prior Publication Data
US 2021/0167353 A1 Jun. 3, 2021

Related U.S. Application Data

(60) Continuation of application No. 16/521,650, filed on Jul. 25, 2019, now Pat. No. 10,923,706, which is a
(Continued)

(30) Foreign Application Priority Data

Jan. 9, 2015 (JP) .................................. 2015-003178

(51) Int. Cl.
*H01M 4/04* (2006.01)
*H01M 4/13* (2010.01)
(Continued)

(52) U.S. Cl.
CPC ....... *H01M 4/0404* (2013.01); *H01M 4/0471* (2013.01); *H01M 4/13* (2013.01);
(Continued)

(58) Field of Classification Search
CPC .... H01M 4/0404; H01M 4/0471; H01M 4/13; H01M 4/139; H01M 4/625
See application file for complete search history.

(56) References Cited

U.S. PATENT DOCUMENTS 7,303,840 B2 12/2007 Thackeray et al.
7,635,536 B2 12/2009 Johnson et al.
(Continued)

FOREIGN PATENT DOCUMENTS

CA 2893574 7/2014
CN 102163739 A 8/2011
(Continued)

OTHER PUBLICATIONS

International Search Report (Application No. PCT/IB2015/059993) dated Apr. 19, 2016.
(Continued)

*Primary Examiner* — Matthew J Merkling
(74) *Attorney, Agent, or Firm* — Robinson Intellectual Property Law Office; Eric J. Robinson

(57) ABSTRACT

In manufacturing a storage battery electrode, a method for manufacturing a storage battery electrode with high capacity and stability is provided.
As a method for preventing a mixture for forming an active material layer from becoming strongly basic, a first aqueous solution is formed by mixing an active material exhibiting basicity with an aqueous solution exhibiting acidity and including an oxidized derivative of a first conductive additive; a first mixture is formed by reducing the oxidized derivative of the first conductive additive by drying the first aqueous solution; a second mixture is formed by mixing a second conductive additive and a binder; a third mixture is formed by mixing the first mixture and the second mixture; and a current collector is coated with the third mixture. The
(Continued)

strong basicity of the mixture for forming an active material layer is lowered; thus, the binder can be prevented from becoming gelled.

10 Claims, 37 Drawing Sheets

Related U.S. Application Data division of application No. 15/538,049, filed as application No. PCT/IB2015/059993 on Dec. 25, 2015, now Pat. No. 10,367,188.

(51) Int. Cl.
  *H01M 4/62* (2006.01)
  *H01M 4/139* (2010.01)

(52) U.S. Cl.
  CPC ........... *H01M 4/139* (2013.01); *H01M 4/625* (2013.01); *H01M 2220/30* (2013.01)

(56) References Cited

U.S. PATENT DOCUMENTS

| | | |
|---|---|---|
| 7,790,308 B2 | 9/2010 | Johnson et al. |
| 7,892,679 B2 | 2/2011 | Shimizu et al. |
| 8,080,340 B2 | 12/2011 | Thackeray et al. |
| 8,877,381 B2 | 11/2014 | Yasuda et al. |
| 9,225,003 B2 | 12/2015 | Yukawa |
| 9,385,366 B2 | 7/2016 | Yamakaji et al. |
| 9,478,807 B2 | 10/2016 | Yukawa |
| 9,490,472 B2 | 11/2016 | Nanba et al. |
| 9,666,326 B2 | 5/2017 | Kawakami et al. |
| 9,672,951 B2 | 6/2017 | Hu et al. |
| 9,774,034 B2 | 9/2017 | Kawakami et al. |
| 10,347,905 B2 | 7/2019 | Nanba et al. |
| 10,374,223 B2 | 8/2019 | Tamaki et al. |
| 2009/0011335 A1 | 1/2009 | Takeda et al. |
| 2011/0076564 A1 | 3/2011 | Yu et al. |
| 2011/0200879 A1 | 8/2011 | Saito et al. |
| 2012/0088151 A1 | 4/2012 | Yamazaki et al. |
| 2012/0088156 A1 | 4/2012 | Nomoto et al. |
| 2012/0308891 A1 | 12/2012 | Todoriki et al. |
| 2012/0315550 A1 | 12/2012 | Liu et al. |
| 2013/0164619 A1 | 6/2013 | Yamakaji et al. |
| 2013/0202953 A1 | 8/2013 | Sharma et al. |
| 2013/0230709 A1 | 9/2013 | Zhou et al. |
| 2013/0337320 A1 | 12/2013 | Yukawa |
| 2014/0295068 A1* | 10/2014 | Nanba .................. H01M 4/139 427/122 |
| 2014/0315091 A1 | 10/2014 | Yamazaki et al. |
| 2015/0014581 A1 | 1/2015 | Kawakami et al. |
| 2015/0099178 A1 | 4/2015 | Kawakami et al. |
| 2015/0099179 A1 | 4/2015 | Ikenuma et al. |
| 2015/0311569 A1 | 10/2015 | Yu et al. |
| 2015/0325855 A1 | 11/2015 | Kawakami et al. |
| 2015/0333319 A1 | 11/2015 | Kawamura et al. |
| 2015/0333320 A1 | 11/2015 | Tamaki et al. |
| 2016/0118658 A1 | 4/2016 | Kawakami et al. |
| 2016/0118666 A1 | 4/2016 | Ikenuma et al. |
| 2016/0308200 A1 | 10/2016 | Yamakaji et al. |
| 2017/0040590 A1 | 2/2017 | Yukawa |
| 2017/0092929 A1 | 3/2017 | Momma et al. |
| 2018/0047985 A1 | 2/2018 | Duan et al. |
| 2018/0198130 A1 | 7/2018 | Ikenuma et al. |
| 2018/0287160 A1 | 10/2018 | Yamakaji et al. |
| 2018/0366726 A1 | 12/2018 | Kawakami et al. |

FOREIGN PATENT DOCUMENTS

| | | |
|---|---|---|
| CN | 102917981 A | 2/2013 |
| CN | 103155236 A | 6/2013 |
| CN | 103180243 A | 6/2013 |
| CN | 103582968 A | 2/2014 |
| CN | 104078651 A | 10/2014 |
| CN | 103180243 B | 5/2015 |
| CN | 104937755 A | 9/2015 |
| CN | 104937756 A | 9/2015 |
| EP | 2511973 A | 10/2012 |
| EP | 2569249 A | 3/2013 |
| EP | 2660198 A | 11/2013 |
| EP | 2950373 A | 12/2015 |
| EP | 2950374 A | 12/2015 |
| JP | 11-025983 A | 1/1999 |
| JP | 2002-110162 A | 4/2002 |
| JP | 2007-200865 A | 8/2007 |
| JP | 2008-511960 | 4/2008 |
| JP | 2011-170994 A | 9/2011 |
| JP | 2012-099467 A | 5/2012 |
| JP | 2012-099468 A | 5/2012 |
| JP | 2012-169217 A | 9/2012 |
| JP | 2013-513904 | 4/2013 |
| JP | 2013-101978 A | 5/2013 |
| JP | 2013-152926 A | 8/2013 |
| JP | 2013-214482 A | 10/2013 |
| JP | 2013-538933 | 10/2013 |
| JP | 2013-246936 A | 12/2013 |
| JP | 2014-007141 A | 1/2014 |
| JP | 2014-507365 | 3/2014 |
| JP | 2014-063724 A | 4/2014 |
| JP | 2014-143038 A | 8/2014 |
| JP | 2014-179176 A | 9/2014 |
| JP | 2014-199793 A | 10/2014 |
| JP | 2014-209472 A | 11/2014 |
| JP | 2014-225445 A | 12/2014 |
| KR | 2013-0106772 A | 9/2013 |
| KR | 2014-0044821 A | 4/2014 |
| KR | 2015-0108377 A | 9/2015 |
| KR | 2015-0108378 A | 9/2015 |
| KR | 2015-0143664 A | 12/2015 |
| KR | 101693930 B1 * | 1/2017 |
| TW | 201230477 | 7/2012 |
| TW | 201444157 | 11/2014 |
| WO | WO-2006/028476 | 3/2006 |
| WO | WO-2011/111364 | 9/2011 |
| WO | WO-2011/141486 | 11/2011 |
| WO | WO-2012/046669 | 4/2012 |
| WO | WO-2012/088683 | 7/2012 |
| WO | WO-2012/124242 | 9/2012 |
| WO | WO-2012/132387 | 10/2012 |
| WO | WO-2012/165358 | 12/2012 |
| WO | WO-2013/170720 | 11/2013 |
| WO | WO-2014/115669 | 7/2014 |
| WO | WO-2014/115670 | 7/2014 |
| WO | WO-2014/171337 | 10/2014 |

OTHER PUBLICATIONS

Written Opinion (Application No. PCT/IB2017/053050) dated Jul. 4, 2017.

McCalla.E et al., "The spinel and cubic rocksalt solid-solutions in the Li—Mn—Ni oxide pseudo-ternary system", Solid State Ionics, May 2, 2013, vol. 242, pp. 1-9, Elsevier.

Wang.Z et al., "EELS analysis of cation valence states and oxygen vacancies in magnetic oxides", Micron, Oct. 1, 2000, vol. 31, No. 5, pp. 571-580, Elsevier.

Tan.H et al., "Oxidation state and chemical shift investigation in transition metal oxides by EELS", Ultramicroscopy, May 1, 2012, vol. 116, pp. 24-33, Elsevier.

Chinese Office Action (Application No. 201580072397.8) dated Jan. 2, 2020.

* cited by examiner

STORAGE BATTERY ELECTRODE, MANUFACTURING METHOD THEREOF, STORAGE BATTERY, AND ELECTRONIC DEVICE

TECHNICAL FIELD

One embodiment of the present invention relates to a storage battery electrode, a manufacturing method thereof, a storage battery, and an electronic device.

Note that one embodiment of the present invention is not limited to the above technical field. One embodiment of the invention disclosed in this specification and the like relates to an object, a method, or a manufacturing method. One embodiment of the present invention relates to a process, a machine, manufacture, or a composition (a composition of matter). Therefore, specific examples of the technical field of one embodiment of the present invention disclosed in this specification include a semiconductor device, a display device, a light-emitting device, a power storage device, a memory device, a method for driving any of them, and a method for manufacturing any of them.

BACKGROUND ART

With the recent rapid spread of portable electronic devices such as mobile phones, smartphones, electronic book readers (e-book), and portable game machines, secondary batteries for drive power sources have been increasingly required to have smaller size and higher capacity. Nonaqueous secondary batteries typified by lithium-ion secondary batteries, which have advantages such as high energy density and high capacity, have been widely used as secondary batteries for portable electronic devices.

A lithium-ion secondary battery, which is one of nonaqueous secondary batteries and widely used because of its high energy density, includes a positive electrode containing an active material such as lithium cobalt oxide ($LiCoO_2$) or lithium iron phosphate ($LiFePO_4$), a negative electrode containing an active material such as graphite capable of receiving and releasing lithium ions, a nonaqueous electrolytic solution in which an electrolyte formed of a lithium salt such as $LiBF_4$ or $LiPF_6$ is dissolved in an organic solvent such as ethylene carbonate or diethyl carbonate, and the like. The lithium-ion secondary battery is charged and discharged in such a way that lithium ions in the secondary battery move between the positive electrode and the negative electrode through the nonaqueous electrolytic solution and inserted into or extracted from the active materials of the positive electrode and the negative electrode.

A binder is mixed into the positive electrode or the negative electrode in order that active materials can be bound to each other and an active material layer and a current collector can be bound. Since the binder is generally an organic high molecular compound such as polyvinylidene fluoride (PVdF) which has an insulating property, the electrical conductivity thereof is extremely low. Thus, as the proportion of the binder to the active material is increased, the proportion of the active material in the electrode is relatively decreased, resulting in lower discharge capacity of the secondary battery.

Hence, by mixture of a conductive additive such as acetylene black (AB) or graphite particles, the electrical conductivity between active materials or between an active material layer and a current collector is improved. Thus, an active material layer with high electrical conductivity can be provided (see Patent Document 1).

An electrode containing graphene as a conductive additive has been developed. Patent Document 2 discloses an electrode manufacturing method including a step of mixing graphene oxide (also referred to as GO (short for Graphene Oxide)), an active material, and a binder and then reducing GO. By this manufacturing method, an active material layer having high electrical conductivity only with a small amount of the conductive additive can be provided.

PRIOR ART DOCUMENTS

Patent Documents

[Patent Document 1] Japanese Published Patent Application No. 2002-110162
[Patent Document 2] Japanese Published Patent Application No. 2014-7141

DISCLOSURE OF INVENTION

Problem to be Solved by Invention

To improve the performance of a storage battery, a method for manufacturing an electrode with a sufficient capacity is required to be developed. It is also required to simplify a method for manufacturing an electrode to facilitate mass production of storage batteries.

An object of one embodiment of the present invention is to provide a method for manufacturing a storage battery electrode including an electrode with high capacity and stability.

Another object of one embodiment of the present invention is to simplify a manufacturing method of a storage battery.

Another object of one embodiment of the present invention is to provide a storage battery electrode with a uniform thickness. Another object of one embodiment of the present invention is to provide a storage battery electrode and a storage battery with high strength.

Another object of one embodiment of the present invention is to provide a novel electrode, a novel storage battery, a novel manufacturing method of an electrode, or the like. Note that the descriptions of these objects do not preclude the existence of other objects. Note that in one embodiment of the present invention, there is no need to achieve all the objects. One embodiment of the present invention achieves at least one of the above objects. Note that other objects will be apparent from the descriptions of the specification, the drawings, the claims, and the like, and other objects can be derived from the descriptions of the specification, the drawings, the claims, and the like.

Means to Solve Problem

One embodiment of the present invention is a method for manufacturing a storage battery electrode including first to fourth steps, and the method for manufacturing a storage battery electrode is characterized in that the first step includes a step of forming a first aqueous solution by mixing an active material with an aqueous solution including an oxidized derivative of a first conductive additive; the second step includes a step of forming a first mixture by reducing the oxidized derivative of the first conductive additive by drying the first aqueous solution; the third step includes a step of forming a second mixture by mixing a second conductive additive and a binder; the fourth step includes a step of forming a third mixture by mixing the first mixture and the second mixture; and a fifth step includes a step of coating a current collector with the third mixture.

Another embodiment of the present invention is a method for manufacturing a storage battery electrode including first to fourth steps, and the method for manufacturing a storage battery electrode is characterized in that the first step includes a step of forming a first aqueous solution by mixing an active material with an aqueous solution including an oxidized derivative of a first conductive additive; the second step includes a step of forming a first mixture by drying the aqueous solution; the third step includes a step of forming a second mixture by mixing a second conductive additive and a binder and reducing the oxidized derivative of the first conductive additive; the fourth step includes a step of forming a third mixture by mixing the first mixture and the second mixture; and a fifth step includes a step of coating a current collector with the third mixture.

Another embodiment of the present invention is a method for manufacturing a storage battery electrode including first to fourth steps, and the method for manufacturing a storage battery electrode is characterized in that the first step includes a step of forming a first aqueous solution by mixing an active material with an aqueous solution including an oxidized derivative of a first conductive additive; the second step includes a step of forming a first mixture by drying the aqueous solution; the third step includes a step of forming a second mixture by mixing a second conductive additive and a binder; the fourth step includes a step of forming a third mixture by mixing the first mixture and the second mixture; and a fifth step includes a step of coating a current collector with the third mixture and reducing the oxidized derivative of the first conductive additive.

Another embodiment of the present invention is a method for manufacturing a storage battery electrode which is characterized in that the aqueous solution including the oxidized derivative of the first conductive additive is acidic.

Another embodiment of the present invention is a method for manufacturing a storage battery electrode which is characterized in that the active material is basic.

Another embodiment of the present invention is a storage battery electrode manufactured by the method of each of the above-described constitutions.

Another embodiment of the present invention is a storage battery electrode including a current collector and an active material layer, and the active material layer contains an active material, a conductive additive containing graphene, a binder, and a reducing agent.

Another embodiment of the present invention is a storage battery electrode including a current collector and an active material layer, and the active material layer contains an active material, a conductive additive containing graphene, a binder, and an oxidized derivative of a reducing agent.

Another embodiment of the present invention is a storage battery including a first electrode and a second electrode; the first electrode is any one of the above storage battery electrodes; the first electrode has a function of operating as one of a positive electrode and a negative electrode; and the second electrode has a function of operating as the other of the positive electrode and the negative electrode.

Another embodiment of the present invention is an electronic device including the above-described storage battery and a display panel, a light source, an operation key, a speaker, or a microphone.

Effect of Invention

According to one embodiment of the present invention, a method for manufacturing a storage battery electrode including an electrode with high capacity and stability can be provided.

According to one embodiment of the present invention, a method for manufacturing a storage battery can be simplified.

According to one embodiment of the present invention, a mixture for forming an active material layer can be prevented from becoming strongly basic. According to one embodiment of the present invention, an active material can be prevented from aggregating in an active material layer. According to one embodiment of the present invention, a binder can be prevented from becoming gelled. Owing to the above-described effect, one embodiment of the present invention can provide an electrode including an active material layer with a uniform thickness. In addition, one embodiment of the present invention can provide an electrode and a storage battery with high strength.

According to one embodiment of the present invention, a novel electrode, a novel storage battery, a novel method for manufacturing an electrode, or the like can be provided. Note that the descriptions of these effects do not preclude the existence of other effects. Note that one embodiment of the present invention does not necessarily have all the effects. Note that other effects will be apparent from the descriptions of the specification, the drawings, the claims, and the like, and other effects can be derived from the descriptions of the specification, the drawings, the claims, and the like.

BRIEF DESCRIPTION OF DRAWINGS

FIGS. 21A-21D A perspective view, a top view, and cross-sectional views illustrating a structure example of a secondary battery.

FIGS. 24A-1-24B-2 Diagrams for illustrating examples of power storage systems.

MODE FOR CARRYING OUT THE INVENTION

Figure 1:
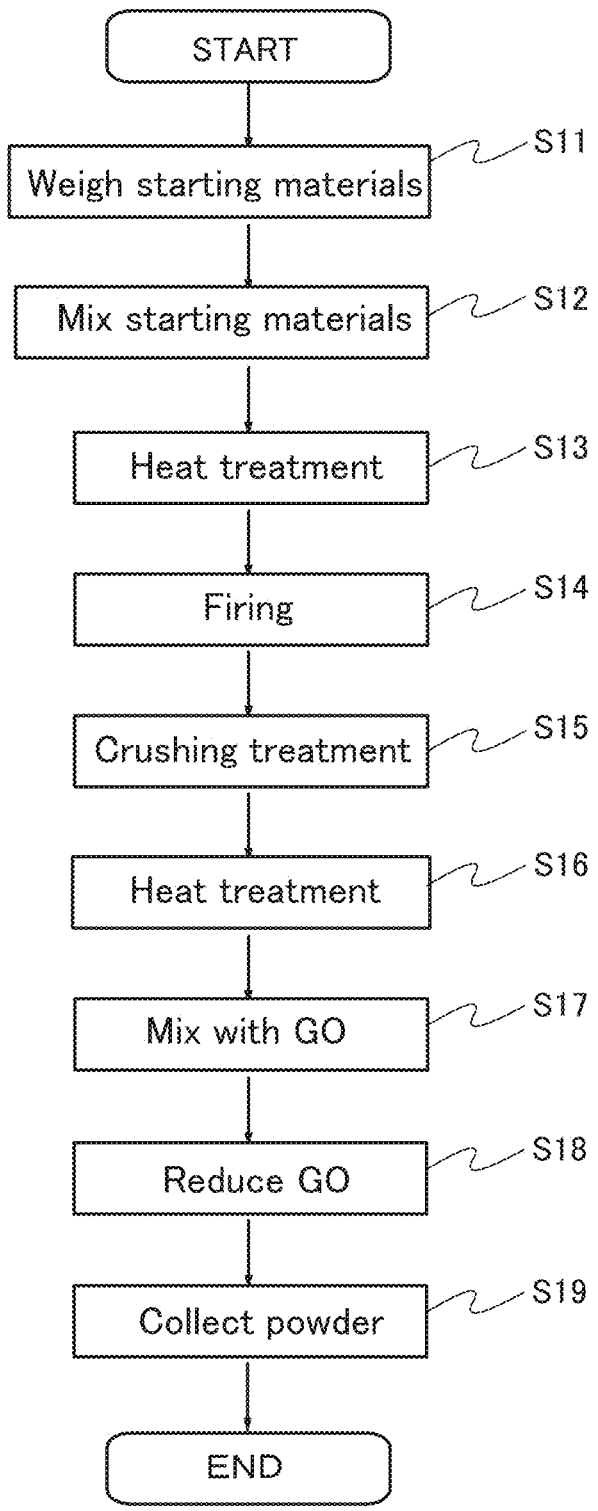
FIG. 1 A flow chart illustrating a method for manufacturing an active material.

Embodiments will be hereinafter described with reference to drawings. Note that the embodiments can be implemented in many different modes, and it will be readily appreciated by those skilled in the art that modes and details thereof can be changed in various ways without departing from the spirit and scope thereof. Therefore, the present invention should not be interpreted as being limited to the description in the following embodiments.

Note that in the structures of the invention described below, the same portions or portions having similar functions are denoted by the same reference numerals in different drawings, and repetitive description thereof is omitted. Furthermore, the same hatch pattern is applied to similar functions, and these are not especially denoted by reference numerals in some cases.

Note that in each drawing described in this specification, the size of each component, such as the thickness of a film, a layer, a substrate, or the like or the size of a region is individually exaggerated for clarity of explanation in some cases. Therefore, each component is not necessarily limited to that size and not necessarily limited to a relative size between the components.

Note that ordinal numbers such as first and second in this specification and the like are used for convenience and do not denote the order of steps, the stacking order of layers, and the like. Therefore, for example, "first" can be replaced with "second," "third," or the like in the description as appropriate. In addition, the ordinal numbers described in this specification and the like are not necessarily the same as the ordinal numbers used to specify one embodiment of the present invention.

Figure 2:
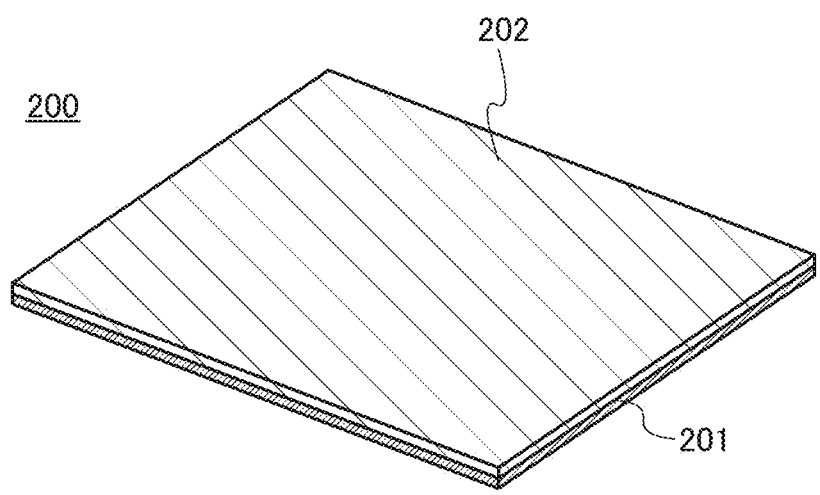
FIG. 2 A perspective view of a storage battery electrode.

(Embodiment 1) In this embodiment, a storage battery electrode of one embodiment of the present invention will be described with reference to FIG. 2 and FIG. 3. FIG. 2 illustrates a perspective view of an electrode, and FIGS. 3(A) and (B) illustrate cross-sectional views of an active material.

FIG. 2 is a perspective view of an electrode 200. Although the electrode 200 in the shape of a rectangular sheet is illustrated in FIG. 2, the shape of the electrode 200 is not limited thereto, and any shape can be selected as appropriate. An active material layer 202 is formed on only one side of a current collector 201 in FIG. 2; however, the active material layer 202 may be formed on both sides of the current collector 201. The active material layer 202 does not necessarily need to be formed over the entire surface of the current collector 201, and a region that is not coated, such as a region for connection to a tab, is provided as appropriate.

For the current collector 201, a highly conductive material that is not alloyed with a carrier ion of lithium or the like, for example, a metal such as stainless steel, gold, platinum, zinc, iron, copper, aluminum, and titanium or an alloy thereof can be used. Alternatively, an aluminum alloy to which an element which improves heat resistance, such as silicon, titanium, neodymium, scandium, and molybdenum, is added can be used. Further alternatively, it may be formed with a metal element which forms silicide by reacting with silicon. Examples of the metal element which forms silicide by reacting with silicon include zirconium, titanium, hafnium, vanadium, niobium, tantalum, chromium, molybdenum, tungsten, cobalt, nickel, and the like. The current collector 201 can have a foil-like, plate-like (sheet-like), net-like, punching-metal, or expanded-metal shape or the like as appropriate. The current collector 201 preferably has a thickness greater than or equal to 10 μm and less than or equal to 30 μm. A surface of the current collector 201 may be provided with an undercoat layer using graphite or the like.

Figure 3A:
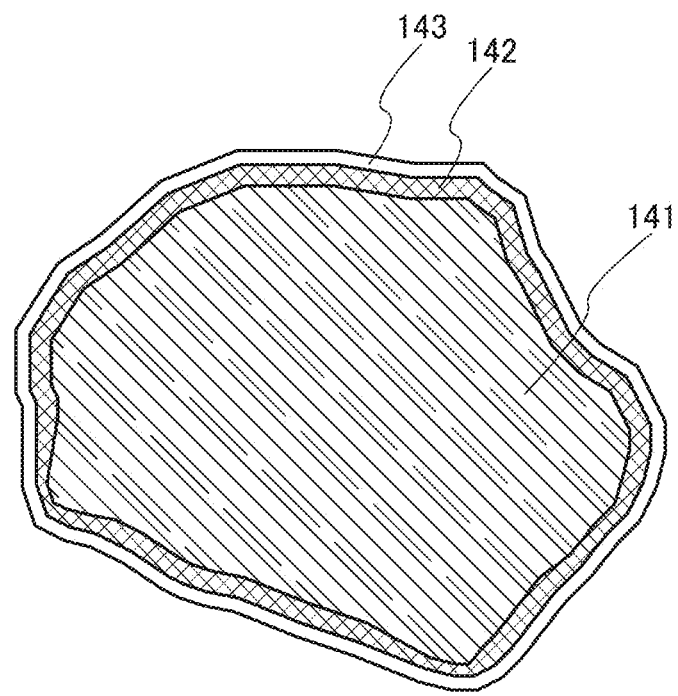
FIGS. 3A-3B Diagrams illustrating cross sections of an active material.

FIGS. 3(A) and (B) are schematic cross-sectional views of an active material particle included in the active material layer 202 of the electrode 200.

Graphene is formed in a third region 143 which covers the active material around the outer circumference of the active material. As illustrated, the active material may include two regions of a first region 141 and a second region 142. The graphene may be formed on the whole surface of the lithium-manganese complex oxide or may be provided partly. The graphene is preferably formed so as to cover an exposed cleavage plane of a particle. The graphene is provided on at least part of a cleavage plane of the lithium-manganese complex oxide. When the active material in which at least part of the cleavage plane is covered with graphene is used for an electrode, a decrease in the voltage and a decrease in discharge capacity of a battery can be prevented. Accordingly, the charge-discharge cycle characteristics of the battery can be improved.

Graphene has excellent electrical characteristics of high conductivity and excellent physical properties of high flexibility and mechanical strength. For this reason, with the use of an electrode containing the active material in a battery, a lithium-manganese complex oxide can be prevented from being further cleaved and cracked because of the volume change even when the lithium-manganese complex oxide repeats expansion and contraction accompanying repeated charging and discharging of the battery.

An active material layer includes a plurality of active materials. The plurality of active materials are in contact with each other, so that an electric conduction path is formed. As for the contact state, graphenes formed to cover surfaces of adjacent active materials may be in contact with each other. Alternatively, a portion of an active material where graphene is not formed is in contact with a portion of another active material where graphene is formed in some cases; portions of surfaces of active materials where graphene is not formed are in contact with each other in other cases. When an active material layer is formed by a plurality of active materials, contact between the plurality of active material particles allows contact between graphenes over surfaces of the active material particles; thus, a three-dimensional electric conduction path is formed, which enables conductivity of the active material layer to be ensured.

In a method for manufacturing a storage battery electrode to be described in Embodiment 2, graphene is formed by reduction of graphene oxide with a reducing agent. Note that since an active material, graphene oxide, and a reducing agent are mixed in the method for manufacturing a storage battery electrode, the reducing agent may remain in the active material layer 202. In addition, the reducing agent is oxidized at the time when the graphene oxide is reduced. Thus, the active material layer 202 may include a derivative generated when the reducing agent is oxidized (hereinafter called an oxidized derivative of a reducing agent).

The existence of the reducing agent or the oxidized derivative of the reducing agent in the active material layer 202 can be detected by an analytical means such as EDX (energy dispersive X-ray spectrometry) analysis, XPS (X-ray photoelectron spectroscopy), or ToF-SIMS (Time-of-flight secondary ion mass spectrometry).

As the reducing agent, ascorbic acid, hydrazine, dimethyl hydrazine, hydroquinone, sodium borohydride ($NaBH_4$), tetrabutylammonium bromide (TBAB), lithium aluminum hydride ($LiAlH_4$), ethylene glycol, polyethylene glycol, or N,N-diethylhydroxylamine, or a derivative thereof can be used. In particular, ascorbic acid and hydroquinone are preferable to hydrazine and sodium borohydride in that they are safe due to low reducing ability and utilized industrially with ease.

The reduction reaction of the graphene oxide makes the reducing agent to be the oxidized derivative of the reducing agent. Here, a redox reaction of ascorbic acid is described as an example. Ascorbic acid becomes dehydroascorbic acid when oxidized. Thus, in the case of using ascorbic acid as the reducing agent, dehydroascorbic acid may remain in the active material layer 202 as the oxidized derivative of the reducing agent. Without limitation to the case where ascorbic acid is used as the reducing agent, the oxidized derivative of the reducing agent may remain in the active material layer 202.

Graphene is a carbon material having a crystal structure in which hexagonal skeletons formed by carbon are spread in a planar form. Graphene is one atomic plane extracted from graphite crystals. Due to its surprisingly excellent electrical, mechanical, or chemical properties, graphene has been expected to be used for a variety of fields of, for example, field-effect transistors with high mobility, highly sensitive sensors, highly efficient solar cells, and next-generation transparent conductive films that utilize graphene, and has attracted attention.

Graphene in this specification includes single-layer graphene or multilayer graphene including two or more and one hundred or less layers. Single-layer graphene refers to a one-atom-thick sheet of carbon molecules having $\pi$ bonds. In addition, graphene oxide refers to an oxidized compound of such graphene. Note that when graphene oxide is reduced to form graphene, oxygen contained in the graphene oxide is not entirely released and part of the oxygen may remain in graphene. With the method for manufacturing a storage battery electrode to be described in Embodiment 2, the reaction efficiency of reduction of the graphene oxide can be increased. Note that in the case where the graphene contains oxygen, the proportion of oxygen, which is measured by XPS, is higher than or equal to 2 atomic % and lower than or equal to 20 atomic %, and preferably higher than or equal to 3 atomic % and lower than or equal to 15 atomic % of the whole graphene.

Graphene oxide can be fabricated by an oxidation method called a Hummers method. In the Hummers method, a sulfuric acid solution of potassium permanganate, a hydrogen peroxide solution, and the like are mixed with graphite powder to cause an oxidation reaction; thus, a mixed solution containing graphite oxide is fabricated. Through the oxidation of carbon of graphite, functional groups such as epoxy groups, carbonyl groups, carboxyl groups, or hydroxyl groups are bonded in graphite oxide. Accordingly, the interlayer distance between a plurality of graphenes becomes longer than that in graphite, so that thin pieces can be easily made by interlayer separation. Then, ultrasonic vibration is applied to the mixed solution containing graphite oxide, so that graphite oxide whose interlayer distance is long can be cleaved to separate graphene oxide and to fabricate a mixed solution containing graphene oxide. A solvent is then removed from the mixed solution containing graphene oxide, so that graphene oxide powder can be obtained.

The graphene oxide may be formed by adjusting the amount of an oxidizing agent such as potassium permanganate as appropriate. When the amount of the oxidizing agent with respect to the graphite powder is increased, for example, the degree of oxidation of the graphene oxide (the weight ratio of oxygen to carbon) can be increased. Therefore, the amount of the oxidizing agent with respect to the graphite powder, which is a raw material, can be determined depending on the amount of graphene oxide to be manufactured.

Note that fabrication of graphene oxide is not limited to the Hummers method using a sulfuric acid solution of potassium permanganate; for example, the Hummers method using nitric acid, potassium chlorate, nitric acid sodium, or the like or a method for fabricating graphene oxide other than the Hummers method may be employed as appropriate.

Thin pieces of the graphite oxide may be made by application of ultrasonic vibration, by irradiation with microwaves, radio waves, or thermal plasma, or by application of physical stress.

The fabricated graphene oxide includes an epoxy group, a carbonyl group, a carboxyl group, a hydroxyl group, or the like. In the graphene oxide, oxygen in a functional group is negatively charged in a polar solvent typified by NMP; therefore, while interacting with NMP, the graphene oxide repels with other graphene oxides and is hardly aggregated. For this reason, in a polar solvent, graphene oxide can be easily dispersed uniformly.

Figure 3B:
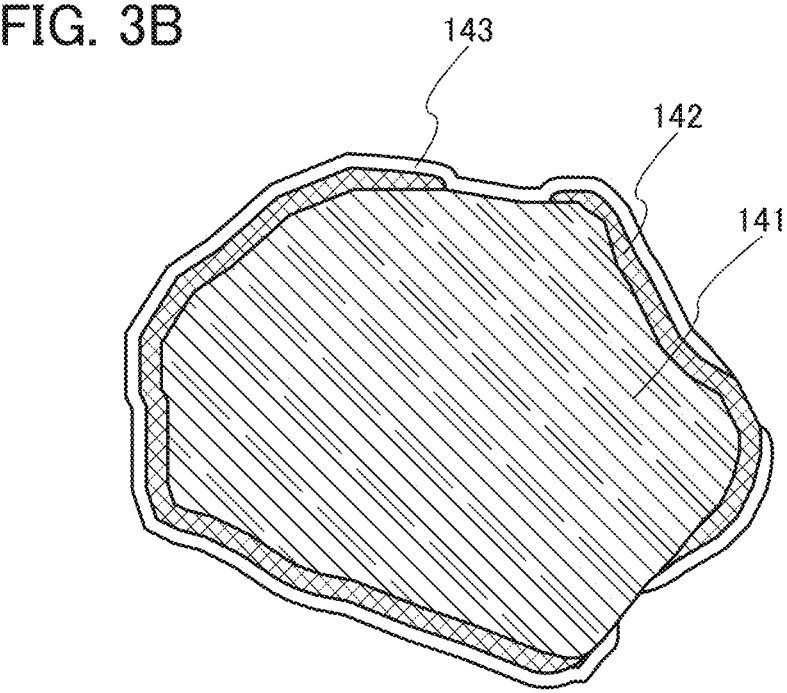

The active material is an active material in the form of particles made of secondary particles having average particle diameter and particle-size distribution, which is obtained in such a way that material compounds are mixed at a predetermined ratio and fired and the resulting fired product is ground, granulated, and classified by an appropriate means. Therefore, although the active material is schematically illustrated in FIG. 3(A) and FIG. 3(B), the shape thereof is not limited to these shapes.

In the case of using the electrode 200 as a positive electrode of a storage battery, a material into and from which lithium ions can be inserted and extracted can be used for the active material. As an example, a lithium-manganese-containing complex oxide with an olivine crystal structure, a layered rock-salt crystal structure, or a spinel crystal structure can be given.

As an example of a lithium-containing complex phosphate with an olivine structure, a general formula $LiMPO_4$ (M is one or more of Fe(II), Mn(II), Co(II), and Ni(II)) can be given. As typical examples of the general formula $LiMPO_4$, $LiFePO_4$, $LiNiPO_4$, $LiCoPO_4$, $LiMnPO_4$, $LiFe_aNi_bPO_4$, $LiFe_aCo_bPO_4$, $LiFe_aMn_bPO_4$, $LiNi_aCo_bPO_4$, $LiNi_aMn_bPO_4$ (a+b≤1, 0<a<1, and 0<b<1), $LiFe_cNi_dCo_ePO_4$, $LiFe_cNi_dMn_ePO_4$, $LiNi_cCo_dMn_ePO_4$ (c+d+e≤1, 0<c<1, 0<d<1, and 0<e<1), and $LiFe_fNi_gCo_hMn_iPO_4$ (f+g+h+i≤1, 0<f<1, 0<g<1, 0<h<1, and 0<i<1) can be given.

$LiFePO_4$ is particularly preferable because it satisfies, in a balanced manner, requirements for the active material, such as safety, stability, high capacity density, high potential, and the existence of lithium ions that can be extracted in initial oxidation (charging).

As examples of a lithium-containing complex oxide with a layered rock-salt crystal structure, $LiCoO_2$, $LiNiO_2$, $LiMnO_2$, $Li_2MnO_3$, a NiCo-based one such as $LiNi_{0.8}Co_{0.2}O_2$ (general formula: $LiNi_xCo_{1-x}O_2$ (0<x<1)), a NiMn-based one such as $LiNi_{0.5}Mn_{0.5}O_2$ (general formula: $LiNi_xMn_{1-x}O_2$ (0<x<1)), and a NiMnCo-based one such as $LiNi_{1/3}Mn_{1/3}Co_{1/3}O_2$ (also referred to as NMC, general formula: $LiNi_xMn_yCo_{1-x-y}O_2$ (x>0, y>0, x+y<1)) can be given. Moreover, $Li(Ni_{0.8}Co_{0.15}Al_{0.05})O_2$, $Li_2MnO_3$—$LiMO_2$ (M=Co, Ni, or Mn), and the like can be given.

$LiCoO_2$ is particularly preferable because of its advantages such as high capacity, higher stability in the air than $LiNiO_2$, and higher thermal stability than $LiNiO_2$.

As examples of a lithium-manganese-containing complex oxide with a spinel crystal structure, $LiMn_2O_4$, $Li_{1+x}Mn_{2-x}O_4$ (0<x<2), $LiMn_{2-x}Al_xO_4$ (0<x<2), $LiMn_{1.5}Ni_{0.5}O_4$, and the like can be given.

It is preferable to mix a small amount of lithium nickel oxide ($LiNiO_2$ or $LiNi_{1-x}M_xO_2$ (M=Co, Al, or the like (0<x<2)) with the lithium-manganese-containing complex oxide with a spinel crystal structure which contains manganese, such as $LiMn_2O_4$, in which case there are advantages in that the dissolution of manganese can be suppressed and the decomposition of an electrolytic solution can be suppressed, for example.

A complex silicate represented by a general formula $Li_{(2-j)}MSiO_4$ (M is one or more of Fe(II), Mn(II), Co(II), and Ni(II), 0≤j≤2) can be used as a positive electrode active material. As typical examples of the general formula $Li_{(2-j)}MSiO_4$, $Li_{(2-j)}FeSiO_4$, $Li_{(2-j)}CoSiO_4$, $Li_{(2-j)}MnSiO_4$, $Li_{(2-j)}Fe_kNi_lSiO_4$, $Li_{(2-j)}Fe_kCo_lSiO_4$, $Li_{(2-j)}Fe_kMn_lSiO_4$, $Li_{(2-j)}Ni_kCo_lSiO_4$, $Li_{(2-j)}Ni_kMn_lSiO_4$ (k+l≤1, 0<k<1, and 0<l<1), $Li_{(2-j)}Fe_mNi_nCo_qSiO_4$, $Li_{(2-j)}Fe_mNi_nMn_qSiO_4$, $Li_{(2-j)}Ni_mCo_nMn_qSiO_4$ (m+n+q≤1, 0<m<1, 0<n<1, and 0<q<1), $Li_{(2-j)}Fe_rNi_sCo_tMn_uSiO_4$ (r+s+t+u≤1, 0<r<1, 0<s<1, 0<t<1, and 0<u<1), and the like can be given.

A nasicon compound represented by a general formula $A_xM_2(XO_4)_3$ (A=Li, Na, or Mg, M=Fe, Mn, Ti, V, Nb, or Al, and X=S, P, Mo, W, As, or Si) can also be used as the positive electrode active material. As the nasicon compound, $Fe_2(MnO_4)_3$, $Fe_2(SO_4)_3$, $Li_3Fe_2(PO_4)_3$, or the like can be given. Alternatively, a material such as a compound represented by a general formula $Li_2MPO_4F$, $Li_2MP_2O_7$, or $Li_5MO_4$ (M=Fe or Mn), a perovskite fluoride such as $FeF_3$, a metal chalcogenide (a sulfide, a selenide, or a telluride) such as $TiS_2$ or $MoS_2$, a lithium-vanadium-containing complex oxide with an inverse spinel structure such as $LiMVO_4$, a vanadium oxide-based one (such as $V_2O_5$, $V_6O_{13}$, or $LiV_3O_8$), a manganese oxide-based one, or an organic sulfur compound can be used as the positive electrode active material.

The particle diameter of the positive electrode active material is preferably, for example, greater than or equal to 5 nm and less than or equal to 100 μm.

As the positive electrode active material, a lithium-manganese complex oxide that can be represented by a composition formula $Li_aMn_bM_cO_d$ can also be used. Here, the element M is preferably a metal element other than lithium and manganese, silicon, or phosphorus, more preferably nickel. Furthermore, in the case where the whole particle of a lithium-manganese complex oxide is measured, it is preferable to satisfy 0<a/(b+c)<2, c>0, and 0.26≤(b+c)/d<0.5 at the time of discharging. Note that the compositions of metal, silicon, phosphorus, and the like in the whole particle of a lithium-manganese complex oxide can be measured with, for example, an ICP-MS (inductively coupled plasma mass spectrometer). The composition of oxygen in the whole particle of a lithium-manganese complex oxide can be measured by, for example, EDX (energy dispersive X-ray spectrometry). Alternatively, it can be measured by ICP-MS analysis combined with fusion gas analysis and valence evaluation of XAFS (X-ray absorption fine structure) analysis. Note that the lithium-manganese complex oxide refers to an oxide containing at least lithium and manganese, and may contain at least one kind of element selected from the group including chromium, cobalt, aluminum, nickel, iron, magnesium, molybdenum, zinc, indium, gallium, copper, titanium, niobium, silicon, phosphorus, and the like.

A manganese compound and a lithium compound can be used as raw materials of the lithium-manganese complex oxide. In addition to raw materials of the manganese compound and the lithium compound, a raw material of a compound containing at least one kind of element selected from the group including chromium, cobalt, aluminum, nickel, iron, magnesium, molybdenum, zinc, indium, gallium, copper, titanium, niobium, silicon, phosphorus, and the like can be used. As the manganese compound, for example, manganese dioxide, dimanganese trioxide, trimanganese tetroxide, manganese oxide hydrate, manganese carbonate, manganese nitrate, or the like can be used. As the lithium compound, for example, lithium hydroxide, lithium carbonate, lithium nitrate, or the like can be used.

A particle containing a lithium-manganese complex oxide may have a first region and a second region. In addition, the particle containing a lithium-manganese complex oxide may have a third region.

The second region is in contact with at least part of the outside of the first region. Here, the outside refers to being closer to a surface of a particle. The third region is preferably in contact with at least part of the outside of the second region.

In the case where the second particle includes a layered region, the thickness thereof, for example, is preferably greater than or equal to 0.1 nm and less than or equal to 30 nm, more preferably greater than or equal to 1 nm and less than or equal to 15 nm.

The first region and the second region contain lithium and oxygen. In addition, at least one of the first region and the second region contains manganese. In addition, in addition, at least one of the first region and the second region contains the element M.

More preferably, the first region and the second region contain both manganese and the element M.

The third region preferably includes a region corresponding to a surface of a particle containing the lithium-manganese complex oxide of one embodiment of the present invention.

In the case where the third particle includes a layered region, the thickness thereof, for example, is preferably greater than or equal to 0.1 nm and less than or equal to 30 nm, more preferably greater than or equal to 1 nm and less than or equal to 20 nm, much more preferably greater than or equal to 2 nm and less than or equal to 10 nm.

FIG. 3(A) illustrates an example in which a particle includes a region 141 as the first region, a region 142 as the second region, and a region 143 as the third region.

As illustrated in FIG. 3(A), at least part of the region 142 is in contact with a surface of the region 141. At least part of the region 143 is in contact with a surface of the region 142.

As illustrated in FIG. 3(B), the region 141 may include a region not covered with the region 142. The region 142 may include a region not covered with the region 143. For example, the region 141 may include a region in contact with the region 143. The region 141 may include a region covered with neither the region 142 nor the region 143.

In the case where a power storage device is fabricated using the particle containing the lithium-manganese complex oxide of one embodiment of the present invention, the third region is preferably more stable than the first region and the second region against a battery reaction, e.g., charging and discharging.

Here, the second region may include a crystal structure different from that of the first region. Alternatively, the second region may include a crystal whose orientation is different from that of the first region.

It is preferable that the second region have a spinel structure and that the first region have a layered rock-salt structure, for example.

Alternatively, it is preferable that the first region and the second region have a layered rock-salt structure and that a first plane of a crystal included in the first region be parallel to a second plane of a crystal included in the second region, for example.

Here, a {0 0 1} plane, which is the first plane of the layered rock-salt structure, is preferably any of at least one of a {1 0 0} plane, a {1 3 −1} plane, and a {−1 3 1} plane of a second crystal. Alternatively, a {1 0 0} plane, which is the first plane of the layered rock-salt structure, is preferably any of at least one of a {0 0 1} plane, a {1 3 −1} plane, and a {−1 3 1} plane of the second crystal. Alternatively, a {1 3 −1} plane, which is the first plane of the layered rock-salt structure, is preferably any of at least one of a {0 0 1} plane, a {1 0 0} plane, and a {−1 3 1} plane of the second crystal. Alternatively, a {−1 3 1} plane, which is the first plane of the layered rock-salt structure, is preferably any of at least one of a {0 0 1} plane, a {1 0 0} plane, and a {1 3 −1} plane of the second crystal.

It is preferable that the first region and the second region have a layered rock-salt structure and that a first orientation of the crystal included in the first region be parallel to a second orientation of the crystal included in the second region, for example. Here, crystal orientations of the crystal included in the first region and the crystal included in the second region will be described.

Here, three crystal orientations of <1 0 0>, <1 1 0>, and <−1 1 0> are referred to as a first group. In addition, <0 0 1>, <0 1 1>, and <0 1 −1> are referred to as a second group. In addition, <−3 2 3>, <3 1 6>, and <6 −1 3> are referred to as a third group. In addition, <3 2 −3>, <3 −1 6>, and <6 1 3> are referred to as a fourth group.

The crystal included in the first region has an orientation selected from one of the first to fourth groups. The crystal included in the second region has an orientation selected from one of three groups other than the group from which the orientation of the crystal included in the first region among the first to fourth groups is selected.

A specific example of the above-described combination will be described below. Description will be made on the (001) plane and the (100) plane. In the following description, indices are written using notation in which the symmetry of a crystal is not taken into consideration in order to be written specifically.

Figure 4:
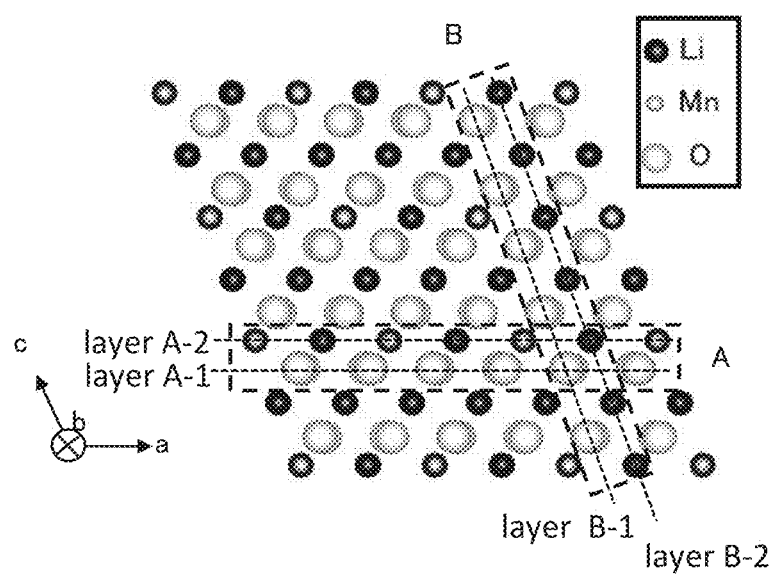
FIG. 4 A diagram illustrating a crystal structure.
Figure 5A:
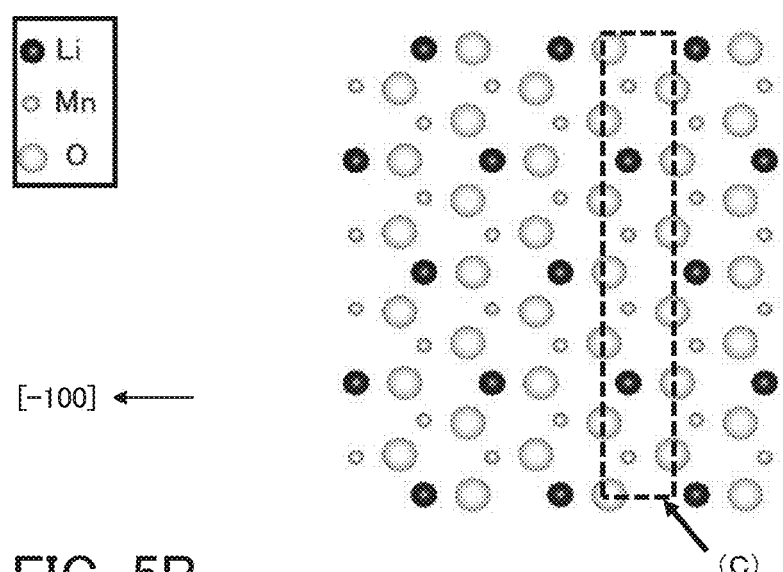
FIGS. 5A-5B Diagrams illustrating a crystal structure.

FIG. 4 illustrates a diagram of a crystal structure of $Li_2MnO_3$ seen in the negative direction of a b-axis. Here, FIG. 5(A) illustrates a diagram of a layer A-1 and a layer A-2 in a region surrounded by dashed line A illustrated in FIG. 4, which are seen from the layer A-2 side in a direction perpendicular to the layer A-1 and the layer A-2. Here, the layer A-1 contains oxygen, and the layer A-2 contains lithium and manganese.

Figure 5B:
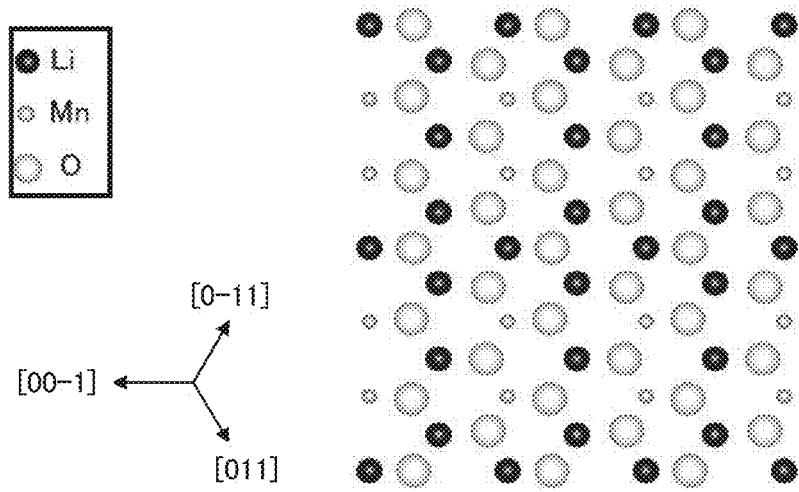

FIG. 5(B) illustrates a layer B-1 and a layer B-2 in a region surrounded by dashed line B shown in FIG. 4, which are seen from the layer B-2 side in a direction perpendicular to the layer B-1 and the layer B-2.

In FIG. 5(A), lithium or manganese is stacked over an oxygen atom and is shifted in a [110] direction, a [−100] direction, or a [1−10] direction. Similarly, in FIG. 5(B), lithium or manganese is stacked over a hexagonal structure formed by oxygen and is shifted in a [0−11] direction, a [00−1] direction, or a [011] direction. When manganese is changed to lithium in a region surrounded by dashed line C in FIG. 5(A), a structure similar to that of FIG. 5(B) is obtained. That is, the positions of metal atoms are approximately the same, though the kinds of the metal atoms are different. Thus, it is probable that the two structures have many common parts and are therefore compatible with each other when stacked.

The second region preferably has a composition different from that of the first region.

For example, the case is described where the composition of the first region and that of the second region are separately measured; the first region contains lithium, manganese, the element M, and oxygen; the second region contains lithium, manganese, the element M, and oxygen; the atomic ratio of lithium to manganese, the element M, and oxygen in the first region is represented by $a1:b1:c1:d1$; and the atomic ratio of lithium to manganese, the element M, and oxygen in the second region is represented by $a2:b2:c2:d2$. Note that the composition of each of the first region and the second region can be measured by, for example, EDX (energy dispersive X-ray spectrometry) using a TEM (transmission electron microscope). In measurement by EDX, the composition of lithium is sometimes difficult to measure. Thus, a difference between the first region and the second region in composition of elements other than lithium is described below. Here, $d1/(b1+c1)$ is preferably greater than or equal to 2.2, further preferably greater than or equal to 2.3, still further preferably greater than or equal to 2.35 and less than or equal to 3. Furthermore, $d2/(b2+c2)$ is preferably less than 2.2, further preferably less than 2.1, still further preferably greater than or equal to 1.1 and less than or equal to 1.9. Also in this case, the composition of the whole particle of the lithium-manganese complex oxide including the first region and the second region preferably satisfies 0.26≤(b+c)/d<0.5 as described above.

The valence of manganese in the second region may be different from that of manganese in the first region. The valence of the element M in the second region may be different from that of the element M in the first region.

Here, in the case where the composition or valences of elements in each region have a spatial distribution, the compositions or valences in a plurality of portions are estimated, the average values thereof are calculated, and are regarded as the compositions or valences of the regions, for example.

A transition layer may be provided between the second region and the first region. Here, the transition layer is a region whose composition changes continuously or gradually, for example. Alternatively, the transition layer is a region whose crystal structure changes continuously or gradually. Alternatively, the transition layer is a region where the lattice constant of a crystal changes continuously or gradually.

Alternatively, a mixed layer may be provided between the second region and the first region. Here, the mixed layer refers to a case in which, for example, two or more crystals having different crystal orientations are mixed. Alternatively, the mixed layer refers to a case in which, for example, two or more crystals having different crystal structures are mixed. Alternatively, the mixed layer refers to a case in which, for example, two or more crystals having different compositions are mixed.

Here, the first region preferably has a layered rock-salt structure. In addition, the second region preferably has at least one of a spinel structure and a layered rock-salt structure.

Here, for example, in the case where a storage battery or the like is fabricated using the "particle containing the lithium-manganese complex oxide" of one embodiment of the present invention, the first region to the third region may be formed in the steps before the fabrication of the storage battery.

For example, the first region to the third region may be formed before the fabrication of the electrode, e.g., after the synthesis of the particle. Alternatively, they may be formed in the process of forming the electrode. The thickness, the composition, the crystal structure, and the like of the first region to the third region which are formed after the synthesis of the particle, for example, may be changed in the process of forming the electrode.

The first region to the third region may be formed in heat treatment in the steps of fabricating the storage battery or the like.

In a process for fabricating the lithium-manganese complex oxide, a crushing treatment step of the lithium-manganese complex oxide in which primary particles are sintered, which is shown in S15 or the like, is an important step that influences the characteristics of a battery. In the crushing treatment step, a shear (grinding stress) is applied to the lithium-manganese complex oxide in which the primary particles are sintered, whereby a powdery lithium-manganese complex oxide is formed. In the case where the lithium-manganese complex oxide has a layered rock-salt crystal structure, a primary particle might be cleaved and cracked at this time along a plane parallel to the layer or a plane perpendicular to the layer. The cleaved and cracked primary particle is called a particle having a cleavage plane or a particle with a cleavage plane exposed, in this specification and the like. Note that some cracked primary particles do not have a cleavage plane.

An active material having a cleavage property, such as the lithium-manganese complex oxide having a layered rock-salt crystal structure might be cracked not only at the time of the crushing treatment but also in the step of fabricating an electrode because a pressure is applied to an active material layer when the electrode is shaped by pressure application.

When a wound battery is manufactured, a great stress is caused at the time of winding an electrode. Even when a wound body of the electrode is stored in a housing, the active material might be further cracked because an outward stress from an axis of winding is caused all the time.

Such cleavage and cracking of the primary particle of the lithium-manganese complex oxide cause a decrease in the discharge capacity and cycle characteristics of a battery.

Also in the above-described case, a layer containing carbon is preferably provided on at least part of a cleavage plane of the lithium-manganese complex oxide. The layer containing carbon may cover the entire cleavage plane or may cover the whole lithium-manganese complex oxide having a cleavage plane.

In one embodiment of the present invention, graphene is formed in the third region 143 which covers the particle. The graphene may be provided on the whole surface of the lithium-manganese complex oxide or may be provided partly. The graphene is preferably formed so as to cover an exposed cleavage plane of a particle. The graphene is provided on at least part of a cleavage plane of the lithium-manganese complex oxide. When the active material in which at least part of the cleavage plane is covered with graphene is used for an electrode, a decrease in the voltage and a decrease in discharge capacity of a battery can be prevented. Accordingly, the charge-discharge cycle characteristics of the battery can be improved.

Graphene has excellent electrical characteristics of high conductivity and excellent physical properties of high flexibility and mechanical strength. For this reason, with the use of an electrode containing the active material in a battery, a lithium-manganese complex oxide can be prevented from being further cleaved and cracked because of the volume change even when the lithium-manganese complex oxide repeats expansion and contraction accompanying repeated charging and discharging of the battery.

In addition, pressure applied to the active material, which is due to pressure applied to the electrode in shaping the electrode in the step of fabricating the electrode, can be alleviated owing to the mechanical strength of graphene. Thus, the active material can be prevented from being further cleaved and cracked.

Moreover, even when a great stress is caused at the time of winding an electrode of a wound battery or even when an outward stress from an axis of winding is applied to the electrode all the time in the case where a wound body of the electrode is stored in a housing, the active material can be prevented from being further cleaved and cracked thereby.

Note that the positive electrode active material containing the lithium-manganese complex oxide exhibits basicity in some cases. When a binder, a conductive additive, and a solvent used in the step of fabricating an electrode are mixed to form a slurry or a paste, gelation of the binder is accelerated by the basicity exhibited by the lithium-manganese complex oxide and the viscosity of the slurry or the paste extremely increases, which makes it difficult to form an electrode in some cases.

In contrast, an aqueous solution of graphene oxide exhibits acidity. Thus, when a lithium-manganese complex oxide is added to an aqueous solution of graphene oxide, an acid-base reaction is caused, and the basicity of the lithium-manganese complex oxide is lowered.

As a result, even when the binder and the conductive additive are added and mixed in a later step, gelation of the slurry or the paste can be suppressed. Thus, the step of adding the lithium-manganese complex oxide to an aqueous solution of graphene oxide in Step S17 is an effective method in stably carrying out the step of fabricating an electrode because it has an effect of widening margins in the later steps of mixing with the binder and the conductive additive and coating of the current collector.

Note that in the case where carrier ions are alkali metal ions other than lithium ions, or alkaline-earth metal ions, instead of lithium in the lithium compound or the lithium-manganese complex oxide, an alkali metal (e.g., sodium or potassium) or an alkaline-earth metal (e.g., calcium, strontium, barium, beryllium, or magnesium) may be used as the positive electrode active material.

In the case where the storage battery electrode to be manufactured is used as a negative electrode of a storage battery, a material that enables charge-discharge reactions by alloying/dealloying reactions with lithium can be used as the active material.

As the material that enables charge-discharge reactions by alloying/dealloying reactions with lithium, a carbon-based material can be given. As the carbon-based material, there is graphite, graphitizing carbon (soft carbon), non-graphitizing carbon (hard carbon), a carbon nanotube, graphene, carbon black, or the like.

As the graphite, there is artificial graphite such as mesocarbon microbeads (MCMB), coke-based artificial graphite, or pitch-based artificial graphite or natural graphite such as spherical natural graphite.

Graphite has a low potential substantially equal to that of a lithium metal (higher than or equal to 0.1 V and lower than or equal to 0.3 V vs. Li/Li$^+$) when lithium ions are intercalated into the graphite (while a lithium-graphite intercalation compound is formed). For this reason, a lithium-ion secondary battery can show a high operating voltage. In addition, graphite is preferable because of its advantages such as relatively high capacity per unit volume, small volume expansion, low cost, and higher safety than a lithium metal.

As the material that enables charge-discharge reactions by alloying/dealloying reactions with lithium, a material containing at least one of Ga, Si, Al, Ge, Sn, Pb, Sb, Bi, Ag, Zn, Cd, In, and the like can also be used, for example. Such elements have higher capacity than carbon. In particular, silicon has a high theoretical capacity of 4200 mAh/g. Examples of the material including such an element include $Mg_2Si$, $Mg_2Ge$, $Mg_2Sn$, $SnS_2$, $V_2Sn_3$, $FeSn_2$, $CoSn_2$, $Ni_3Sn_2$, $Cu_6Sn_5$, $Ag_3Sn$, $Ag_3Sb$, $Ni_2MnSb$, $CeSb_3$, $LaSn_3$, $La_3Co_2Sn_7$, $CoSb_3$, InSb, SbSn, and the like.

As a negative electrode active material, an oxide such as SiO, SnO, $SnO_2$, titanium dioxide, lithium titanium oxide, a lithium-graphite intercalation compound, niobium pentoxide, tungsten oxide, or molybdenum oxide can be used.

Alternatively, as the negative electrode active material, $Li_{3-x}M_xN$ (M=Co, Ni, or Cu) with a $Li_3N$ structure, which is a complex nitride of lithium and a transition metal, can be used. For example, $Li_{2.6}Co_{0.4}N_3$ is preferable because of high charge and discharge capacity (900 mAh/g and 1890 mAh/cm$^3$).

A complex nitride of lithium and a transition metal is preferably used, in which case the negative electrode active material includes lithium ions therein and can thus be combined with a material as a positive electrode active material which does not include lithium ions, such as $V_2O_5$ or $Cr_3O_8$. Note that even in the case of using a material including lithium ions as a positive electrode active material, the complex nitride of lithium and a transition metal can be used as the negative electrode active material by extracting lithium ions included in the positive electrode active material in advance.

Alternatively, a material which causes a conversion reaction can be used as the negative electrode active material. For example, a transition metal oxide with which an alloying reaction with lithium is not caused, such as cobalt oxide (CoO), nickel oxide (NiO), or iron oxide (FeO), may be used as the negative electrode active material. Other materials which cause a conversion reaction include oxides such as $Fe_2O_3$, CuO, $Cu_2O$, $RuO_2$, and $Cr_2O_3$, sulfides such as $CoS_{0.89}$, NiS, or CuS, nitrides such as $Zn_3N_2$, $Cu_3N$, and $Ge_3N_4$, phosphides such as $NiP_2$, $FeP_2$, and $CoP_3$, and fluorides such as $FeF_3$ and $BiF_3$.

The average particle diameter of primary particles of the lithium-manganese complex oxide is preferably greater than or equal to 5 nm and less than or equal to 50 μm, further preferably greater than or equal to 100 nm and less than or equal to 500 nm, for example. Furthermore, the specific surface area is preferably greater than or equal to 5 m$^2$/g and less than or equal to 15 m$^2$/g. Furthermore, the average particle diameter of secondary particles is preferably greater than or equal to 5 μm and less than or equal to 50 μm. Note that the average particle diameter can be measured with a particle-size distribution analyzer or the like using a laser diffraction and scattering method or by observation with a SEM (scanning electron microscope) or a TEM. The specific surface area can be measured by a gas adsorption method.

The active material layer 202 may contain a second conductive additive. In the case where the active material layer 202 contains graphene and the second conductive additive, the three-dimensional electric conduction network in the active material layer can have a more complicated shape. Therefore, an electric conduction path in the active material layer 202 can be prevented from being cut while the power storage device is used. For the second conductive additive, natural graphite, artificial graphite such as mesocarbon microbeads, carbon fiber, or the like can be used. Alternatively, metal powder or metal fiber of copper, nickel, aluminum, silver, gold, or the like, a conductive ceramic material, or the like can be used.

As carbon fiber, for example, carbon fiber such as mesophase pitch-based carbon fiber or isotropic pitch-based carbon fiber can be used. Carbon nanofiber, carbon nanotube, or the like can also be used as carbon fiber. Vapor-grown carbon fiber (VGCF: Vapor-Grown Carbon Fiber) can also be used as carbon fiber. The representative values of VGCF are a fiber diameter of 150 nm, a fiber length of 10 μm to 20 μm, a real density of 2 g/cm$^3$, and a specific surface area of 13 m$^2$/g. Note that when a cross section in a direction perpendicular to a fiber axis is regarded as a cutting plane in a two-dimensional SEM image, the fiber diameter refers to a diameter of a perfect circle that circumscribes the cutting plane. The real density refers to a density calculated using only a volume occupied by a substance itself. The specific surface area is the surface area per unit mass or the surface area per unit volume of an object.

VGCF, which has a needle-like shape, has an excellent electrical characteristic of high conductivity and an excellent physical property of high mechanical strength. For this reason, the use of VGCF as the conductive additive can increase the contact points and the contact area of the active materials.

A particulate material can also be used as the conductive additive. As the particulate material, carbon black, such as acetylene black or ketjen black (registered trademark), whose diameter is greater than or equal to 3 nm and less than or equal to 500 nm, can be typically used.

A flake-like, needle-like, or fiber-like conductive additive has a function of binding the active materials and inhibits deterioration of a battery. Such a material also functions as a structure body or a cushioning material for maintaining the shape of the active material layer 202. Owing to the function as a structure body or a cushioning material for maintaining the shape of the active material layer 202, separation between the current collector and the active material is less likely to occur when expansion and contraction of the active material are repeated or a secondary battery is bent, for example. Although carbon black such as acetylene black or ketjen black (registered trademark) may be used instead of the above material, VGCF is preferably used because the strength for maintaining the shape of the active material layer 202 can be increased. When the strength for maintaining the shape of the active material layer 202 is high, deterioration of the secondary battery caused by changes in its form, such as bending, can be prevented.

The above-described active material layer 202 preferably contains, with respect to the total weight of the active material layer 202, the active material at a proportion of greater than or equal to 80 wt % and less than or equal to 95 wt %, the graphene at greater than or equal to 0.1 wt % and less than or equal to 8 wt %, and the binder at greater than or equal to 1 wt % and less than or equal to 10 wt %. In the case where the active material layer 202 contains the second conductive additive, the sum of the weights of the graphene and the second conductive additive is preferably greater than or equal to 0.1 wt % and less than or equal to 8 wt % with respect to the total amount of the active material layer 202.

As described in this embodiment, a covering film of graphene oxide is formed to cover the surface of the particulate active material, and they are in contact with each other, whereby a storage battery electrode including a high-density active material layer can be provided.

Note that in this embodiment, one embodiment of the present invention has been described. Alternatively, one embodiment of the present invention is described in the other embodiments. Note that one embodiment of the present invention is not limited thereto. In other words, since various embodiments of the invention are described in this embodiment and the other embodiments, one embodiment of the present invention is not limited to a particular embodiment. For example, although an example of use of graphene for a storage battery electrode is described as one embodiment of the present invention, one embodiment of the present invention is not limited thereto. Depending on circumstances or conditions, graphene or graphene oxide can be, for example, used as an electrode for a supercapacitor that is a capacitor having extremely high capacitance, used as an oxygen-reduction electrode catalyst, used as a material of dispersion water with lower friction than a lubricant, used as an electrode having a light-transmitting property for a display device, a solar battery, or the like, used as a gas-barrier material, used as a lightweight polymer material with high mechanical strength, used as a material for a high-sensitivity nanosensor for sensing uranium or plutonium contained in radiation-tainted water, or used as a material for removing a radioactive material. Alternatively, depending on circumstances or conditions, for example, graphene is not necessarily used for the storage battery electrode. For example, although an example of use in a lithium-ion secondary battery is described as one embodiment of the present invention, one embodiment of the present invention is not limited thereto. Depending on circumstances or conditions, one embodiment of the present invention can be used in a variety of secondary batteries such as a lead storage battery, a lithium-ion polymer secondary battery, a nickel-hydrogen storage battery, a nickel-cadmium storage battery, a nickel-iron storage battery, a nickel-zinc storage battery, a silver oxide-zinc storage battery, a solid-state battery, an air battery, a zinc air battery, and a lithium air battery, a primary battery, a capacitor, an electric double layer capacitor, an ultracapacitor, a supercapacitor, a lithium-ion capacitor, and the like. Alternatively, depending on circumstances or conditions, for example, one embodiment of the present invention is not necessarily used in a lithium-ion secondary battery.

This embodiment can be implemented in appropriate combinations with any of the other embodiments.

(Embodiment 2) In this embodiment, a method for manufacturing the electrode 200 including the active material layer 202 illustrated in FIG. 2 by using the active material, the conductive additive, and the binder that are described in Embodiment 1 as examples will be described with reference to FIG. 1.

First, a method for fabricating the "particle containing the lithium-manganese complex oxide" will be described. In this embodiment, the lithium-manganese complex oxide is synthesized first. Then, a coating layer is formed on the lithium-manganese complex oxide, so that a particle including a first region, a second region, and a third region is obtained.

As raw materials of the lithium-manganese complex oxide, the materials described in Embodiment 1 can be used. In this embodiment, $MnCO_3$ as the manganese compound, $Li_2CO_3$ as the lithium compound, and NiO are used as starting materials.

First, $Li_2CO_3$, $MnCO_3$, and NiO are each used as a starting material and weighed as shown in Step S11 in FIG. 1.

In the case where $Li_2CO_3$, $MnCO_3$, and NiO are used as starting materials at a ratio for weighing (molar ratio) of $Li_2CO_3:MnCO_3:NiO=1:0.7:0.3$, for example, $Li_2Mn_{0.7}Ni_{0.3}O_3$ is fabricated as the lithium-manganese complex oxide that is a final product. In this case, the atomic ratio in the lithium-manganese complex oxide is $Li:(Mn+Ni)=2:1$.

In one embodiment of the present invention, the ratio for weighing (molar ratio) of the starting materials is adjusted so that the atomic ratio in the lithium-manganese complex oxide is slightly different from $Li:(Mn+Ni)=2:1$.

In this embodiment, the starting materials are weighed so that the ratio for weighing (molar ratio) becomes $Li_2CO_3:MnCO_3:NiO=0.84:0.8062:0.318$.

Next, $Li_2CO_3$, $MnCO_3$, and NiO are mixed as shown in Step S12 in FIG. 1. A method for mixing the starting materials is not particularly limited, and a known crusher or grinder can be used. As examples, a ball mill, a bead mill, a jet mill, a roller mill, and the like can be given. A crushing and grinding method may be a dry method or may be a wet method. There is no particular limitation on a solvent that can be used in a wet method, and water, alcohol, acetone, or the like can be used, for example.

When the starting materials are mixed by a wet method, heat treatment for evaporating a solvent contained in the mixed starting materials is performed as shown in Step S13 in FIG. 1. The heat treatment here is performed at higher than or equal to 50° C. and lower than or equal to 150° C. The solvent contained in the mixed starting materials is evaporated by the heat treatment, whereby a mixed material is obtained.

Then, the mixed material is put in a crucible and firing is performed at higher than or equal to 800° C. and lower than or equal to 1000° C. as shown in Step S14 in FIG. 1. The firing time is set, for example, longer than or equal to 5 hours and shorter than or equal to 20 hours; an air gas (dry air) is used as a firing gas; and the flow rate is set to 10 L/min. The firing atmosphere may be an air atmosphere or may be an atmosphere containing an oxygen gas. Owing to the firing of the mixed material, a fired object (lithium-manganese complex oxide) is formed.

The lithium-manganese complex oxide which is synthesized by firing and in which a plurality of primary particles are sintered is in a state where the plurality of primary particles are sintered and a large secondary particle is formed. Therefore, crushing treatment is performed on the lithium-manganese complex oxide in which the plurality of primary particles are sintered, as shown in Step S15 in FIG. 1. By performing the crushing treatment on the fired object, the fired object is crushed into the primary particles or powder as small as the primary particles. The crushing treatment in this specification and the like includes an operation of grinding a sintered object. Note that grinding means further crushing of the primary particles. As in the mixing method of the starting materials, a known crusher or grinder can be used for the crushing treatment the crushing treatment. For example, a ball mill, a bead mill, or the like can be used. A crushing and grinding method may be a dry method or may be a wet method. There is no particular limitation on a solvent that can be used in a wet method, and water, alcohol, acetone, or the like can be used, for example.

The size of the particle having been subjected to crushing and grinding can be evaluated by measuring the specific surface area of the particle, for example. By increasing the specific surface area of the particle containing the lithium-manganese complex oxide, for example, the area of contact between the particle and an electrolytic solution can be increased in the case of fabricating a storage battery in which the particle containing the lithium-manganese complex oxide is used for a positive electrode. The increase in its contact area with the electrolytic solution can increase the reaction rate of the storage battery and increase the output characteristics, for example.

It is preferable to perform the crushing treatment because the specific surface area of the particle is increased in some cases. The specific surface area of the particle containing the lithium-manganese complex oxide is preferably greater than or equal to 0.1 m$^2$/g, for example. If the specific surface area of the particle becomes too large, the amount of the binder in the electrode fabricated using the particle with respect to the specific surface area becomes insufficient in some cases, resulting in a decrease in strength in some cases. When the amount of the binder is increased in this case, the capacity of the electrode per unit weight and unit volume is reduced in some cases. Therefore, the specific surface area of the particle containing the lithium-manganese complex oxide is preferably greater than or equal to 1 m$^2$/g and less than or equal to 50 m$^2$/g, more preferably greater than or equal to 5 m$^2$/g and less than or equal to 30 m$^2$/g.

In this embodiment, the crushing treatment of the lithium-manganese complex oxide in which primary particles are sintered is performed with a bead mill by a wet method using acetone.

When the crushing treatment is performed by a wet method, heat treatment for evaporating a solvent is performed after the crushing treatment. The heat treatment here may be performed as in Step S13. After that, vacuum drying is performed, whereby powdery lithium-manganese complex oxide is obtained.

Next, heat treatment is performed. The lithium-manganese complex oxide having been subjected to the crushing treatment are put in a crucible, and the heat treatment is performed at higher than or equal to 300° C. and lower than or equal to 1000° C., preferably higher than or equal to 600° C. and lower than or equal to 900° C., as shown in Step S16 in FIG. 1. The heating time is set, for example, longer than or equal to 5 hours and shorter than or equal to 20 hours; an air gas (dry air) is used as a gas; and the flow rate is set to 10 L/min. The heating atmosphere may be an air atmosphere or an atmosphere containing an oxygen gas.

Through the above steps, the lithium-manganese complex oxide represented by the composition formula $Li_aMn_bM_cO_d$ can be formed. In this embodiment, the raw materials are weighed so that the ratio for weighing (molar ratio) becomes $Li_2CO_3$:$MnCO_3$:$NiO$=0.84:0.8062:0.318, whereby a lithium-manganese complex oxide represented by a composition formula $Li_{1.68}Mn_{0.8062}M_{0.318}O_3$ can be formed.

The crystallinity of the lithium-manganese complex oxide having been subjected to the crushing treatment shown in Step S15 might be disordered by the impact of the crushing treatment. In addition, oxygen vacancies might be formed in the lithium-manganese complex oxide. Thus, heat treatment is preferably performed again on the powdery lithium-manganese complex oxide having been subjected to the vacuum drying.

The heat treatment performed on the lithium-manganese complex oxides having been subjected to the crushing treatment can repair oxygen vacancies and compensate for the crystal disorder caused by the crushing treatment. Another crushing treatment may be performed on the powdery lithium-manganese complex oxide having been subjected to the heat treatment, in which case the crushing treatment can be performed using a method similar to that in Step S15 in FIG. 1.

Here, a lithium-manganese complex oxide was fabricated through Steps S11 to S16 shown in FIG. 1 using raw materials of $Li_2CO_3$:$MnCO_3$:$NiO$=0.84:0.8062:0.318, and the temperature stability thereof was evaluated. Specifically, the evaluation was performed by DSC (differential scanning calorimetry). Heat generation was observed at 262.2° C. At temperatures lower than that, it was stable in the DSC evaluation. Thus, it is shown that the lithium-manganese complex oxide of one embodiment of the present invention is stable even at high temperatures of 260° C. or lower.

The atomic ratio in the lithium-manganese complex oxide described in this embodiment is adjusted to be slightly different from Li:(Mn+Ni)=2:1. Thus, the voltage is increased and the discharge capacity is also increased as compared with the case where a lithium-manganese complex oxide whose atomic ratio is Li:(Mn+Ni)=2:1 is used for an electrode.

Through the above steps, the lithium-manganese complex oxide in the form of particles can be obtained. Here, the lithium-manganese complex oxide preferably includes the first region and the second region. The second region is in contact with at least part of the outside of the first region. Here, the outside refers to the side closer to a surface of a particle.

The first region and the second region contain lithium and oxygen. In addition, at least one of the first region and the second region contains manganese. In addition, in addition, at least one of the first region and the second region contains the element M. Here, the element M is preferably silicon, phosphorus, or a metal element other than lithium and manganese, more preferably Si, P, or a metal element selected from Ni, Ga, Fe, Mo, In, Nb, Nd, Co, Sm, Mg, Al, Ti, Cu, and Zn, still more preferably nickel.

Next, the coating layer is provided on the obtained lithium-manganese complex oxide. The coating layer preferably contains carbon. Since carbon has high conductivity, the particle coated with carbon in the electrode of the storage battery can reduce the resistance of the electrode, for example. The coating layer may contain graphene oxide or may contain graphene oxide having been subjected to reduction.

Alternatively, the coating layer may contain a metal compound. As examples of the metal here, cobalt, aluminum, nickel, iron, manganese, titanium, zinc, lithium, carbon, and the like can be given. The coating layer may contain an oxide, a fluoride, or the like of the metal as an example of the metal compound.

In this embodiment, a layer containing carbon is provided at least partly as the coating layer. It is preferred to use graphene as the layer containing carbon. Graphene has excellent electrical characteristics of high conductivity and excellent physical properties of high flexibility and mechanical strength.

Note that graphene in this specification includes single-layer graphene or multilayer graphene including two or more and one hundred or less layers. Single-layer graphene refers to a one-atom-thick sheet of carbon molecules having $\pi$ bonds. In addition, graphene oxide refers to an oxidized compound of such graphene. Note that when graphene oxide is reduced to form graphene, oxygen contained in the graphene oxide is not entirely released and part of the oxygen remains in graphene. In the case where the graphene contains oxygen, the proportion of oxygen, which is measured by X-ray photoelectron spectroscopy (XPS), is higher than or equal to 2% and lower than or equal to 20%, and preferably higher than or equal to 3% and lower than or equal to 15% of the whole graphene.

The thickness of the layer containing carbon is preferably greater than or equal to 0.4 nm and less than or equal to 40 nm.

Next, a method for providing the layer containing carbon on the lithium-manganese complex oxide will be described. In this embodiment, graphene (Reduced Graphene Oxide; abbreviated to RGO) obtained by reducing graphene oxide (Graphene Oxideno; abbreviated to GO) is used as the layer containing carbon.

Various synthesis methods such as a Hummers method, a modified Hummers method, and oxidation of a graphite can be used to fabricate graphene oxide.

For example, in a Hummers method, graphite such as flake graphite is oxidized to form graphite oxide. The formed graphite oxide is graphite that is oxidized in places and thus to which a functional group such as a carbonyl group, a carboxyl group, or a hydroxyl group is bonded, and the crystallinity of the graphite is lost and the distance between layers is increased. Therefore, graphene oxide can be easily obtained by separation of the layers from each other by ultrasonic treatment or the like.

The length of one side (also referred to as a flake size) of the graphene oxide is greater than or equal to 50 nm and less than or equal to 100 μm, preferably greater than or equal to 800 nm and less than or equal to 20 μm. It is preferable that the flake size be as large as possible to cover surfaces of the lithium-manganese complex oxides with ease.

First, graphene oxide and water are put in a mixer to fabricate a dispersion solution of graphene oxide. In the following description, this is referred to as an aqueous solution of graphene oxide. At this time, the concentration of the graphene oxide is preferably higher than or equal to 0.5 wt % and lower than or equal to 5 wt %. At lower than 0.5 wt %, it is difficult to cover the surface of the lithium-manganese complex oxide. At higher than 5 wt %, increases in the volume and weight of the electrode are caused.

The lithium-manganese complex oxide exhibits basicity in some cases. When a binder, a conductive additive, and a solvent used in the step of fabricating an electrode to be described later are mixed to form a slurry or a paste, gelation of the binder is accelerated by the basicity exhibited by the lithium-manganese complex oxide and the viscosity of the slurry or the paste extremely increases, which makes it difficult to form an electrode in some cases.

In contrast, an aqueous solution of graphene oxide exhibits acidity. Thus, in Step S17, when a lithium-manganese complex oxide is added to an aqueous solution of graphene oxide, an acid-base reaction is caused, and the basicity of the lithium-manganese complex oxide is lowered.

As a result, even when the binder and the conductive additive are added and mixed in a later step, gelation of the slurry or the paste can be suppressed. Thus, the step of adding the lithium-manganese complex oxide to an aqueous solution of graphene oxide in Step S17 is an effective method in stably carrying out the step of fabricating an electrode because it has an effect of widening margins in the later steps of mixing with the binder and the conductive additive and coating of the current collector.

Next, the lithium-manganese complex oxide is put in the dispersion solution, and kneading is performed as shown in Step S17 in FIG. 1. Note that kneading means mixing at a high viscosity. The kneading can separate aggregation of lithium-manganese complex oxide powder; thus, the graphene oxide and the lithium-manganese complex oxides can be uniformly dispersed.

Then, the mixture of the graphene oxide and the lithium-manganese complex oxide is dried under a reduced pressure in a bell jar and is then ground in a mortar, so that the lithium-manganese complex oxide coated with graphene oxide is obtained.

Subsequently, reduction treatment is performed on the graphene oxide covering the surface of the lithium-manganese complex oxide as shown in Step S18 in FIG. 1. The reduction treatment of the graphene oxide may be performed by heat treatment or may be performed by causing a reaction in a solvent containing a reducing agent. In this embodiment, the graphene oxide is reacted in a solvent using a reducing agent.

When the graphene oxide is reacted in the solvent using the reducing agent, the graphene oxide covering the surface of the lithium-manganese complex oxide is reduced to form graphene. Note that oxygen contained in the graphene oxide is not entirely released, and it is possible that oxygen partly remains in the graphene. In the case where the graphene contains oxygen, the proportion of oxygen, which is measured by XPS, is higher than or equal to 2 atomic % and lower than or equal to 20 atomic %, preferably higher than or equal to 3 atomic % and lower than or equal to 15 atomic % of the whole graphene. This reduction treatment is preferably performed at temperatures higher than or equal to room temperature and lower than or equal to 150° C., more preferably at temperatures higher than or equal to room temperature and lower than or equal to 80° C. The reduction treatment with heating can promote the reduction reaction. The reduction time of the graphene oxide can be longer than or equal to 3 minutes and shorter than or equal to 10 hours.

As the reducing agent, ascorbic acid, hydrazine, dimethyl hydrazine, hydroquinone, sodium borohydride ($NaBH_4$), tetrabutylammonium bromide (TBAB), lithium aluminum hydride ($LiAlH_4$), N,N-diethylhydroxylamine, or a derivative thereof can be used. For example, ascorbic acid and hydroquinone are preferable to hydrazine and sodium borohydride in that they are safe due to low reducing ability and utilized industrially with ease.

A polar solvent can be used as the solvent. Any material can be used as long as it can dissolve the reducing agent. For example, any one of water, methanol, ethanol, acetone, tetrahydrofuran (THF), dimethylformamide (DMF), 1-methyl-2-pyrrolidone (NMP), dimethyl sulfoxide (DMSO), ethylene glycol, diethylene glycol, and glycerin, or a mixed solution of two or more of the above can be used.

As the reducing solution containing a reducing agent and a solvent, a mixed solution of ethanol and ascorbic acid, or a mixed solution of water, ascorbic acid, and lithium hydroxide can be used. In this embodiment, the case of using a reducing solution containing ascorbic acid, water, and lithium hydroxide is used.

When the lithium-manganese complex oxide coated with the graphene oxide is reacted in the reducing solution, protons of ascorbic acid are added to the graphene oxide. Then, $H_2O$ is released, whereby the graphene oxide is reduced.

After the reduction treatment, collection of powder is performed as shown in Step S19 in FIG. 1. Here, the reducing solution is filtrated. A substance obtained here is referred to as a substance A. The filtration can be suction filtration or the like. Alternatively, the substance A and a liquid may be separated from each other by centrifugation.

Next, the obtained substance A is washed. The washing is preferably performed using a solution given as the solvent contained in the reducing solution, for example. Note that the solution may be the same as or different from the solvent contained in the reducing solution.

Next, drying is performed. The drying step is performed, for example, at a temperature higher than or equal to 50° C. and lower than 500° C., preferably higher than or equal to 120° C. and lower than or equal to 400° C. for 1 hour to 48 hours. The drying allows sufficient evaporation or removal of the polar solvent and moisture. The drying step can also facilitate the reduction of graphene oxide. It may be performed under a reduced pressure (in vacuum) or in a reduction atmosphere, or may be performed under an atmospheric pressure. As a gas, air may be used, or nitrogen or another inert gas may be used.

Here, the substance A preferably forms a secondary particle, for example.

In the case where the substance A forms a secondary particle, the average value of the particle diameters thereof is preferably less than or equal to 50 μm, further preferably less than or equal to 30 μm, still further preferably greater than or equal to 1 μm and less than or equal to 20 μm. The particle diameter here refers to, for example, a particle diameter measured with a particle-size distribution analyzer. Alternatively, it may refer to a particle diameter of a secondary particle in the case where the substance A forms the secondary particle. The particle diameter of the secondary particle can also be calculated by observation of the particle with a microscope, for example, as well as the above-described particle-size distribution analyzer. Alternatively, as the particle diameter, a diameter of a circle whose area is equal to the area of the cross section of the particle can be calculated.

Note that after the substance A is washed, a solution is fabricated by dispersing the substance A in a solvent, and the solution is subjected to spray dry treatment and dried. By the spray dry, the substance A forms a secondary particle, for example, so that a particle diameter is changed in some cases.

Heat treatment is preferably performed after the spray dry. It is performed, for example, at a temperature higher than or equal to 50° C. and lower than 500° C., preferably higher than or equal to 120° C. and lower than or equal to 400° C. for 1 hour to 48 hours. The drying allows sufficient evaporation or removal of the polar solvent and moisture. The drying step can also facilitate the reduction of graphene oxide. The drying may be performed under a reduced pressure (in vacuum) or in a reduction atmosphere, or may be performed under an atmospheric pressure. As a gas, air may be used, or nitrogen or another inert gas may be used.

Through the above steps, the graphene oxide is reduced, so that graphene can be formed on the surface of the lithium-manganese complex oxide.

Note that oxygen in the graphene oxide does not need to be entirely released, and it is possible that oxygen partly remains in the graphene. In the case where the graphene contains oxygen, the proportion of oxygen, which is measured by XPS, is higher than or equal to 2% and lower than or equal to 20%, preferably higher than or equal to 3% and lower than or equal to 15% of the whole.

In some cases, by performing the heat treatment after the reduction treatment, the electrical conductivity of graphene can be increased as compared to that before the heat treatment.

In some cases, by performing the heat treatment after the reduction treatment, the first region to the third region are formed in the "particle containing the lithium-manganese complex oxide", for example. The first region to the third region in the "particle containing the lithium-manganese complex oxide" may be formed before the heat treatment. Alternatively, they may be formed in the process of the heat treatment. The thickness, the composition, the crystal structure, and the like of the first region to the third region which are formed, for example, before the formation of the coating layer, after the formation of the coating layer, and after the reduction treatment may be changed in the process of the heat treatment.

Furthermore, by performing the heat treatment, an element included in the binder reacts with a particle containing the lithium-manganese complex oxide in some cases. For example, in the case where PVdF is used as the binder, fluorine contained in PVdF and one or more of lithium, manganese, and the element M of the particle containing the lithium-manganese complex oxide may form metal fluoride.

Alternatively, although the example of the coating layer of the lithium-manganese complex oxide, e.g., the layer containing carbon, is described here, an element contained in the coating layer and fluorine may form a bond. For example, in the case where the layer containing carbon is used as the coating layer, carbon fluoride may be formed. Here, the coating layer may correspond the third region included in the "particle containing the lithium-manganese complex oxide" or include the third region and part of the lithium-manganese complex oxide. The second region included in the "particle containing the lithium-manganese complex oxide" may include part of the coating layer, for example.

Through the above steps, a particle in which graphene is provided on at least part of a surface of the lithium-manganese complex oxide can be formed.

Graphene has excellent electrical characteristics of high conductivity and excellent physical properties of high flexibility and mechanical strength. For this reason, with the use of the electrode containing the particle in a battery, the electrical conductivity of the electrode can be improved, for example.

Next, a method for fabricating the electrode 200 is described.

First, an electrode mixture composition is fabricated. The electrode mixture composition can be fabricated by using the above-described active material, adding a binder, a conductive additive, and the like, and mixing it with a solvent, for example. The electrode mixture composition may be in a slurry form or may be in a paste form. Note that as the solvent, for example, water, NMP (N-methyl-2-pyrrolidone), or the like can be used. Water is preferably used in terms of the safety and cost.

The case where the electrode 200 is a positive electrode of a storage battery will be described as an example. Described here is an example where the active material of one embodiment of the present invention is used as an active material, acetylene black is used as a conductive additive, PVdF is used as a binder, and NMP is used as a solvent.

First, the active material of one embodiment of the present invention, acetylene black, and polyvinylidene fluoride are mixed. NMP is added to the mixture thereof and mixed to a predetermined viscosity; thus, the electrode mixture composition can be formed. In this step, the mixing and the addition of the polar solvent may be repeated more than once. The electrode mixture composition may be in a slurry form or may be in a paste form.

Through the above steps, the electrode mixture composition in which the active material, the conductive additive, and the binder are uniformly dispersed can be formed.

Here, an undercoat may be formed over the current collector. Note that the undercoat is a coating layer for reducing contact resistance or improving adhesion between the current collector and the active material layer. As the undercoat, for example, a carbon layer, a metal layer, a layer containing carbon and high molecules, or a layer containing metal and high molecules can be used. Forming the undercoat over the current collector can reduce the contact resistance between the current collector and the active material layer formed later. In addition, the adhesion between the current collector and the active material layer can be increased. Note that in the case of using graphene as the conductive additive, the undercoat is preferably not dissolved by a reducing solution in the process of reducing graphene oxide.

As the undercoat, for example, an aqueous solution in which graphite, acetylene black, and the like are dispersed or the aqueous solution into which high molecules are mixed can be used. For example, a mixture of graphite and sodium polyacrylate (PAA), a mixture of AB and PVdF, or the like can be used. The compounding ratio of graphite to PAA is preferably in a range of graphite:PAA=95:5 to 50:50, and the compounding ratio of AB to PVdF is preferably in a range of AB:PVdF=70:30 to 50:50.

Note that if there is no problem with the adhesion between the current collector and the active material layer, the electrode strength, and the contact resistance, it is not always necessary to form the undercoat over the current collector.

Next, slurry is provided on one or both sides of the current collector by a coating method such as a doctor blade method, for example.

Next, the slurry provided over the current collector is dried by a method such as ventilation drying or reduced pressure (vacuum) drying to form the active material layer. The drying is preferably performed using a hot wind at higher than or equal to 50° C. and lower than or equal to 180° C. Through this step, the polar solvent contained in the active material layer is evaporated. Note that there is no particular limitation on the atmosphere.

Here, the active material layer may be pressed by a compression method such as a roll press method or a flat plate press method to increase the density of the active material layer. Further, by applying heat at higher than or equal to 90° C. and lower than or equal to 180° C., preferably lower than or equal to 120° C. when the pressing is performed, the binder (e.g., PVdF) contained in the undercoat or the active material layer is softened to the extent that the characteristics of the electrode are not changed; thus, the adhesion between the current collector and the active material layer can be further increased.

Then, the active material layer is dried. The drying is preferably performed under a reduced pressure (in vacuum) or in a reduction atmosphere. The drying step is performed, for example, at a temperature higher than or equal to 50° C. and lower than or equal to 600° C., preferably higher than or equal to 120° C. and lower than or equal to 500° C., further preferably higher than or equal to 200° C. and lower than or equal to 400° C. for 1 hour to 48 hours. The drying allows sufficient evaporation or removal of the polar solvent and moisture in the active material layer.

Here, for example, in the case where an electrode is fabricated using the "particle containing the lithium-manganese complex oxide" of one embodiment of the present invention and a storage battery is fabricated using the electrode, the first region to the third region included in the "particle containing the lithium-manganese complex oxide" may be formed in either of the fabrication process of the "particle containing the lithium-manganese complex oxide" and the fabrication process of the storage battery.

The current collector over which the active material layer is formed may be further pressed. Thus, the adhesion between the current collector and the active material layer can be increased. In addition, the density of the active material layer can be increased. Further, by applying heat at higher than or equal to 90° C. and lower than or equal to 180° C., preferably lower than or equal to 120° C. when the pressing is performed, the binder (e.g., PVDF) contained in the undercoat or the active material layer is softened to the extent that the characteristics of the electrode are not changed; thus, the adhesion between the current collector and the active material layer can be further increased.

Lastly, the current collector and the active material layer are stamped out to have a predetermined size, whereby the electrode is fabricated.

As described in this embodiment, a strongly basic active material is added to an acidic aqueous solution of graphene oxide to cause an acid-base reaction, whereby the strong basicity of the active material is lowered and gelation of the binder can be prevented. As a result, an electrode with high strength that is hardly damaged by the external impact can be fabricated. Thus, when a storage battery is fabricated by the method for manufacturing an electrode described in this embodiment, cycle characteristics and rate characteristics of the storage battery can be improved. In addition, a method for manufacturing a storage battery can be simplified. Furthermore, a storage battery with high strength that is hardly damaged by, for example, external impact can be fabricated.

This embodiment can be implemented in appropriate combinations with any of the other embodiments.

Figure 9A:
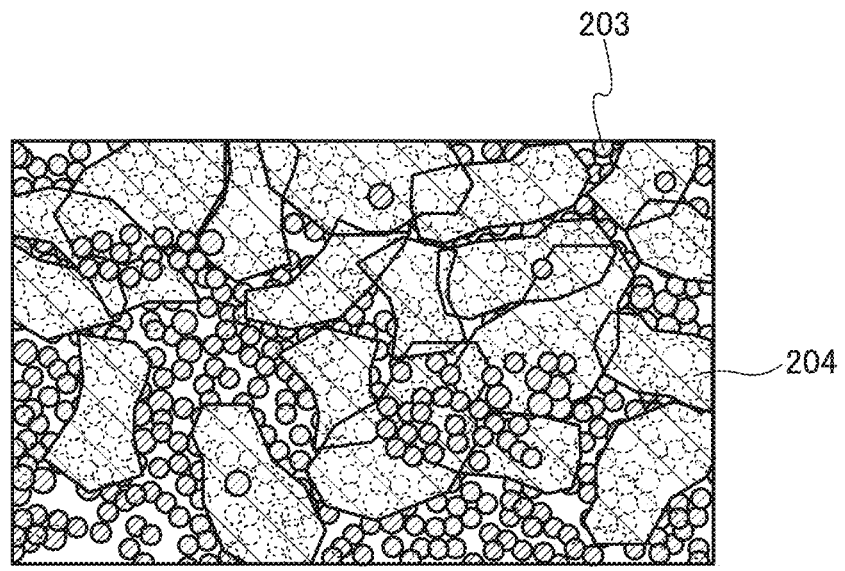
FIGS. 9A-9B Diagrams illustrating a storage battery electrode.

(Embodiment 3) In this embodiment, an example of a storage battery electrode of one embodiment of the present invention which is different from those in Embodiments 1 and 2 will be described. FIG. 9(A) is a plan view of an active material layer, and FIG. 9(B) and FIG. 10 are longitudinal cross-sectional views of the active material layer.

The structure, such as the state of arrangement of the conductive additive with respect to the active material particle, of the storage battery electrode described in this embodiment is different from that in Embodiment 1. However, the materials and the like described in Embodiment 1 can be used for other components of the storage battery, such as the positive electrode current collector, the positive electrode active material, the negative electrode current collector, the negative electrode active material, another conductive additive, and the electrolytic solution.

Figure 9B:
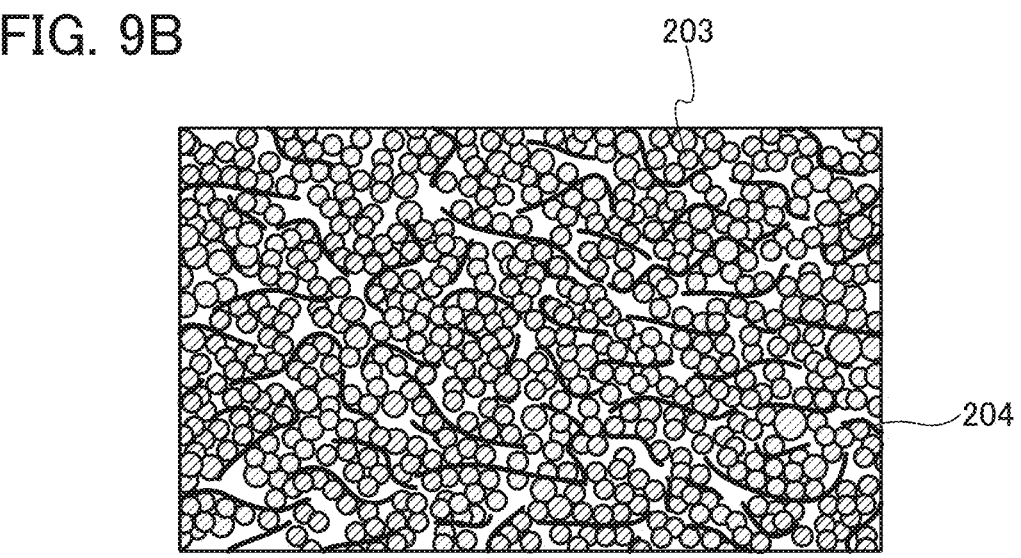
Figure 10:
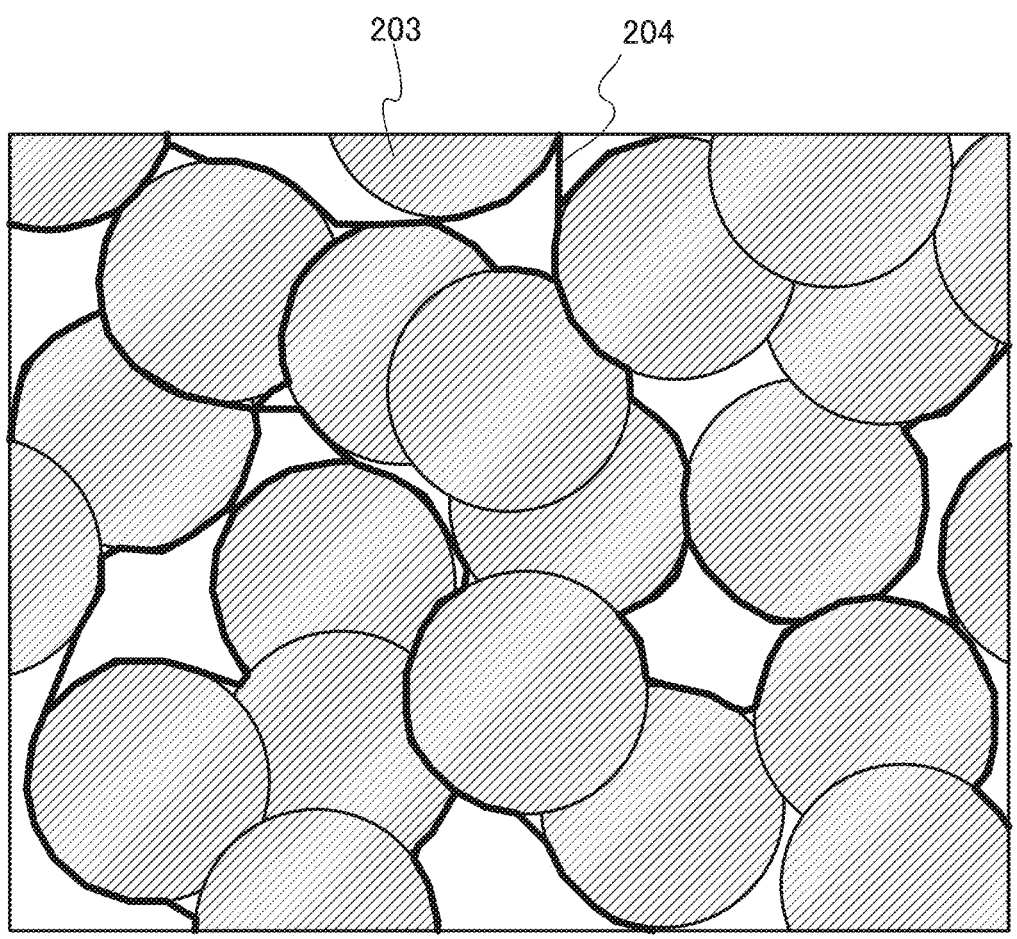
FIG. 10 A diagram illustrating a storage battery electrode.

FIG. 9(A) and FIG. 9(B) are a schematic top view and a schematic longitudinal cross-sectional view of the active material layer 202, and FIG. 10 is a schematic enlarged view of the total cross section. The active material layer 202 contains graphene 204 as the conductive additive, active material particles 203, and the binder (not shown). The active material layer 202 may contain a conductive additive (also referred to as second conductive additive, not shown) other than graphene.

As in the top view of the active material layer 202 illustrated in FIG. 9(A), the active material particles 203 are coated with a plurality of graphenes 204. A sheet of the graphene 204 is connected to a plurality of the active material particles 203. In particular, since the graphene 204 is in the form of a sheet, surface contact can be made so as to cover part of the surfaces of the active material particles 203. Unlike a conductive additive in the form of particles, such as acetylene black, which makes point contact with an active material, the graphene 204 is capable of surface contact with low contact resistance; accordingly, the electrical conductivity of the active material particles 203 and the graphene 204 can be improved without increasing the amount of the conductive additive.

Furthermore, surface contact is made between a plurality of graphenes 204. This is because graphene oxide with extremely high dispersibility in a polar solvent is used for formation of the graphene 204. A solvent is removed by volatilization from a dispersion medium containing uniformly dispersed graphene oxide, and the graphene oxide is reduced to graphene; hence, the graphenes 204 remaining in the active material layer 202 partly overlap with each other and are dispersed such that surface contact is made. Accordingly, an electric conduction path is formed.

In the top view of the active material layer 202 in FIG. 9(A), the graphene 204 does not necessarily overlap with another graphene only on a surface of the active material layer 202; part of the graphene 204 is provided between the active material layers 202. The graphene 204 is an extremely thin film (sheet) made of a single layer or stacked layers of carbon molecules and thus is in contact with part of the surfaces of the active material particles 203 so as to trace these surfaces. A portion that is not in contact with the active material particles 203 is warped between the active material particles 203 and crimped or stretched.

The longitudinal section of the active material layer 202 in FIG. 9(B) shows substantially uniform dispersion of the sheet-like graphene 204 in the active material layer 202. The graphene 204 is schematically shown by a heavy line in FIG. 9(B) but is actually a thin film having a thickness of a single layer or a multiple layer of carbon molecules. As in the description of the top view of the active material layer 202, a plurality of the graphenes 204 are formed so as to wrap or coat a plurality of the active material particles 203 and thus they are in surface contact with each other. Furthermore, a plurality of the graphenes 204 are also in surface contact with each other; consequently, a plurality of graphenes 204 form an electric conduction network. FIG. 4 is a schematic enlarged view of FIG. 9(B). The graphene 204 coats the surfaces of a plurality of the active material particles 203 so as to cling to the surfaces, and a plurality of graphenes are also in contact with each other; thus, the network is formed.

As illustrated in FIG. 9(A), FIG. 9(B), and FIG. 10, a plurality of sheets of the graphenes 204 are three-dimensionally dispersed throughout the active material layer 202 and in surface contact with each other, which forms the three-dimensional electric conduction network. Furthermore, each of the graphenes 204 coats and makes surface contact with a plurality of the active material particles 203.

This embodiment can be implemented in appropriate combinations with any of the other embodiments.

Figure 6:
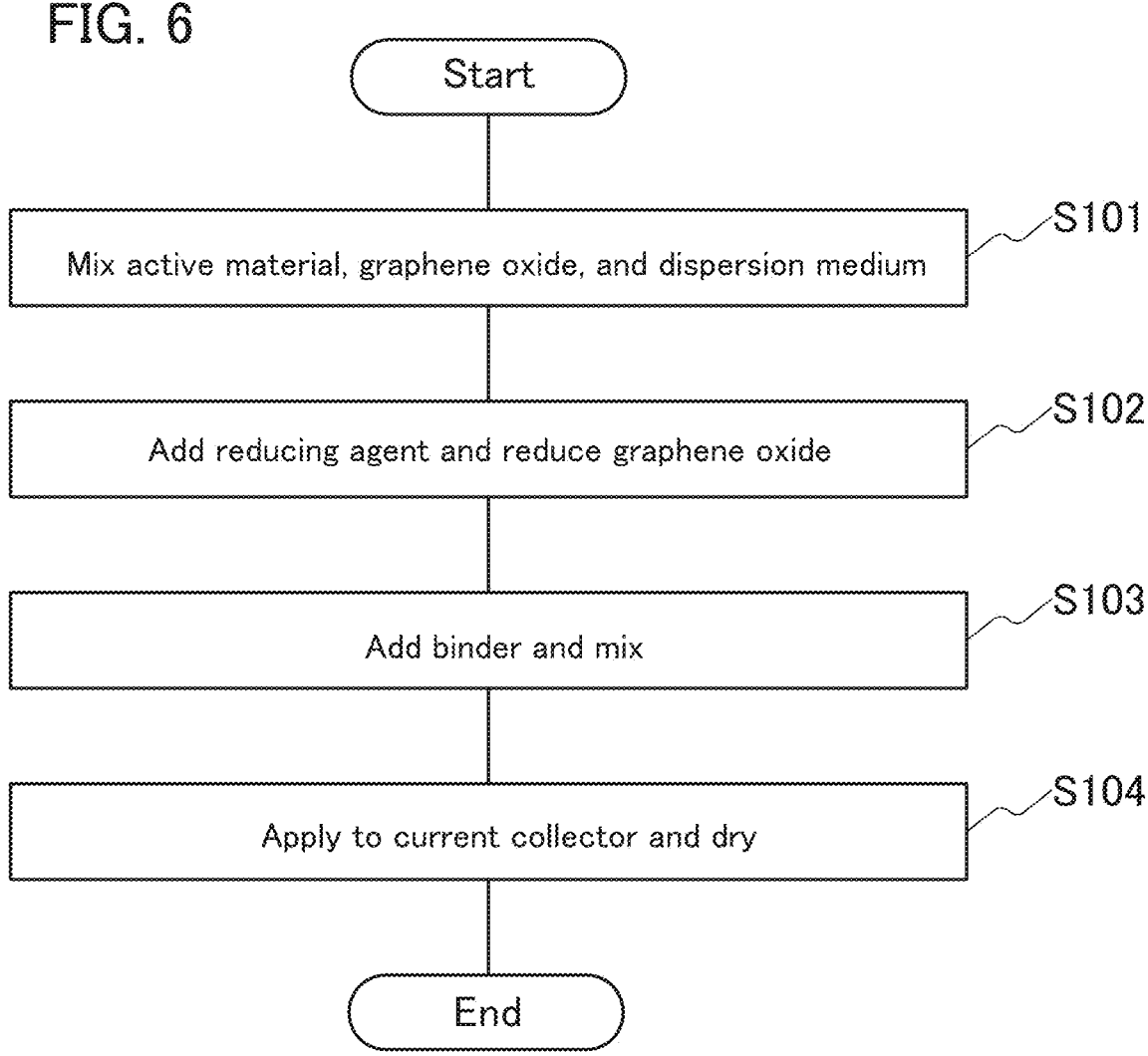
FIG. 6 A flow chart illustrating a method for manufacturing a storage battery electrode.

(Embodiment 4) In this embodiment, a method for manufacturing the electrode 200 including the active material layer 202 by using the active material, the conductive additive, and the binder that are described in Embodiment 3 as examples will be described with reference to FIG. 6 to FIG. 8.

First, an active material, graphene oxide, and a dispersion medium are mixed to form a first mixture (Step S101). At this time, a second conductive additive may be added. For the active material, the graphene oxide, and the second conductive additive, any of the materials described in Embodiment 1 can be used.

A polar solvent can be used as the dispersion medium. For example, any one of methanol, ethanol, acetone, tetrahydrofuran (THF), dimethylformamide (DMF), N-methylpyrrolidone (NMP), and dimethyl sulfoxide (DMSO) or a mixed solution of two or more of the above can be used. It is particularly preferable to use NMP because graphene oxide can be well dispersed therein.

Next, the mixture is kneaded (mixed in a high-viscosity state), so that the aggregation of the graphene oxide and the active material can be weakened. Since oxygen in a functional group of the graphene oxide is negatively charged in the polar solvent, different graphene oxides are unlikely to be aggregated. Hence, the active material and the graphene oxide can be further uniformly dispersed.

Next, a reducing agent is added to and mixed with the first mixture to reduce the graphene oxide, whereby a second mixture is formed (Step S102). It is preferable that the reducing agent dissolved in a small amount of a solvent be added to the first mixture, which leads to easy mixing. Through this step, the graphene oxide can be reduced to be graphene. Note that oxygen contained in the graphene oxide is not entirely released, and it is possible that oxygen partly remains in the graphene.

For the reducing agent, any of the materials described in Embodiment 1 can be used. As the solvent, a low-boiling solvent in which the reducing agent is easily dissolved, such as water, methanol, or ethanol, can be selected and used.

The mixture to which the reducing agent is added may be heated at higher than or equal to 30° C. and lower than or equal to 200° C., preferably higher than or equal to 50° C. and lower than or equal to 100° C. The heating can promote the reduction reaction of the graphene oxide. Note that there is no particular limitation on the atmosphere.

Here, the graphene oxide can be reduced not by addition of the reducing agent, but by heating of the mixture containing the graphene oxide (also referred to as thermal reduction). Note that the heating at high temperatures is needed to reduce the graphene oxide sufficiently by thermal reduction. Therefore, the limitation such as heat resistant temperature of a material or an apparatus used for fabricating the electrode might inhibit heating of the graphene oxide to a temperature at which the graphene oxide is sufficiently reduced, which results in insufficient reduction of the graphene oxide in some cases. In contrast, one embodiment of the present invention can reduce the graphene oxide by addition of the reducing agent without requiring heating at high temperatures. Thus, a method shown in Step S102 can be considered to increase the reduction reaction efficiency of the graphene oxide under mild conditions.

The proportion of the amount of the reducing agent to the weight of the graphene oxide contained in the first mixture is preferably set higher than or equal to 5 wt % and lower than or equal to 500 wt %. The amount of the reducing agent may be changed depending on the degree of oxidation of the graphene oxide used in Step S101.

Here, the use of a high-density active material might increase the density of the active material layer 202. As examples of the high-density active material, a lithium-manganese complex oxide represented by the composition formula $Li_xMn_yM_zO_w$, $LiCoO_2$, and a NiMnCo-based material such as $LiNi_{1/3}Mn_{1/3}Co_{1/3}O_2$. In the case where the graphene oxide is reduced after the active material layer 202 is formed, the graphene oxide cannot be reduced sufficiently in some cases. This is probably because the active material layer 202 hardly contains air gaps and the reducing agent does not sufficiently penetrate deeply into the active material.

As shown in Step S102, in one embodiment of the present invention, the reducing agent is added to the first mixture before formation of the active material layer, so that the graphene oxide is reduced. When the reducing agent is added to the first mixture, the reducing agent is widely dispersed throughout the mixture and the graphene oxide contained in the second mixture can be reduced with high reaction efficiency. Accordingly, the active material layer 202 in which the graphene oxide is reduced with high reaction efficiency can be formed in Step S104 later.

When a basic active material is used, the second mixture might be basic. As examples of the basic active material, a lithium-manganese complex oxide represented by the composition formula $Li_xMn_yM_zO_w$ and the like can be given. In that case, for example, when PVdF is added as the binder to the second mixture in the subsequent Step S103, PVdF might be gelled because of the strong basicity of the mixture, and uniform mixing of a third mixture might be difficult. However, in Step S101, when the strongly basic active material is added to the acid aqueous solution of graphene oxide and an acid-base reaction occurs, the second mixture can be prevented from becoming strongly basic. Therefore, PVdF can be prevented from being gelled in the subsequent Step S103; thus, the third mixture that is uniformly mixed can be fabricated. Therefore, the active material layer in which the binder is uniformly dispersed can be formed; thus, an electrode with a uniform thickness can be fabricated. Furthermore, an electrode with high strength that is hardly damaged by, for example, external impact can be fabricated.

In the case of using an active material or a binder that is unstable to acid, a base is preferably used as the reducing agent in Step S102. As examples of the active material unstable to acid, $LiCoO_2$, $LiFePO_4$, and the like can be given. As examples of the binder unstable to acid, SBR and the like can be given. As examples of the base that can be used as the reducing agent, hydrazine, dimethyl hydrazine, sodium tetrahydroborate, N,N-diethylhydroxylamine, and the like can be given.

As described above, in one embodiment of the present invention, by causing an acid-base reaction with the use of the aqueous solution of graphene oxide, a basic active material and a binder that is gelled in a strongly basic mixture can be combined to fabricate an electrode with a uniform thickness or an electrode with high strength. With the use of a base as the reducing agent, an electrode can also be fabricated by using an active material or a binder that is unstable to acid. The application of one embodiment of the present invention is preferable because the range of choices for materials of an active material and a binder and for combinations of the materials can be wide.

Here, the second mixture may be dried at higher than or equal to 20° C. and lower than or equal to 80° C. in a reduced pressure atmosphere for 5 minutes or more and 10 hours or less to perform an operation to remove the solvent added together with the reducing agent.

Next, the binder is added to the second mixture and kneading is performed, so that the third mixture (also referred to as paste) is formed (Step S103). For the binder, any of the materials described in Embodiment 1 can be used.

Then, the third mixture is applied to a current collector and dried, so that an active material layer is formed (Step S104). The drying step is performed by heating at 20° C. or higher and 170° C. or lower for 1 minute or longer and 10 hours or shorter, so that the dispersion medium is evaporated. Note that there is no particular limitation on the atmosphere.

Figure 7:
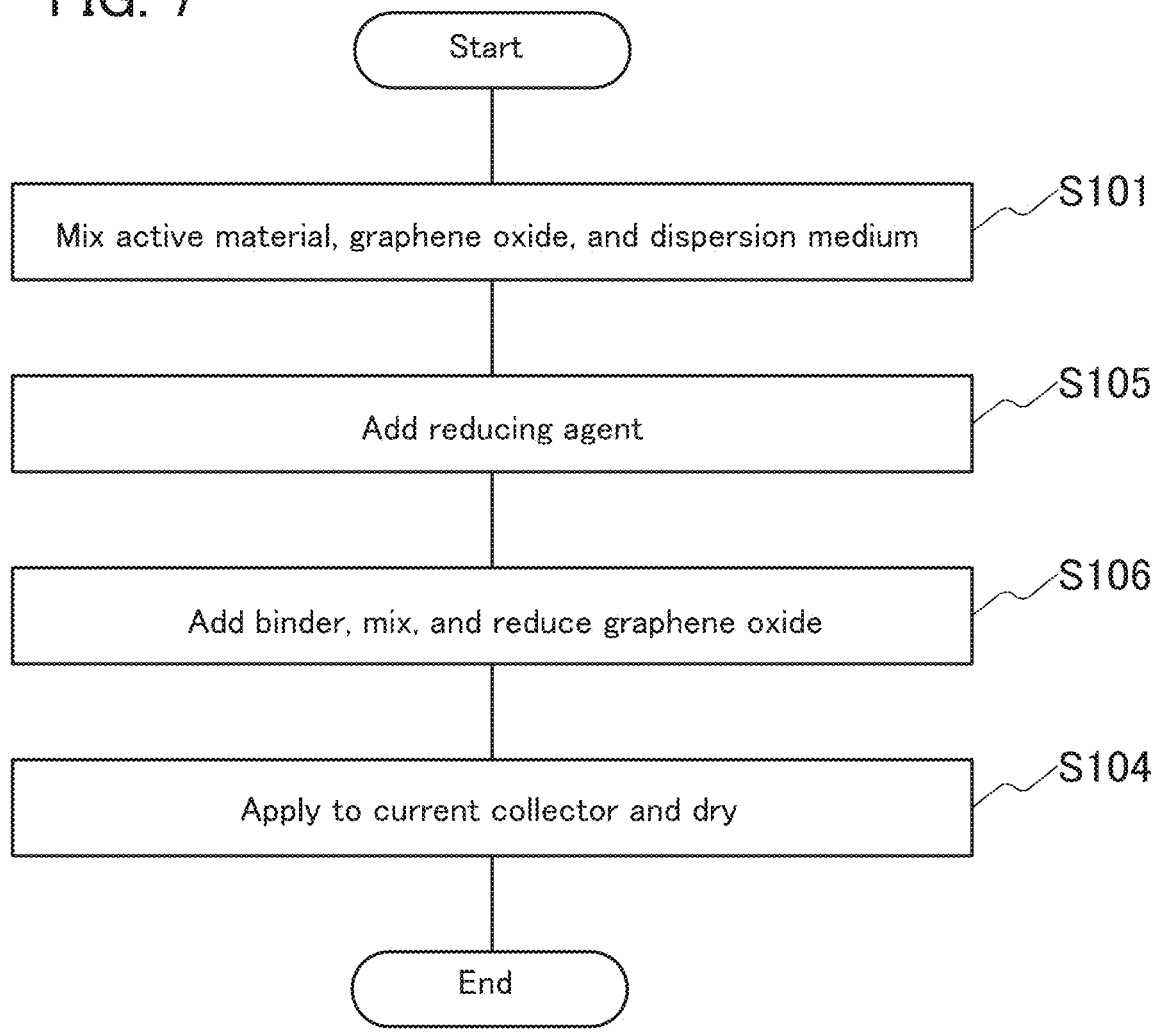
FIG. 7 A flow chart illustrating a method for manufacturing a storage battery electrode.

Note that as illustrated in FIG. 7, Step S101 described above may be followed by Step S105 that is up to and includes addition of the reducing agent to the first mixture; the third mixture may be reduced (Step S106); after that, the reduced third mixture may be applied to a current collector and dried, so that an active material layer is formed (Step S107).

Figure 8:
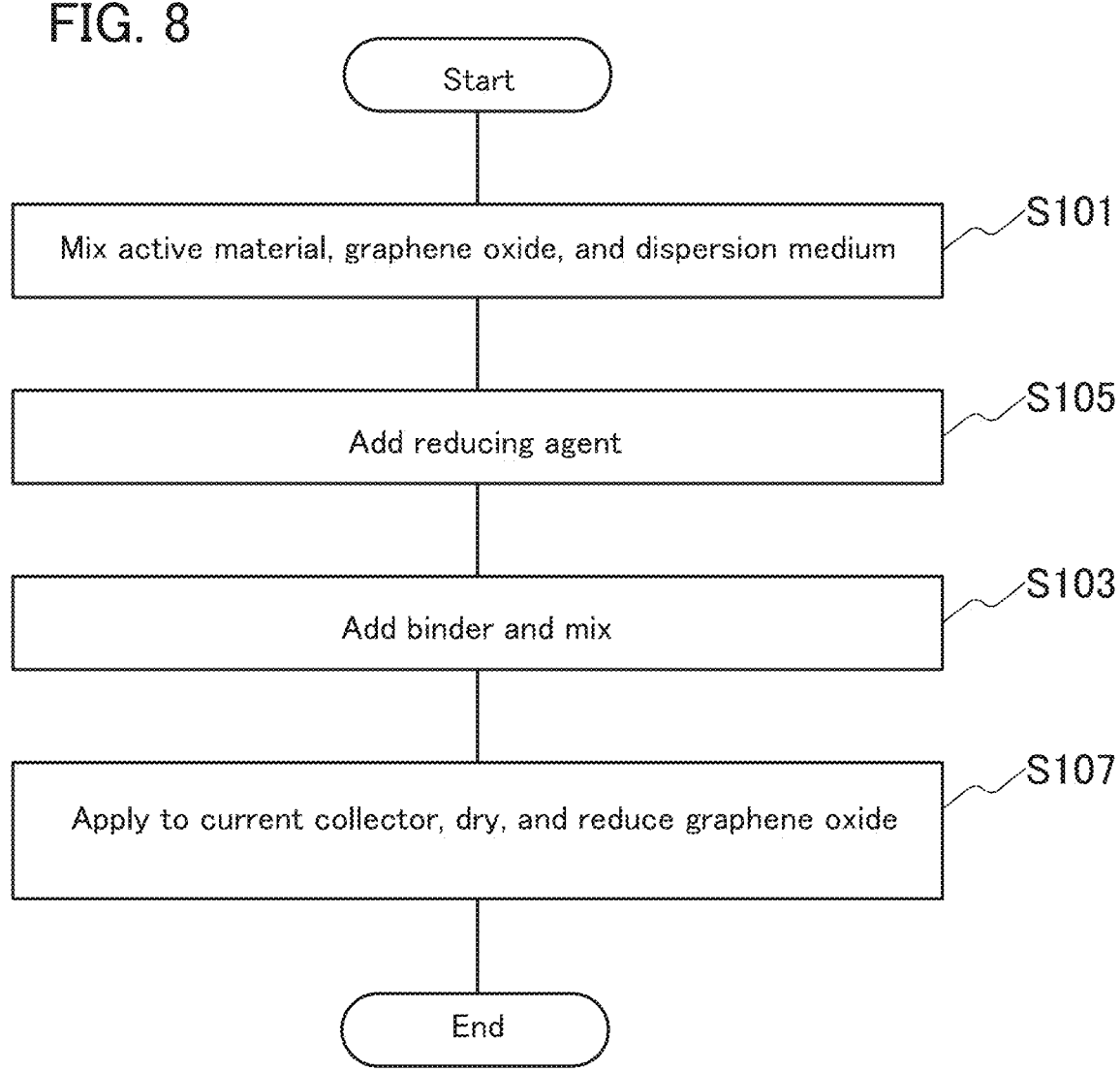
FIG. 8 A flow chart illustrating a method for manufacturing a storage battery electrode.

As illustrated in FIG. 8, it is also possible that Step S101 described above is followed by Step S108 that is up to and includes formation of a second mixture by addition of the reducing agent to the first mixture; after that, a binder is added to the second mixture and kneading is performed, so that the third mixture is formed (Step S109); the third mixture is applied to a current collector and the formed active material layer is reduced (Step S110).

Through the above steps, the electrode 200 including the active material layer 202 in which the graphene 204 is uniformly dispersed in the active material 203 can be fabricated. Note that a step of applying pressure to the electrode 200 may be performed after the drying step.

As described in this embodiment, when a reducing agent is added to a first mixture containing an active material and graphene oxide and heating is performed in a later step, the graphene oxide can be reduced under mild conditions. In addition, the reduction reaction efficiency of the graphene oxide can be increased. Then, the third mixture is fabricated using the second mixture containing graphene and is applied to the current collector and dried; thus, an electrode containing graphene as a conductive additive can be fabricated under mild conditions. In addition, an electrode with a uniform thickness can be fabricated. Furthermore, an electrode with high strength that is hardly damaged by the external impact can be fabricated. Thus, when a storage battery is fabricated by the method for manufacturing an electrode described in this embodiment, cycle characteristics and rate characteristics of the storage battery can be improved. In addition, a method for manufacturing a storage battery can be simplified. Furthermore, a storage battery with high strength that is hardly damaged by, for example, external impact can be fabricated.

This embodiment can be implemented in appropriate combinations with any of the other embodiments.

(Embodiment 5) In this embodiment, a variety of modes of power storage devices according to one embodiment of the present invention will be described.

Figure 11A:
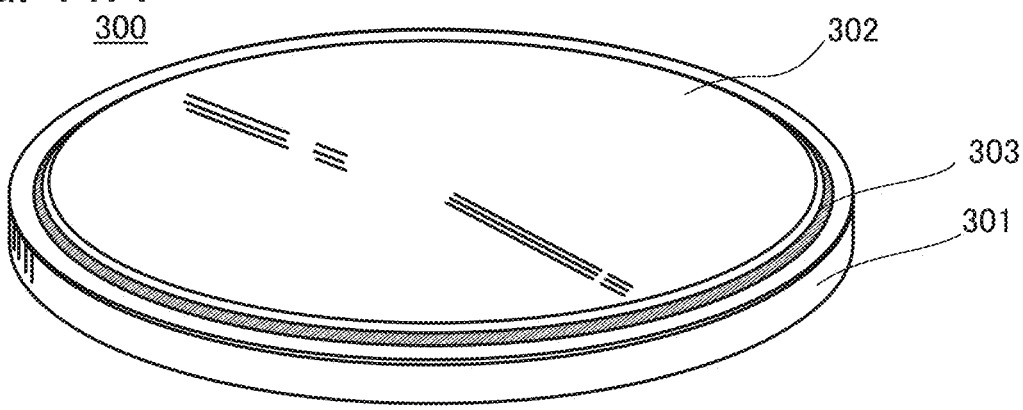
FIGS. 11A-11C Diagrams illustrating a coin-type secondary battery and a cylindrical secondary battery.
Figure 11B:
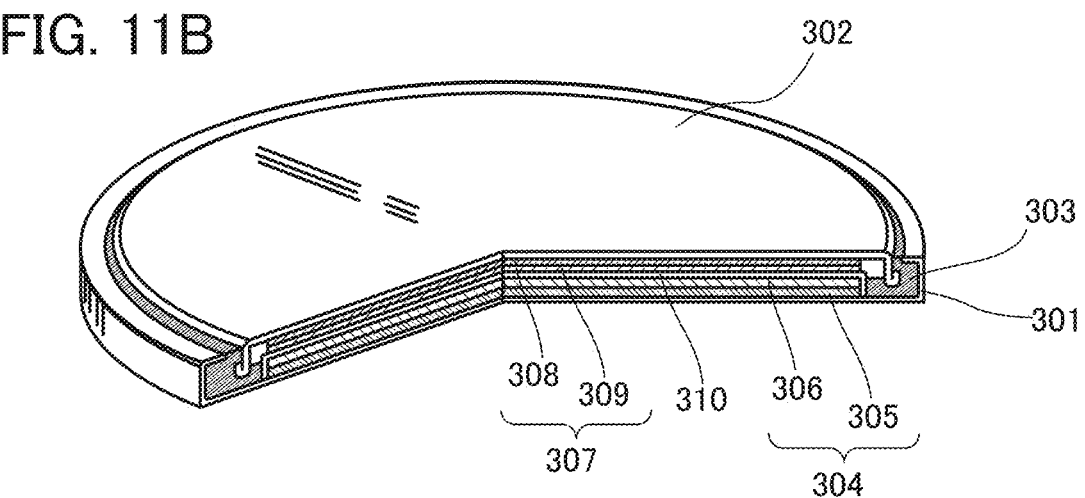

[Coin-type storage battery] FIG. 11(A) is an external view of a coin-type (single-layer flat type) storage battery, and FIG. 11(B) is a cross-sectional view thereof.

In a coin-type storage battery 300, a positive electrode can 301 doubling as a positive electrode terminal and a negative electrode can 302 doubling as a negative electrode terminal are insulated from each other and sealed by a gasket 303 made of polypropylene or the like. A positive electrode 304 is formed by a positive electrode current collector 305 and a positive electrode active material layer 306 provided in contact therewith. The positive electrode active material layer 306 may include a binder for increasing adhesion of a positive electrode active material, a conductive additive for increasing the conductivity of the positive electrode active material layer, and the like in addition to the positive electrode active material. As the conductive additive, as the conductive additive, a material that has a large specific surface area is preferable; acetylene black (AB) or the like can be used. Alternatively, a carbon material such as a carbon nanotube, graphene, or fullerene can be used.

A negative electrode 307 is formed by a negative electrode current collector 308 and a negative electrode active material layer 309 provided in contact therewith. The negative electrode active material layer 309 may further include a binder for increasing adhesion of a negative electrode active material, a conductive additive for increasing the conductivity of the negative electrode active material layer, and the like in addition to the negative electrode active material. A separator 310 and an electrolyte (not illustrated) are provided between the positive electrode active material layer 306 and the negative electrode active material layer 309.

Any of the materials described in Embodiment 1 is used as the negative electrode active material used in the negative electrode active material layer 309. Before a battery is assembled, oxidation and reduction treatments are performed on the negative electrode 307 in an electrolytic solution with the use of the apparatus described in Embodiment 1 or Embodiment 2.

Any of the materials that are described in Embodiment 1 is used for the current collectors such as the positive electrode current collector 305 and the negative electrode current collector 308.

For the positive electrode active material layer 306 and the negative electrode active material layer 309, a material into and from which lithium ions can be inserted and extracted can be used. For example, any of the materials described in Embodiment 1 is used. Before a battery is assembled, oxidation and reduction treatments are performed on the positive electrode 304 in an electrolytic solution with the use of the apparatus described in Embodiment 1.

As the separator 310, an insulator can be used. For example, cellulose (paper), polyethylene with pores, or polypropylene with pores can be used.

For an electrolyte in the electrolytic solution, a material containing carrier ions is used. Typical examples of the electrolyte include lithium salts such as $LiPF_6$, $LiClO_4$, $LiAsF_6$, $LiBF_4$, $LiCF_3SO_3$, $Li(CF_3SO_2)_2N$, and $Li(C_2F_5SO_2)_2N$. One of these electrolytes may be used alone, or two or more of them may be used in an appropriate combination and in an appropriate ratio.

Note that when carrier ions are alkali metal ions other than lithium ions, or alkaline-earth metal ions, instead of lithium in the above lithium salts, an alkali metal (e.g., sodium or potassium), an alkaline-earth metal (e.g., calcium, strontium, barium, beryllium, or magnesium) may be used for the electrolyte.

For a solvent of the electrolytic solution, a material having carrier ion transferability is used. As the solvent of the electrolytic solution, an aprotic organic solvent is preferable. Typical examples of aprotic organic solvents include ethylene carbonate (EC), propylene carbonate, dimethyl carbonate, diethyl carbonate (DEC), γ-butyrolactone, acetonitrile, dimethoxyethane, tetrahydrofuran, and the like, and one or more of these materials can be used. When a gelled polymeric material is used for the solvent of the electrolytic solution, safety against liquid leakage and the like is improved. Furthermore, the storage battery can be thinner and more lightweight. Typical examples of gelled polymeric materials include a silicone gel, a polyacrylate gel, a polymethacrylate gel, a polyacrylonitrile gel, polyethylene oxide, polypropylene oxide, and a fluorine-based polymer. Alternatively, the use of one or more of ionic liquids (room temperature molten salts) which have features of non-flammability and non-volatility for the solvent of the electrolytic solution can prevent the storage battery from exploding or catching fire even when the storage battery internally shorts out or the internal temperature increases because of overcharging and the like.

For the positive electrode can 301 and the negative electrode can 302, a metal having a corrosion-resistant property to an electrolytic solution, such as nickel, aluminum, or titanium, an alloy thereof, or an alloy thereof with another metal (e.g., stainless steel) can be used. In addition, covering with nickel, aluminum, or the like is preferable in order to prevent corrosion due to the electrolytic solution. The positive electrode can 301 and the negative electrode can 302 are electrically connected to the positive electrode 304 and the negative electrode 307, respectively.

The negative electrode 307, the positive electrode 304, and the separator 310 are immersed in the electrolytic solution. Then, as illustrated in FIG. 11(B), the positive electrode 304, the separator 310, the negative electrode 307, and the negative electrode can 302 are stacked in this order with the positive electrode can 301 positioned at the bottom, and the positive electrode can 301 and the negative electrode can 302 are subjected to pressure bonding with the gasket 303 interposed therebetween. In such a manner, the coin-type storage battery 300 is manufactured.

Figure 11C:
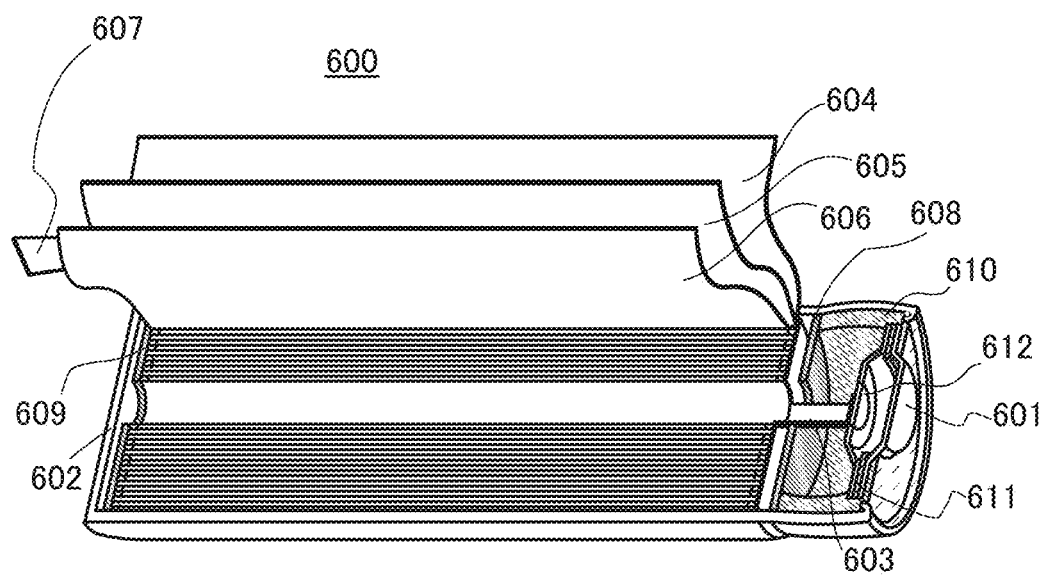

FIG. 11(C) illustrates an example of a cylindrical storage battery. FIG. 11(C) is a schematic cross-sectional view of the cylindrical storage battery 600. The cylindrical storage battery 600 includes a positive electrode cap (battery lid) 601 and a battery can (exterior can) 602. The positive electrode cap 601 and the battery can (exterior can) 602 are insulated from each other by a gasket (insulating packing) 610.

Inside the battery can 602 having a hollow cylindrical shape, a battery element in which a positive electrode 604 and a negative electrode 606 which are like strips are wound with a separator 605 interposed therebetween is provided. Although not illustrated, the battery element is wound around a center pin. One end of the battery can 602 is close and the other end thereof is open. For the battery can 602, a metal having a corrosion-resistant property to an electrolytic solution, such as nickel, aluminum, or titanium, an alloy thereof, or an alloy thereof with another metal (e.g., stainless steel or the like) can be used. In addition, covering with nickel, aluminum, or the like is preferable in order to prevent corrosion due to the electrolytic solution. Inside the battery can 602, the battery element in which the positive electrode, the negative electrode, and the separator are wound is provided between a pair of insulating plates 608 and 609 that face each other. Furthermore, a nonaqueous electrolytic solution (not illustrated) is injected inside the battery can 602 provided with the battery element. As the nonaqueous electrolytic solution, one that is similar to those of the coin-type storage battery and a laminate storage battery can be used.

Although the positive electrode 604 and the negative electrode 606 can be manufactured in a manner similar to that of the positive electrode and the negative electrode of the coin-type storage battery described above, the difference lies in that, since the positive electrode and the negative electrode used in the cylindrical storage battery 600 are wound, active materials are formed on both sides of the current collectors. A positive electrode terminal (positive electrode current collecting lead) 603 is connected to the positive electrode 604, and a negative electrode terminal (negative electrode current collecting lead) 607 is connected to the negative electrode 606. For both the positive electrode terminal 603 and the negative electrode terminal 607, a metal material such as aluminum can be used. The positive electrode terminal 603 and the negative electrode terminal 607 are resistance-welded to a safety valve mechanism 612 and the bottom of the battery can 602, respectively. The safety valve mechanism 612 is electrically connected to the positive electrode cap 601 through a PTC element (Positive Temperature Coefficient) 611. The safety valve mechanism 612 cuts off electrical connection between the positive electrode cap 601 and the positive electrode 604 when the increased internal pressure of the battery exceeds a predetermined threshold value. The PTC element 611, which serves as a thermally sensitive resistor whose resistance increases as temperature rises, limits the amount of current by increasing the resistance, in order to prevent abnormal heat generation. Barium titanate ($BaTiO_3$)-based semiconductor ceramic or the like can be used for the PTC element.

Note that in this embodiment, the coin-type and cylindrical storage batteries are described as the storage battery; however, any of other storage batteries with a variety of shapes, such as a sealed storage battery and a square-type storage battery, can be used. Furthermore, a structure in which a plurality of positive electrodes, a plurality of negative electrodes, and a plurality of separators are stacked or a structure in which a positive electrode, a negative electrode, and a separator are wound may be employed.

Figure 12:
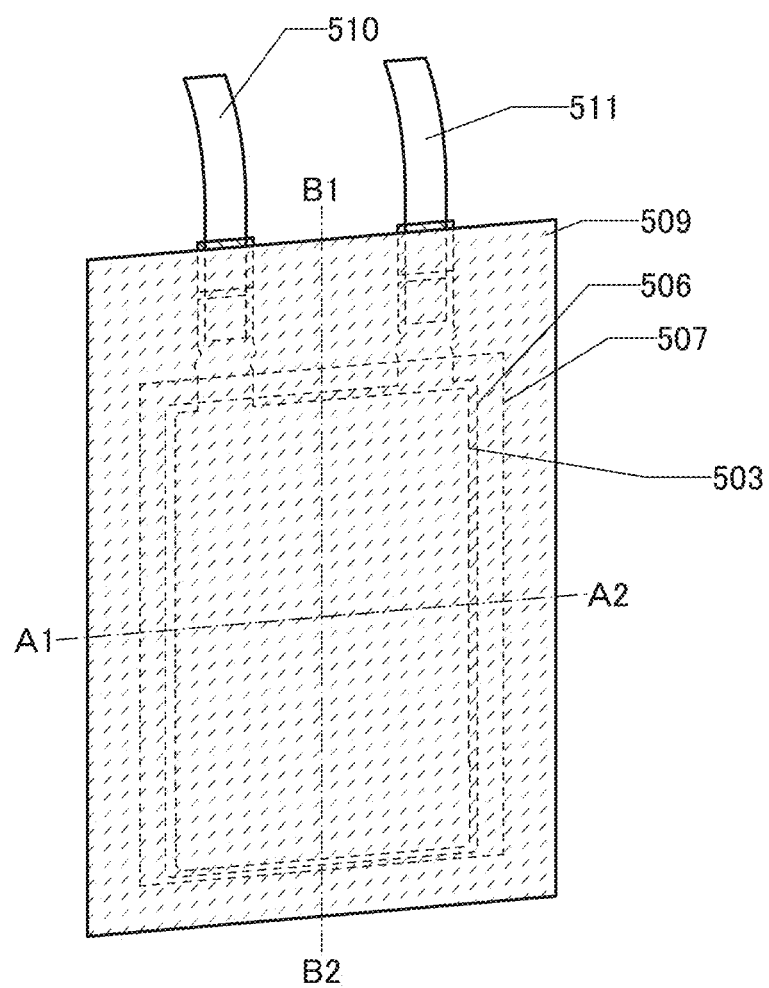
FIG. 12 A diagram illustrating a thin storage battery.

[Thin storage battery] FIG. 12 illustrates a thin storage battery as an example of a power storage device. FIG. 12 illustrates an example of a thin storage battery. When the thin storage battery has flexibility and is mounted in an electronic device at least part of which is flexible, the storage battery can be bent as the electronic device is changed in shape.

Figure 13A:
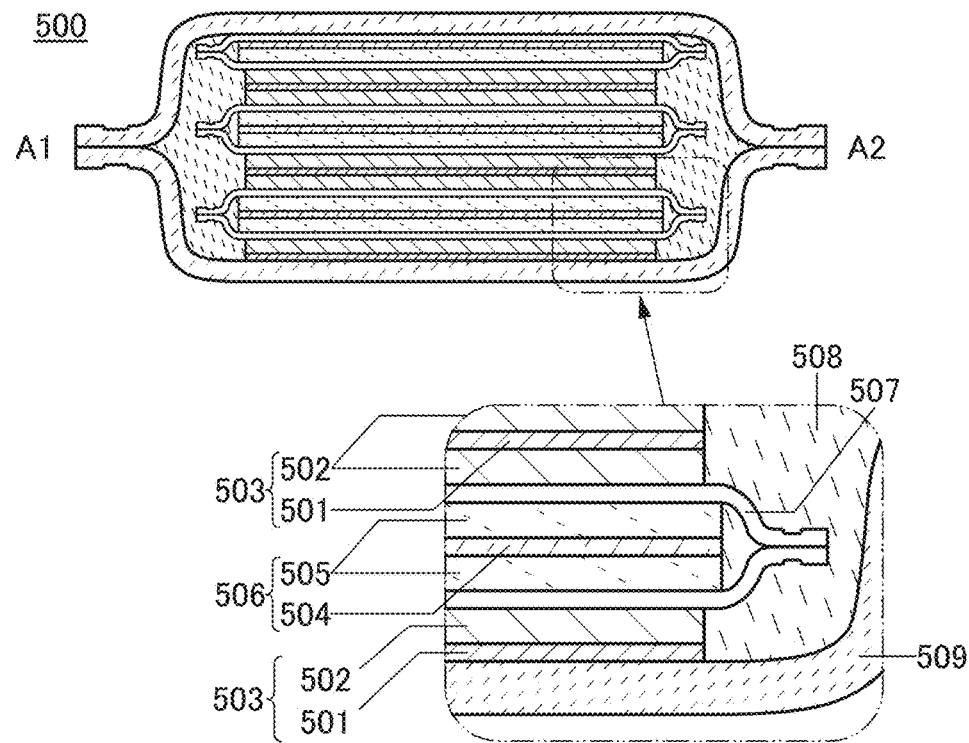
FIGS. 13A-13B Diagrams illustrating cross-sectional views of electrodes.
Figure 13B:
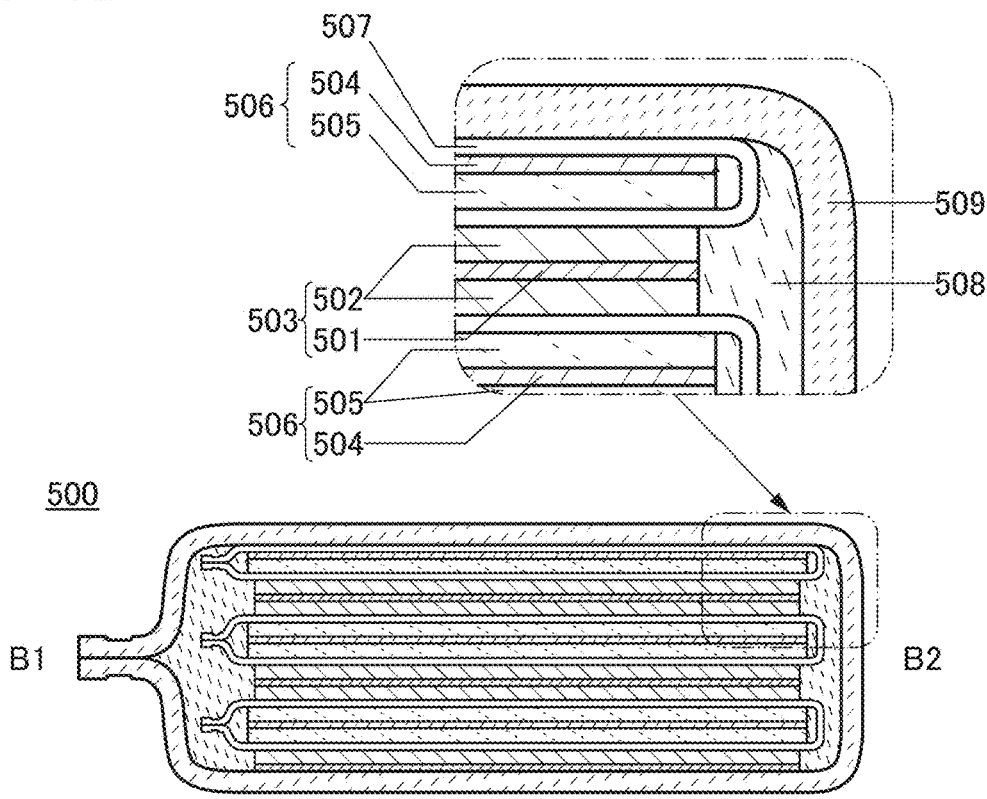

FIG. 12 is an external view of a thin storage battery 500. FIG. 13(A) and FIG. 13(B) show an A1-A2 cross section and a B1-B2 cross section indicated by dashed-dotted lines in FIG. 12. The thin storage battery 500 includes a positive electrode 503 including a positive electrode current collector 501 and a positive electrode active material layer 502, a negative electrode 506 including a negative electrode current collector 504 and a negative electrode active material layer 505, a separator 507, an electrolytic solution 508, and an exterior body 509. The separator 507 is placed between the positive electrode 503 and the negative electrode 506, which are provided inside the exterior body 509. The inside of the exterior body 509 is filled with the electrolytic solution 508.

The electrode of one embodiment of the present invention is used as at least one of the positive electrode 503 and the negative electrode 506. The electrode of one embodiment of the present invention may be used as both the positive electrode 503 and the negative electrode 506.

First, a structure of the positive electrode 503 will be described. The electrode of one embodiment of the present invention is preferably used as the positive electrode 503. Here, an example of using the electrode described in Embodiment 1 as the positive electrode 503 will be described.

For the electrolytic solution 508 and the separator 507, the materials described in Embodiment 1 can be used.

Figure 14A:
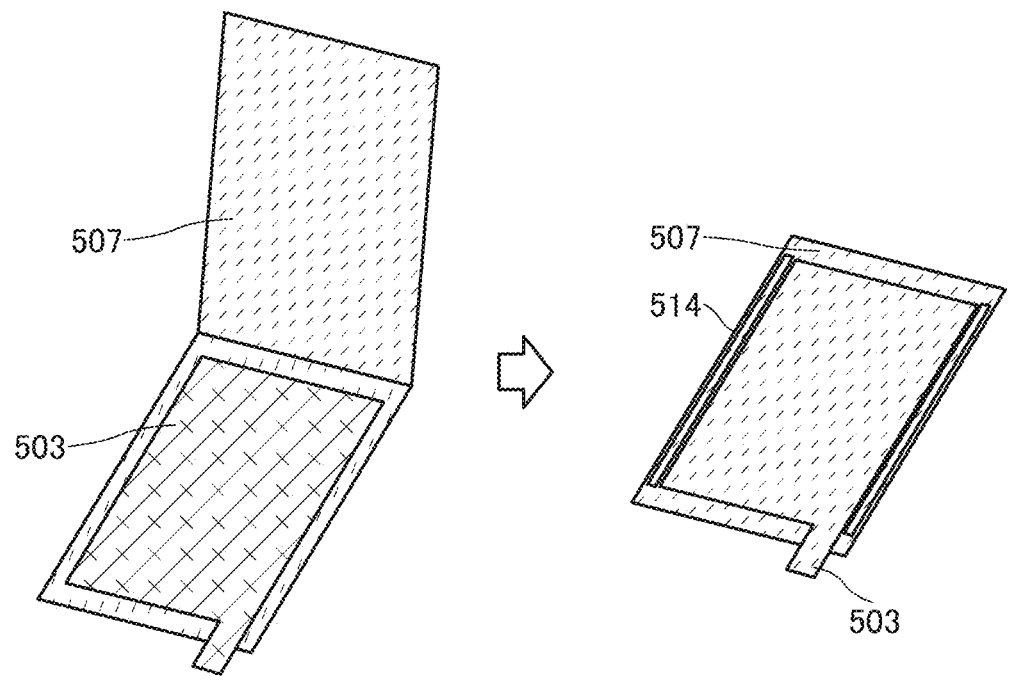
FIGS. 14A-14B Diagrams illustrating a thin storage battery.
Figure 14B:
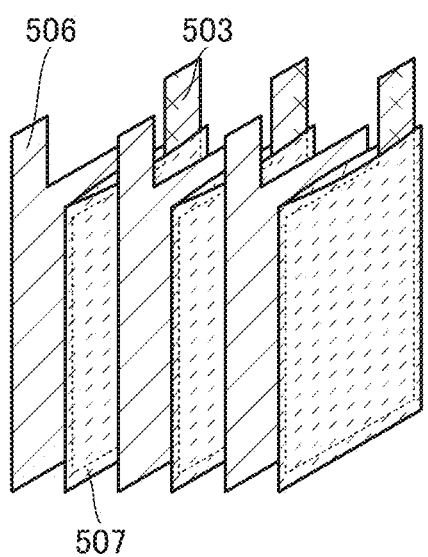

The separator 507 is preferably processed into a bag-like shape and placed to surround one of the positive electrode 503 and the negative electrode 506. For example, as illustrated in FIG. 14(A), the separator 507 is folded in two so that the positive electrode 503 is sandwiched, and sealed with a sealing portion 514 in a region outside the region overlapping with the positive electrode 503; thus, the positive electrode 503 can be reliably supported inside the separator 507. Then, as illustrated in FIG. 14(B), the positive electrodes 503 surrounded by the separators 507 and the negative electrodes 506 are alternately stacked and placed in the exterior body 509, whereby the thin storage battery 500 can be formed.

Described here is an example in which a particle containing the lithium-manganese complex oxide described in Embodiment 1 is used as the positive electrode active material, the electrode described in Embodiment 1 is used as the positive electrode 503, and an active material containing silicon is used as the negative electrode active material.

The capacity of the active material containing silicon, such as silicon or SiO, per weight and volume of the active material is high, and accordingly, capacity per weight and volume of the storage battery can be increased.

Figure 15A:
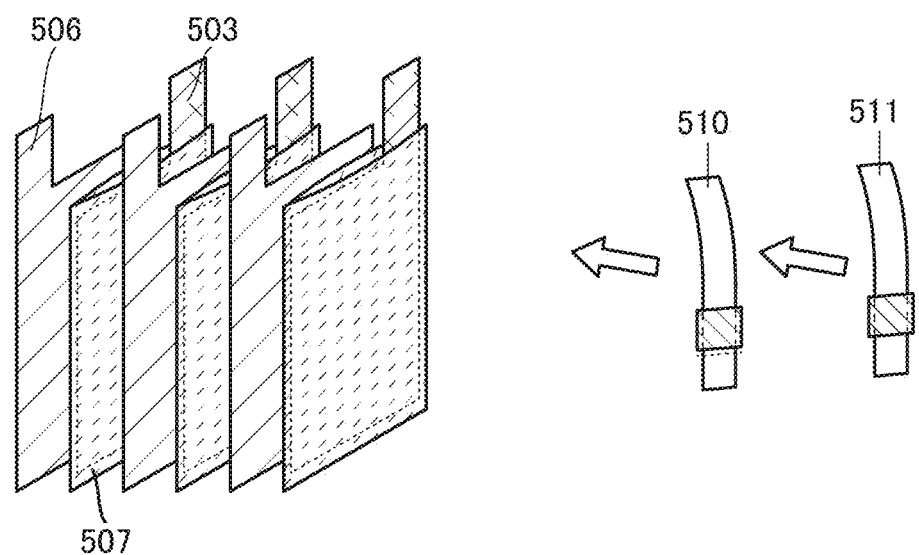
FIGS. 15A-15B Diagrams illustrating a thin storage battery.
Figure 15B:
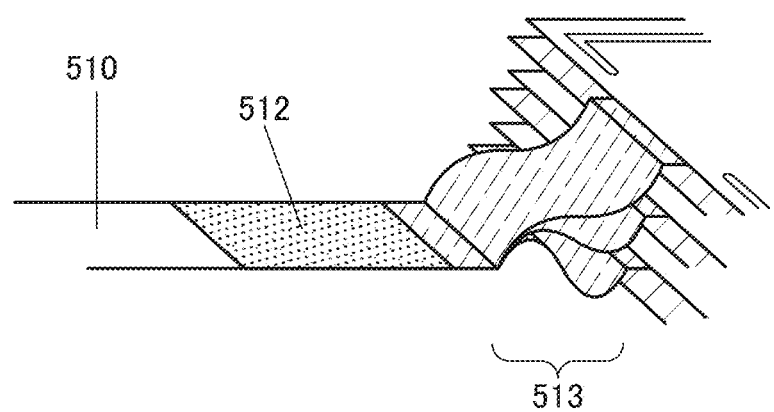

FIG. 15(B) illustrates an example in which a current collector is welded to a lead electrode. An example in which the positive electrode current collector 501 is welded to a positive electrode lead electrode 510 is illustrated as one example. The positive electrode current collector 501 is welded to the positive electrode lead electrode 510 in a welding region 512 by ultrasonic welding or the like. The positive electrode current collector 501 includes a curve portion 513 illustrated in FIG. 15(B), and it is therefore possible to relieve stress due to external force applied after fabrication of the storage battery 500. Thus, the storage battery 500 can have high reliability.

In the thin storage battery 500 illustrated in FIG. 12 and FIG. 13, the positive electrode current collectors 501 and the negative electrode current collectors 504 are ultrasonic-welded to the positive electrode lead electrode 510 and a negative electrode lead electrode 511 and the positive electrode lead electrode 510 and the negative electrode lead electrode 511 are exposed to the outside. The positive electrode current collector 501 and the negative electrode current collector 504 can double as terminals for obtaining electrical contact with the outside. In that case, the positive electrode current collector 501 and the negative electrode current collector 504 may be placed so that parts thereof are exposed to the outside of the exterior body 509 without using lead electrodes.

Figure 16:
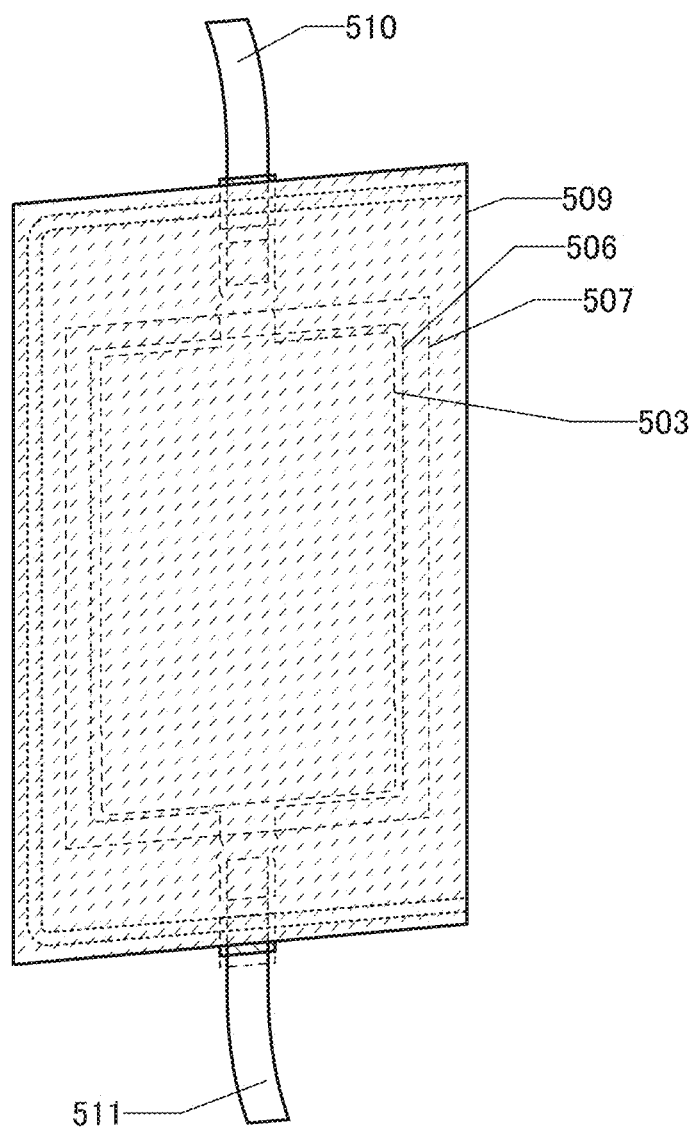
FIG. 16 A diagram illustrating a thin storage battery.

Although the positive electrode lead electrode 510 and the negative electrode lead electrode 511 are placed on the same side in FIG. 12, the positive electrode lead electrode 510 and the negative electrode lead electrode 511 may be placed on different sides as illustrated in FIG. 16. The lead electrodes of a storage battery of one embodiment of the present invention can be freely placed as described above; therefore, the degree of freedom in design is high. Accordingly, a product including a storage battery of one embodiment of the present invention can have a high degree of freedom in design. Furthermore, a producibility of products including a storage battery of one embodiment of the present invention can be increased.

As the exterior body 509 in the thin storage battery 500, for example, a film having a three-layer structure in which a highly flexible metal thin film of aluminum, stainless steel, copper, nickel, or the like is provided over a film formed of a material such as polyethylene, polypropylene, polycarbonate, ionomer, or polyamide, and an insulating synthetic resin film of a polyamide-based resin, a polyester-based resin, or the like is provided as the outer surface of the exterior body over the metal thin film can be used.

In the example in FIG. 12, the number of pairs of positive and negative electrodes facing each other is five; it is needless to say that pairs of electrodes are not limited to five pairs, and may be more than or less than that. In the case of using a large number of electrode layers, the storage battery can have high capacity. In the case of using a small number of electrode layers, the storage battery can have a small thickness and high flexibility.

In the above structure, the exterior body 509 of the storage battery 500 can be bent with a radius of curvature of less than or equal to 30 mm or a radius of curvature of less than or equal to 10 mm. One or two films are used as the exterior body of the storage battery 500. In the case where the storage battery has a layered structure, the battery has a cross-sectional structure that is sandwiched by two curved lines of the films when it is curved.

Figure 17A:
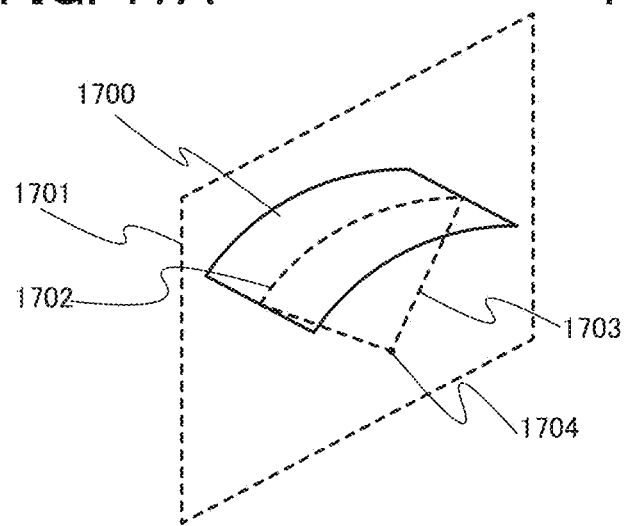
FIGS. 17A-17C Diagrams illustrating a radius of curvature of a surface.
Figure 17B:
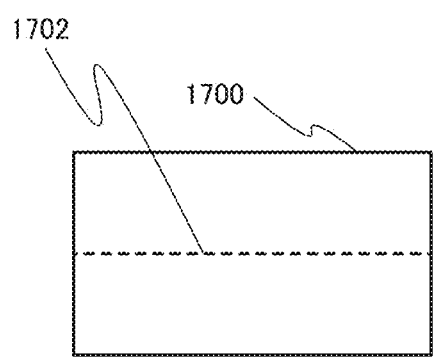
Figure 17C:
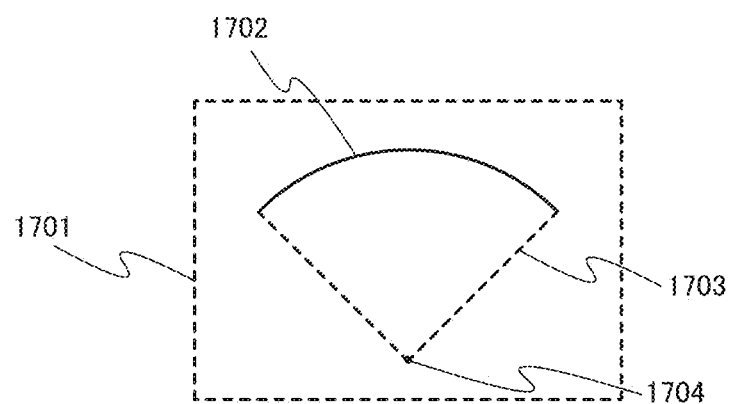

Description is given of the radius of curvature of a surface with reference to FIG. 17. In FIG. 17(A), on a plane 1701 along which a curved surface 1700 is cut, part of a curve 1702 in the shape of the curved surface is approximate to an arc of a circle, and the radius of the circle is referred to as a radius 1703 of curvature and the center of the circle is referred to as a center 1704 of curvature. FIG. 17(B) is a top view of the curved surface 1700. FIG. 17(C) is a cross-sectional view of the curved surface 1700 taken along the plane 1701. When a curved surface is cut by a plane, the radius of curvature of a curve that appears in a cross section differs depending on the angle of the plane to the curved surface or on the cut position, and the smallest radius of curvature is defined as the radius of curvature of a surface in this specification and the like.

Figure 18A:
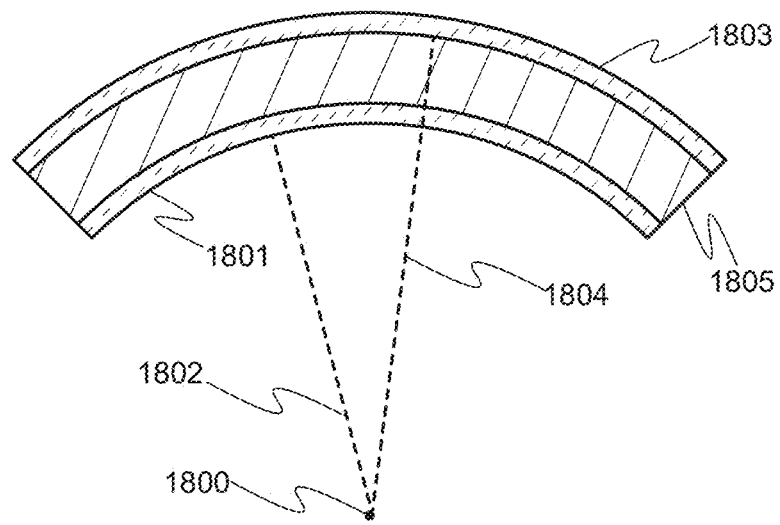
FIGS. 18A-18D Diagrams illustrating a radius of curvature of a film.
Figure 18B:
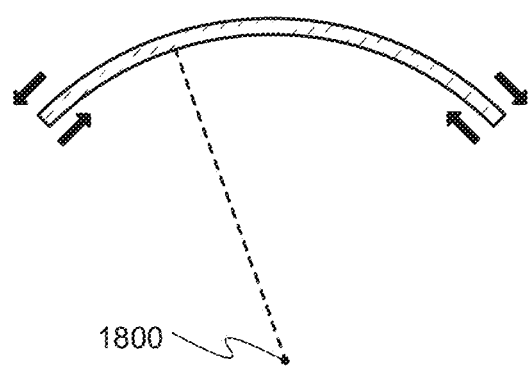

In the case of curving the storage battery 500 in which electrodes, an electrolytic solution, and the like 1805 are sandwiched between two films as an exterior body, a radius 1802 of curvature of a film 1801 on the side closer to a center 1800 of curvature of the storage battery 500 is smaller than a radius 1804 of curvature of a film 1803 on the side farther from the center 1800 of curvature (FIG. 18(A)). When the storage battery 500 is curved and has an arc-shaped cross section, compressive stress is applied to a surface of the film closer to the center 1800 of curvature and tensile stress is applied to a surface of the film farther from the center 1800 of curvature (FIG. 18(B)). By forming a pattern formed by projections or depressions on surfaces of the exterior body, the influence of a strain can be reduced to an allowable range even when compressive stress and tensile stress are applied as described above. For this reason, the storage battery 500 can change its shape within the range where the exterior body has a radius of curvature of 10 mm or more, preferably 30 mm or more, on the side closer to the center of curvature.

Figure 18C:
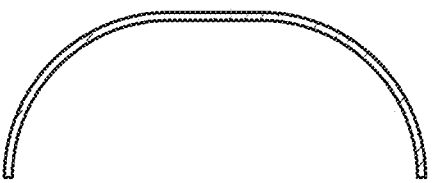
Figure 18D:
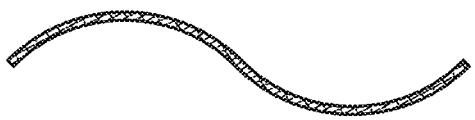

Note that the cross-sectional shape of the storage battery 500 is not limited to a simple arc shape and can be partly arc-shaped; for example, a shape illustrated in FIG. 18(C), a wavy shape (FIG. 18(D)), an S shape, or the like can be used. When the curved surface of the storage battery has a shape with a plurality of centers of curvature, the secondary battery can change its shape within the range where a curved surface with the smallest radius of curvature among radii of curvature with respect to the plurality of centers of curvature, which is a surface of one of the two exterior bodies on the side closer to the center of curvature, has a radius of curvature of 10 mm or more, preferably 30 mm or more.

Figure 19A:
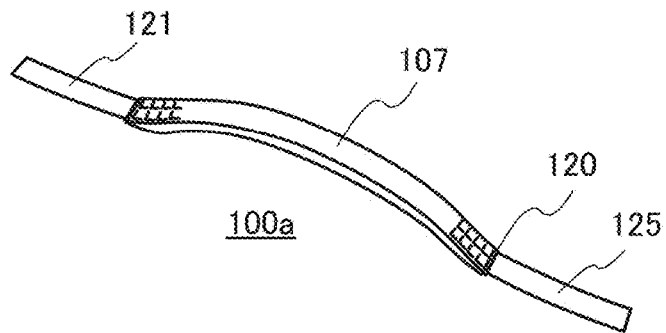
FIGS. 19A-19C A perspective view, a top view, and a cross-sectional view illustrating a structure example of a secondary battery.
Figure 19B:
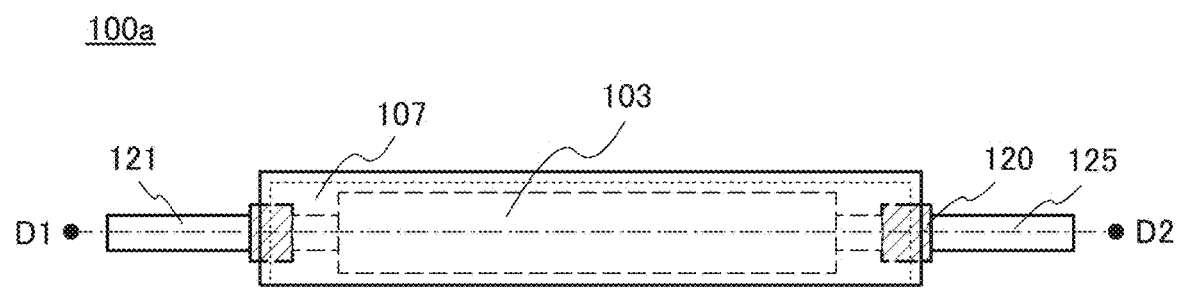
Figure 19C:
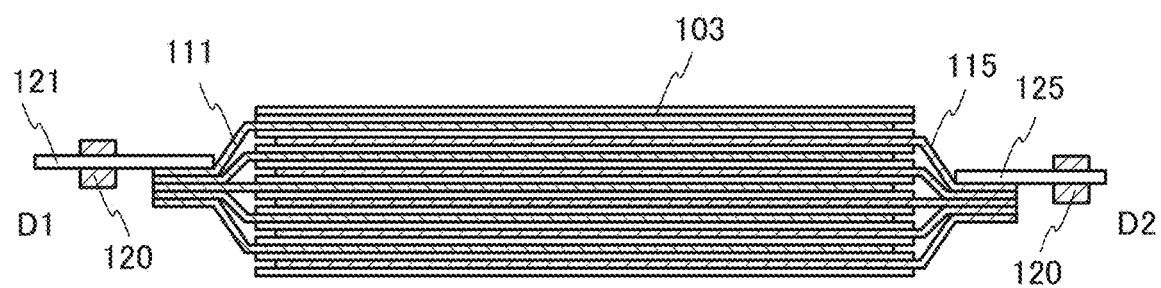

[Thin storage battery 2] FIG. 19 illustrates a storage battery 100a, which is an example of a thin storage battery different from FIG. 12. FIG. 19(A) is a perspective view of the storage battery 100a, and FIG. 19(B) is a top view of the storage battery 100a. FIG. 19(C) is a cross-sectional view taken along dashed-dotted line D1-D2 in FIG. 19(B). Note that in FIG. 19(C), a positive electrode 111, a negative electrode 115, a separator 103, a positive electrode lead 121, a negative electrode lead 125, and a sealing layer 120 are selectively illustrated for the sake of clarity.

Here, part of a method for fabricating the storage battery 100a illustrated in FIG. 19 will be described with reference to FIG. 20.

Figure 20A:
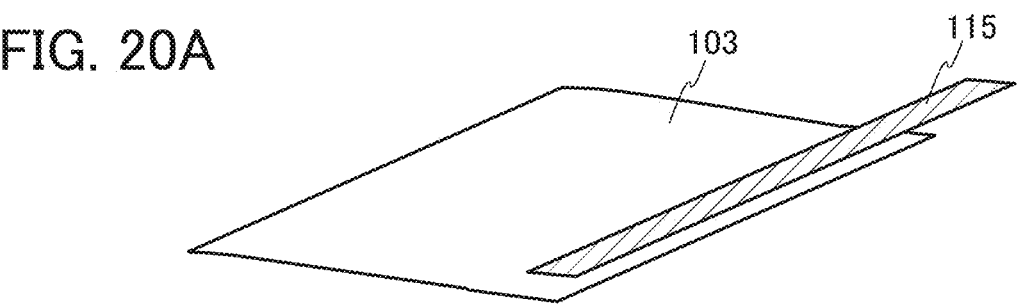
FIGS. 20A-20D Diagrams illustrating an example of a method for fabricating a secondary battery.

First, the negative electrode 115 is positioned over the separator 103 (FIG. 20(A)). At this time, a negative electrode active material layer included in the negative electrode 115 is positioned so as to overlap with the separator 103.

Then, the separator 103 is folded such that the separator 103 is positioned over the negative electrode 115. Next, the positive electrode 111 is positioned over the separator 103 (FIG. 20(B)). At this time, a positive electrode active material layer included in the positive electrode 111 is positioned so as to overlap with the separator 103 and the negative electrode active material layer. Note that in the case where an electrode in which an active material layer is formed on one side of a current collector is used, the positive electrode active material layer of the positive electrode 111 and the negative electrode active material layer of the negative electrode 115 are positioned so as to face each other with the separator 103 therebetween.

Figure 20B:
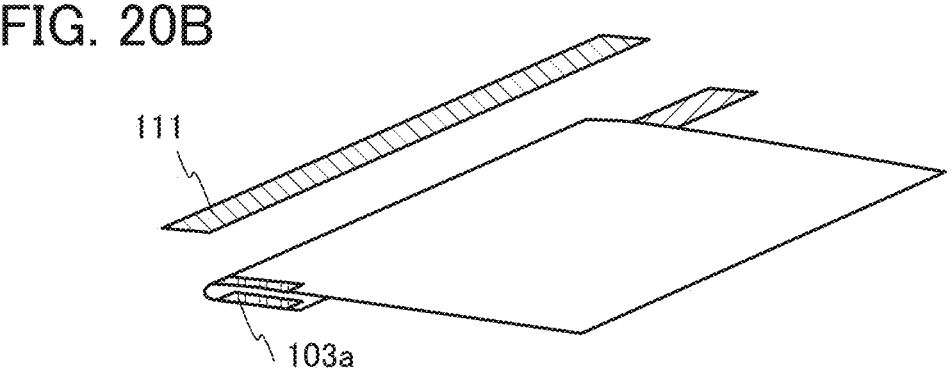

In the case where a material that can be thermally welded, such as polypropylene, is used for the separator 103, a region where the separator 103 overlap with itself is thermally welded and then another electrode is positioned thereover, whereby the slippage of the electrode in the fabrication process can be prevented. Specifically, a region which does not overlap with the negative electrode 115 or the positive electrode 111 and in which the separator 103 overlaps with itself, e.g., a region indicated as a region 103a in FIG. 20(B), is preferably thermally welded.

Figure 20C:
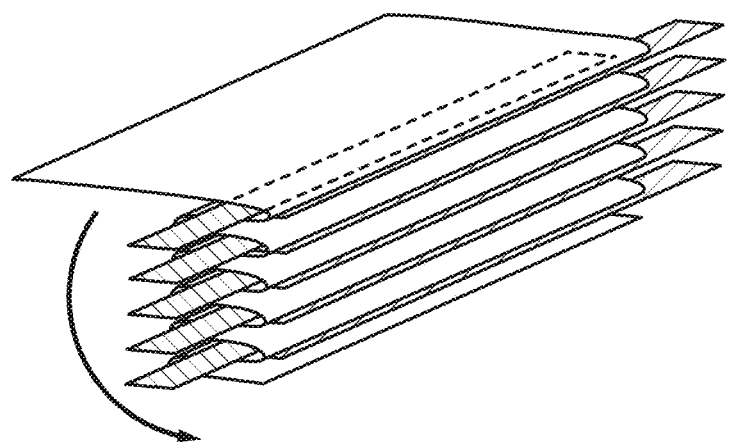

By repeating the above steps, the positive electrodes 111 and the negative electrodes 115 can overlap with each other with the separator 103 provided therebetween as illustrated in FIG. 20(C).

Note that a plurality of positive electrodes 111 and a plurality of negative electrodes 115 may be placed to be alternately sandwiched by the separator 103 that is repeatedly folded in advance.

Next, as illustrated in FIG. 20(C), the positive electrodes 111 and the negative electrodes 115 are covered with the separator 103.

Figure 20D:
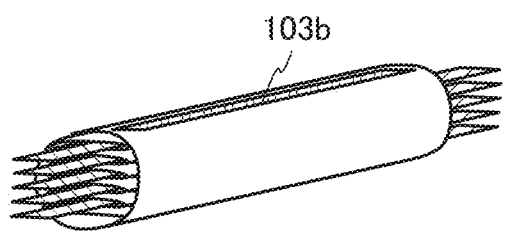

Furthermore, as illustrated in FIG. 20(D), a region where the separator 103 overlaps with itself, e.g., a region 103b illustrated in FIG. 20(D), is thermally welded, whereby the positive electrodes 111 and the negative electrodes 115 are covered with the separator 103 to be bound.

Note that the positive electrodes 111, the negative electrodes 115, and the separator 103 may be bound with a binding material.

Since the positive electrodes 111 and the negative electrodes 115 are stacked through the above steps, one separator 103 has regions sandwiched between the positive electrodes 111 and the negative electrodes 115 and a region positioned so as to cover the positive electrodes 111 and the negative electrodes 115.

In other words, the separator 103 included in the storage battery 100a in FIG. 13 is a single separator which is partly folded. In the folded regions of the separator 103, the positive electrodes 111 and the negative electrodes 115 are interposed.

The description in Embodiment 1 can be referred to for, in the storage battery 100a, bonding regions of an exterior body 107, the shapes of the positive electrodes 111, the negative electrodes 115, the separator 103, and the exterior body 107, and the structures, except the positions and shapes, of the positive electrode lead 121 and the negative electrode lead 125. The fabrication method described in Embodiment 1 can be referred to for the method for fabricating the storage battery 100a other than the steps of stacking the positive electrodes 111 and the negative electrodes 115.

[Thin storage battery 3] FIG. 21 illustrates a storage battery 100b, which is an example of a thin storage battery different from FIG. 19. FIG. 21(A) is a perspective view of the storage battery 100b, and FIG. 21(B) is a top view of the storage battery 100b. FIG. 21(C1) is a cross-sectional view of a first electrode assembly 130, and FIG. 21(C2) is that of a second electrode assembly 131. FIG. 21(D) is a cross-sectional view taken along dashed-dotted line E1-E2 in FIG. 21(B). Note that in FIG. 21(D), the first electrode assembly 130, the electrode assembly 131, and a separator 103 are selectively illustrated for the sake of clarity.

The storage battery 100b illustrated in FIG. 21 is different from the storage battery 100a in FIG. 13 in the positions of the positive electrodes 111 and the negative electrodes 115, and the position of the separator 103.

Figure 21A:
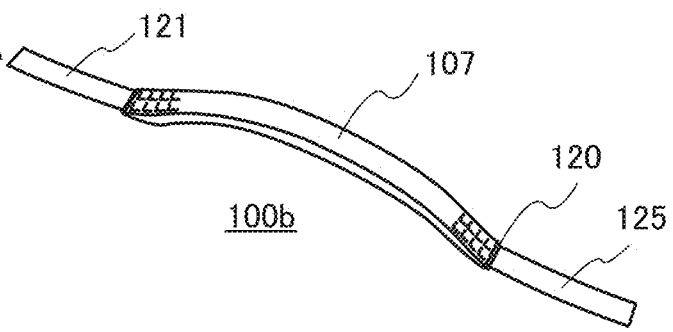
Figure 21B:
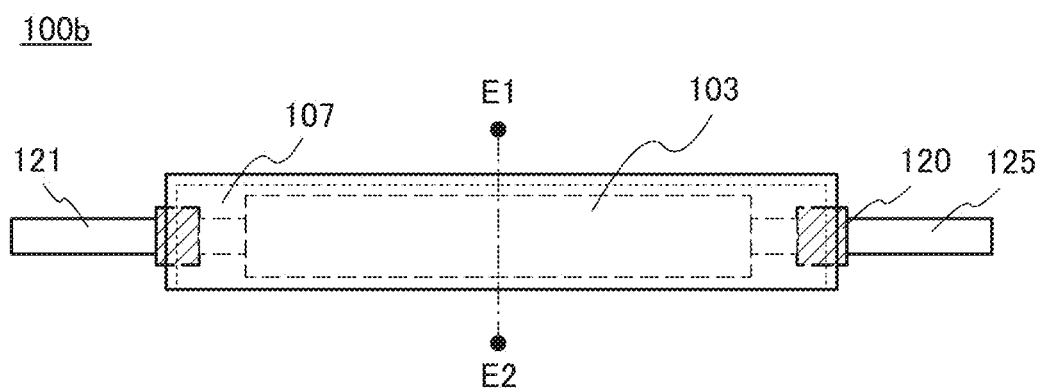
Figure 21B:
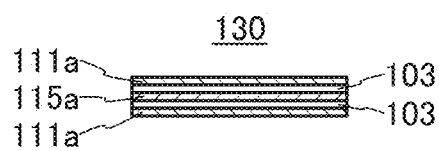
Figure 21B:
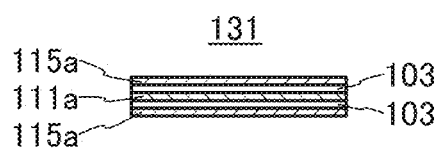
Figure 21D:
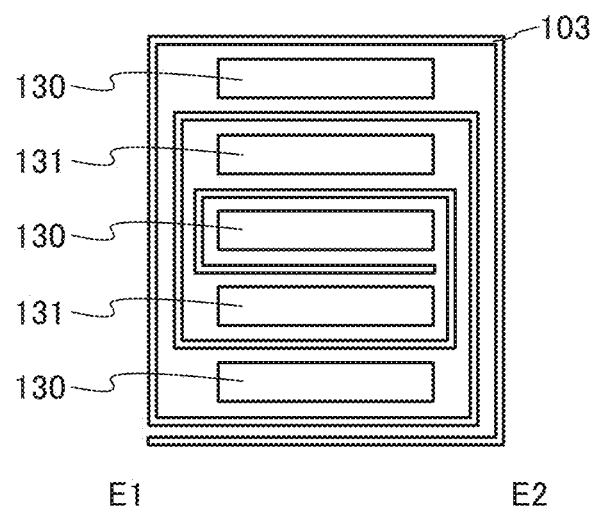

As illustrated in FIG. 21(D), the storage battery 100b includes a plurality of first electrode assemblies 130 and a plurality of electrode assemblies 131.

As illustrated in FIG. 21(C1), in the first electrode assembly 130, a positive electrode 111a including positive electrode active material layers on both sides of a positive electrode current collector, the separator 103, a negative electrode 115a including negative electrode active material layers on both sides of a negative electrode current collector, the separator 103, and a positive electrode 111a including positive electrode active material layers on both sides of a positive electrode current collector are stacked in this order. As illustrated in FIG. 21(C2), in the second electrode assembly 131, a negative electrode 115a including negative electrode active material layers on both sides of a negative electrode current collector, the separator 103, a positive electrode 111a including positive electrode active material layers on both sides of a positive electrode current collector, the separator 103, and a negative electrode 115a including negative electrode active material layers on both sides of a negative electrode current collector are stacked in this order.

Furthermore, as illustrated in FIG. 21(D), the first electrode assemblies 130 and the electrode assemblies 131 are covered with the wound separator 103.

Here, part of a method for fabricating the storage battery 100b illustrated in FIG. 21 will be described with reference to FIG. 22.

Figure 22A:
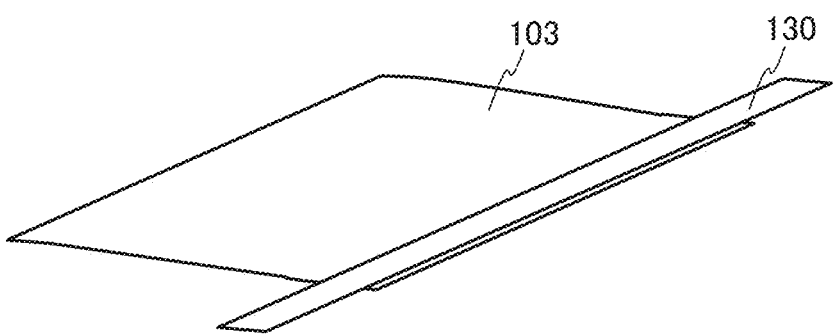
FIGS. 22A-22D Diagrams illustrating an example of a method for fabricating a secondary battery.
Figure 22B:
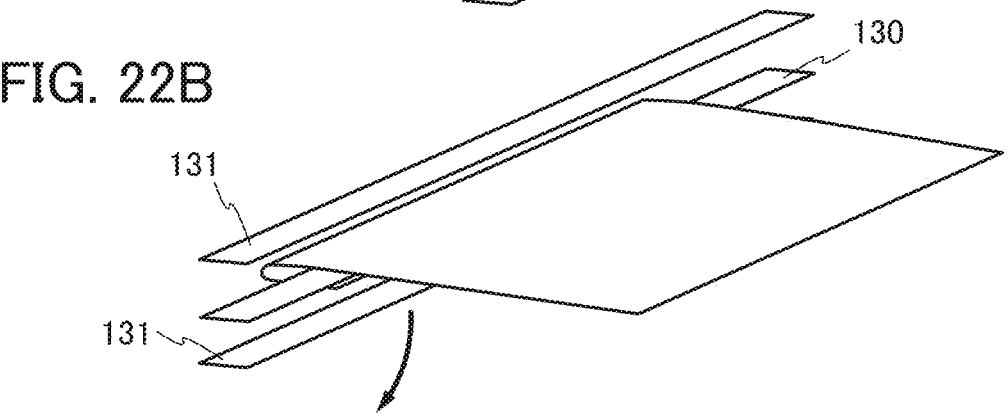
Figure 22C:
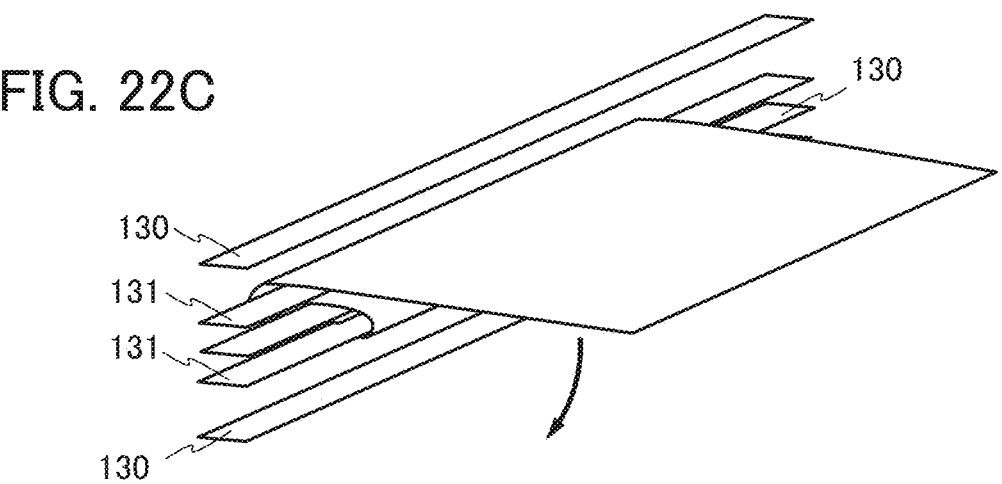

First, the first electrode assembly 130 is positioned over the separator 103 (FIG. 22(A)).

Then, the separator 103 is folded such that the separator 103 is positioned over the first electrode assembly 130. Next, two pairs of second electrode assemblies 131 are positioned over and under the first electrode assembly 130 with the separator 103 therebetween (FIG. 22(B)).

Then, the separator 103 is wound so as to cover the two pairs of second electrode assemblies 131. Furthermore, two pairs of first electrode assemblies 130 are positioned over and under the two pairs of second electrode assemblies 131 with the separator 103 therebetween (FIG. 22(C)).

Figure 22D:
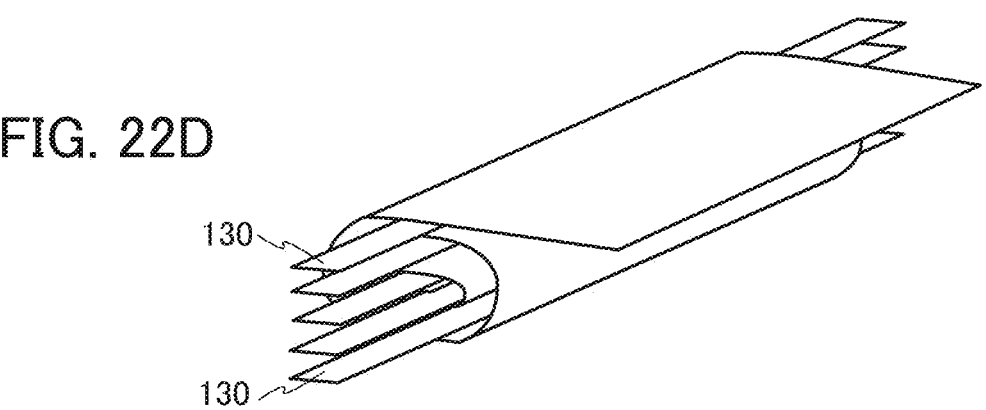

Then, the separator 103 is wound so as to cover the two pairs of first electrode assemblies 130 (FIG. 22(D)).

Since the first electrode assemblies 130 and the electrode assemblies 131 are stacked through the above steps, these electrode assemblies are positioned between the separator 103 that is spirally wound.

Note that it is preferable that the positive electrode 111a of the electrode assembly 130 that is positioned on the outermost side not include the positive electrode active material layer on the outer side.

FIGS. 21(C1) and (C2) illustrate a structure in which the electrode assembly includes three electrodes and two separators; however, one embodiment of the present invention is not limited thereto. A structure including four or more electrodes and three or more separators may be employed. By increasing electrodes, the capacity of the storage battery 100b can be further improved. A structure including two electrodes and one separator may also be employed. In the case where electrodes are few, the storage battery 100b can have higher resistance to curving. FIG. 21(D) illustrates a structure in which the storage battery 100b includes three pairs of first electrode assemblies 130 and two pairs of second electrode assemblies; however, one embodiment of the present invention is not limited thereto. A structure including more electrode assemblies may be employed. By increasing electrode assemblies, the capacity of the storage battery 100b can be further improved. A structure including fewer electrode assemblies may also be employed. In the case where electrode assemblies are few, the storage battery 100b can have higher resistance to curving.

The description of FIG. 19 can be referred to for other than the positions of the positive electrodes 111 and the negative electrodes 115 and the position of the separator 103 of the storage battery 100b.

[Structure example of power storage system] Structure examples of power storage systems will be described with reference to FIG. 23, FIG. 24, and FIG. 25. Here, a power storage system refers to, for example, a device including a power storage device. The power storage system described in this embodiment includes a storage battery that is a power storage device using one embodiment of the present invention.

Figure 23A:
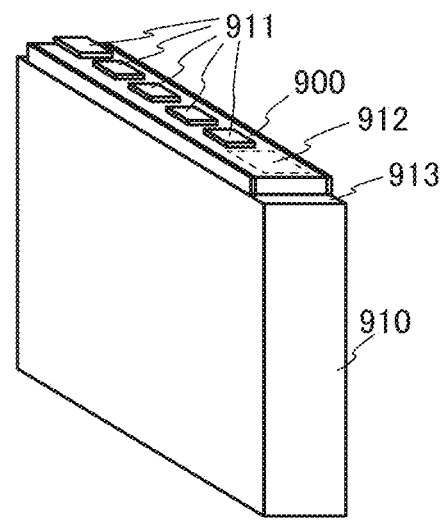
FIGS. 23A-23B Diagrams for illustrating an example of a power storage system.
Figure 23B:
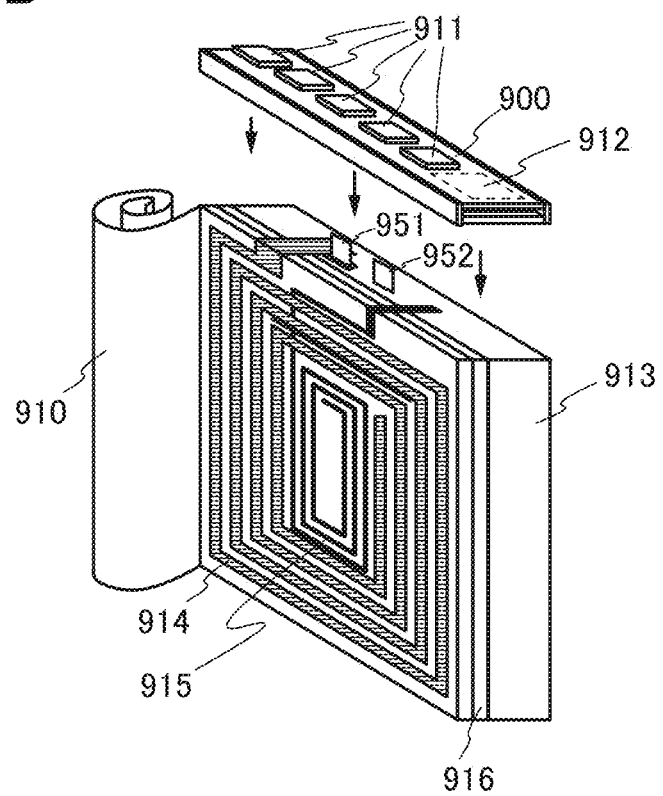
Figures 1, 24A:
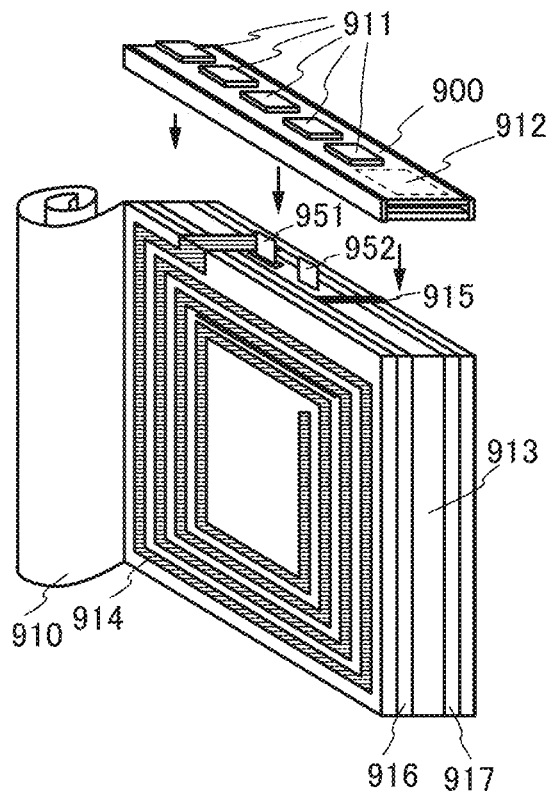
Figures 2, 24A:
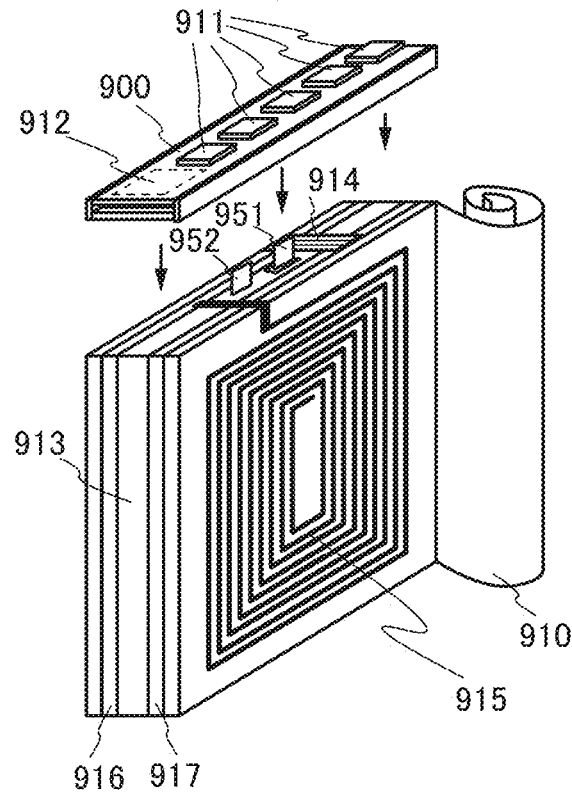
Figures 1, 24B:
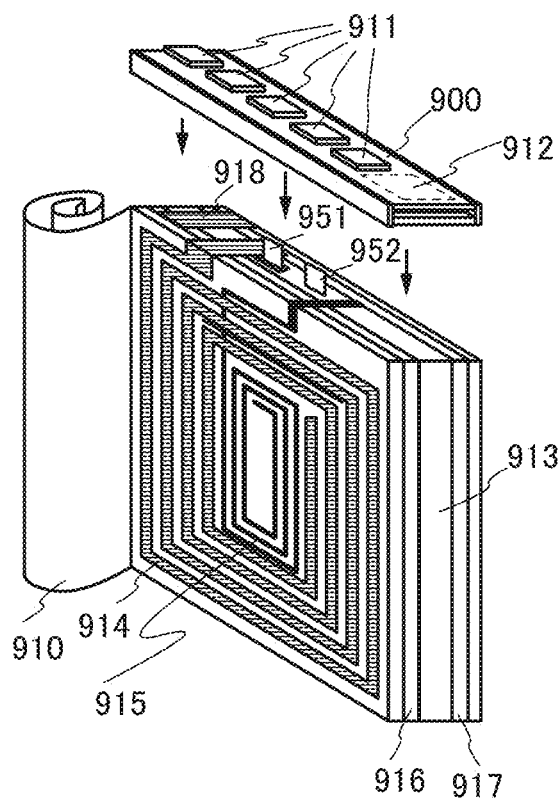
Figures 2, 24B:
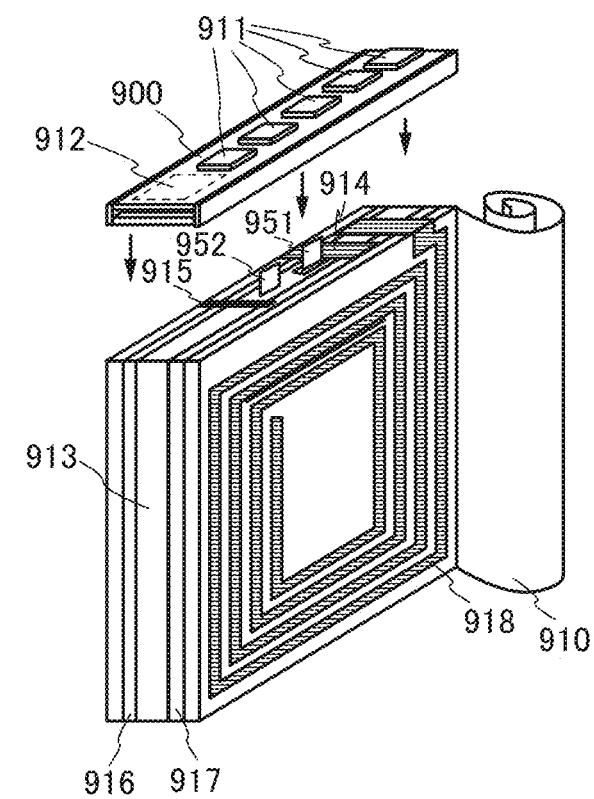

FIG. 23(A) and FIG. 23(B) are diagrams showing external views of a power storage system. The power storage system includes a circuit board 900 and a storage battery 913. A label 910 is attached to the storage battery 913. Furthermore, as illustrated in FIG. 23(B), the power storage system includes a terminal 951 and a terminal 952, and an antenna 914 and an antenna 915 on a side of the storage battery 913, to which the label 910 is attached.

The circuit board 900 includes terminals 911 and a circuit 912. The terminals 911 are connected to the terminal 951, the terminal 952, the antenna 914, the antenna 915, and the circuit 912. Note that a plurality of terminals 911 may be provided, and the plurality of terminals 911 may separately serve as a control signal input terminal, a power supply terminal, and the like.

The circuit 912 may be provided in a position overlapping with the circuit board 900. Note that the shape of the antenna 914 and the antenna 915 is not limited to a coil shape and may be a linear shape or a plate shape, for example. Furthermore, an antenna such as a planar antenna, an aperture antenna, a traveling-wave antenna, an EH antenna, a magnetic-field antenna, or a dielectric antenna may be used. Alternatively, the antenna 914 or the antenna 915 may be a flat-plate conductor. The flat-plate conductor can serve as one of conductors for electric field coupling. That is, the antenna 914 or the antenna 915 can serve as one of two conductors of a capacitor. Thus, electric power can be exchanged not only by an electromagnetic field or a magnetic field but also by an electric field.

The line width of the antenna 914 is preferably larger than the line width of the antenna 915. This makes it possible to increase the amount of electric power received by the antenna 914.

The power storage system includes a layer 916 between the storage battery 913 and the antennas 914 and 915. The layer 916 has a function of blocking an electromagnetic field by the storage battery 913, for example. As the layer 916, for example, a magnetic body can be used.

Note that the structure of the power storage system is not limited to FIG. 23.

For example, as illustrated in FIG. 24(A-1) and FIG. 24(A-2), a pair of opposite surfaces of the storage battery 913 in FIG. 23(A) and FIG. 23(B) may be provided with respective antennas. FIG. 24(A-1) is an external view seen from a direction of one side of the pair of surfaces, and FIG. 24(A-2) is an external view seen from a direction of the other side of the pair of surfaces. Note that for the same portions as in the power storage system illustrated in FIG. 23(A) and FIG. 23(B), the description of the power storage system illustrated in FIG. 23(A) and FIG. 23(B) can be referred to as appropriate.

As illustrated in FIG. 24(A-1), the antenna 914 is provided on one of the pair of surfaces of the storage battery 913 with the layer 916 interposed therebetween, and as illustrated in FIG. 24(A-2), the antenna 915 is provided on the other of the pair of surfaces of the storage battery 913 with a layer 917 interposed therebetween. The layer 917 has, for example, a function of blocking an electromagnetic field due to the storage battery 913. As the layer 917, for example, a magnetic body can be used.

With the above structure, both the antenna 914 and the antenna 915 can be increased in size.

Alternatively, as illustrated in FIG. 24(B-1) and FIG. 24(B-2), a pair of opposite surfaces of the storage battery 913 illustrated in FIG. 23(A) and FIG. 23(B) may be provided with respective different antennas. FIG. 24(B-1) is an external view seen from a direction of one side of the pair of surfaces, and FIG. 24(B-2) is an external view seen from a direction of the other side of the pair of surfaces. Note that for the same portions as in the power storage system illustrated in FIG. 23(A) and FIG. 23(B), the description of the power storage system illustrated in FIG. 23(A) and FIG. 23(B) can be referred to as appropriate.

As illustrated in FIG. 24(B-1), the antenna 914 and the antenna 915 are provided on one of the pair of surfaces of the storage battery 913 with the layer 916 interposed therebetween, and as illustrated in FIG. 24(A-2), an antenna 918 is provided on the other of the pair of surfaces of the storage battery 913 with the layer 917 interposed therebetween. The antenna 918 has a function of being capable of communicating data with an external device, for example. An antenna with a shape that can be used for the antenna 914 and the antenna 915, for example, can be used as the antenna 918. As a method for communication using the antenna 918 between the power storage system and another device, a response method that can be used between the power storage system and another device, such as NFC, can be employed.

Figure 25A:
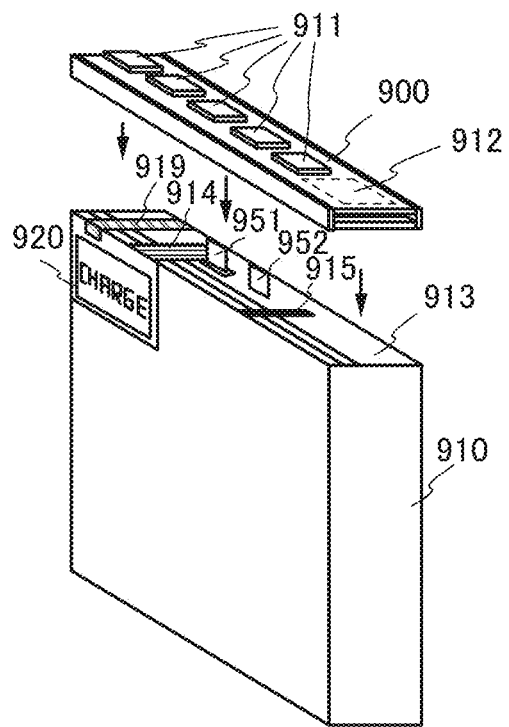
FIGS. 25A-25B Diagrams for illustrating an example of a power storage system.

Alternatively, as illustrated in FIG. 25(A), the storage battery 913 illustrated in FIG. 23(A) and FIG. 23(B) may be provided with a display device 920. The display device 920 is electrically connected to the terminal 911 via a terminal 919. Note that it is possible that the label 910 is not provided in a portion where the display device 920 is provided. Note that for the same portions as in the power storage system illustrated in FIG. 23(A) and FIG. 23(B), the description of the power storage system illustrated in FIG. 23(A) and FIG. 23(B) can be referred to as appropriate.

The display device 920 can display, for example, an image showing whether charge is being carried out, an image showing the amount of stored power, or the like. As the display device 920, electronic paper, a liquid crystal display device, an electroluminescence (also referred to as EL) display device, or the like can be used. For example, the use of electronic paper can reduce power consumption of the display device 920.

Figure 25B:
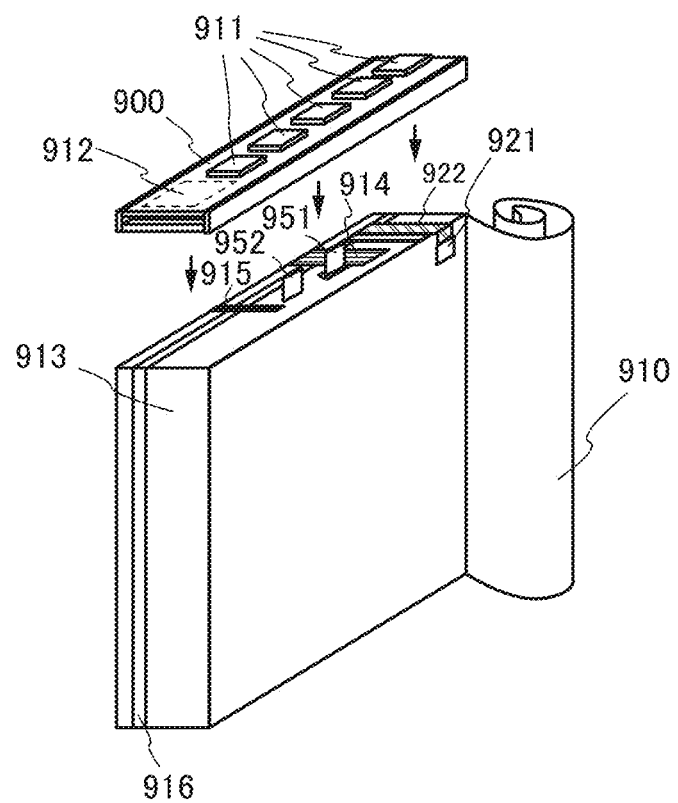

Alternatively, as illustrated in FIG. 25(B), the storage battery 913 illustrated in FIG. 23(A) and FIG. 23(B) may be provided with a sensor 921. The sensor 921 is electrically connected to the terminal 911 via a terminal 922. Note that for the same portions as in the power storage system illustrated in FIG. 23(A) and FIG. 23(B), the description of the power storage system illustrated in FIG. 23(A) and FIG. 23(B) can be referred to as appropriate.

As the sensor 921, one that has a function of measuring force, displacement, position, speed, acceleration, angular velocity, rotational frequency, distance, light, liquid, magnetism, temperature, chemical substance, sound, time, hardness, electric field, electric current, voltage, electric power, radiation, flow rate, humidity, gradient, oscillation, odor, or infrared rays can be used. With the sensor 921, for example, data on an environment (e.g., temperature) where the power storage system is placed can be detected and stored in a memory inside the circuit 912.

The electrode of one embodiment of the present invention is used in the storage battery and the power storage system that are described in this embodiment. The capacity of the storage battery and the power storage system can thus be high. In addition, energy density can be high. Furthermore, reliability can be high. Moreover, life can be long.

This embodiment can be implemented in appropriate combinations with any of the other embodiments.

(Embodiment 6) In this embodiment, an example in which a flexible storage battery which is a power storage device using one embodiment of the present invention is mounted on an electronic device will be described.

FIG. 26 illustrates examples in which the flexible power storage device described in the above embodiment is mounted on electronic devices. As examples of electronic devices each including the power storage device having a flexible shape, television devices (also referred to as televisions or television receivers), monitors of computers or the like, digital cameras, digital video cameras, digital photo frames, mobile phones (also referred to as mobile phones or mobile phone devices), portable game machines, portable information terminals, audio reproducing devices, large game machines such as pachinko machines, and the like can be given.

In addition, a power storage device having a flexible shape can be incorporated along a curved inside/outside wall surface of a house or a building or a curved interior/exterior surface of an automobile.

Figure 26A:
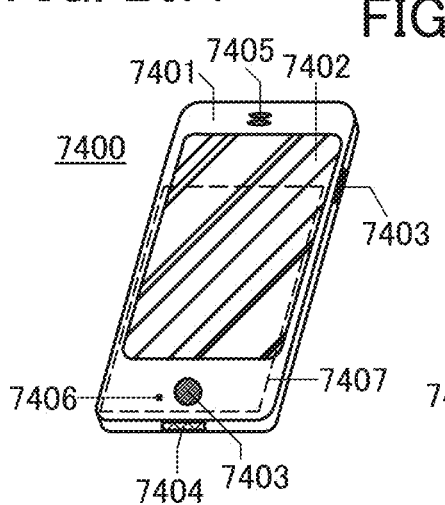
FIGS. 26A-26G Diagrams illustrating examples of electronic devices.

FIG. 26(A) illustrates an example of a mobile phone. A mobile phone 7400 includes a display portion 7402 incorporated in a housing 7401, an operation button 7403, an external connection port 7404, a speaker 7405, a microphone 7406, and the like. Note that the mobile phone 7400 includes a power storage device 7407.

Figure 26B:
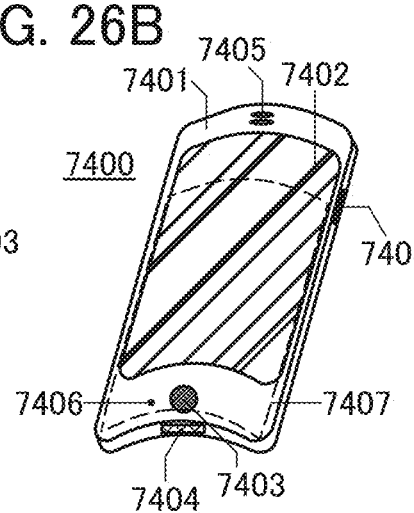
Figure 26C:
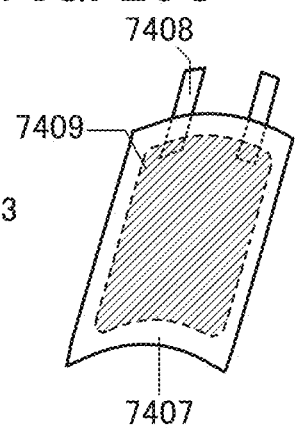

FIG. 26(B) illustrates the mobile phone 7400 that is curved. When the whole mobile phone 7400 is curved by external force, the power storage device 7407 included therein is also curved. FIG. 26(C) illustrates a bent state of the power storage device 7407 at that time. The power storage device 7407 is a thin storage battery. The power storage device 7407 is fixed in the bent state. Note that the power storage device 7407 includes a lead electrode 7408 electrically connected to a current collector 7409. The current collector 7409 is, for example, copper foil, and partly alloyed with gallium; thus, its adhesion to an active material layer in contact with the current collector 7409 is improved and the power storage device 7407 can have high reliability even in the bent state.

Figure 26D:
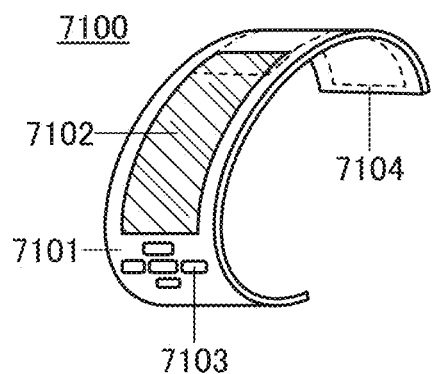
Figure 26E:
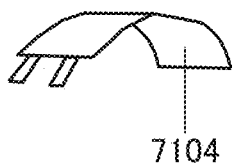

FIG. 26(D) illustrates an example of a bangle display device. A portable display device 7100 includes a housing 7101, a display portion 7102, an operation button 7103, and a power storage device 7104. FIG. 26(E) illustrates a bent state of the power storage device 7104. At the time of wearing on a user's arm while the power storage device 7104 is bent, the housing changes its shape and the curvature of a part or the whole of the power storage device 7104 is changed. Note that the radius of curvature of a curve at a given point refers to the radius of the corresponding circle, and the reciprocal of the radius of curvature is called curvature. Specifically, a part or the whole of the housing or the main surface of the power storage device 7104 is changed in the range of radius of curvature from 40 mm to 150 mm. When the radius of curvature at the main surface of the power storage device 7104 is in the range from 40 mm to 150 mm, high reliability can be maintained.

Figure 26F:
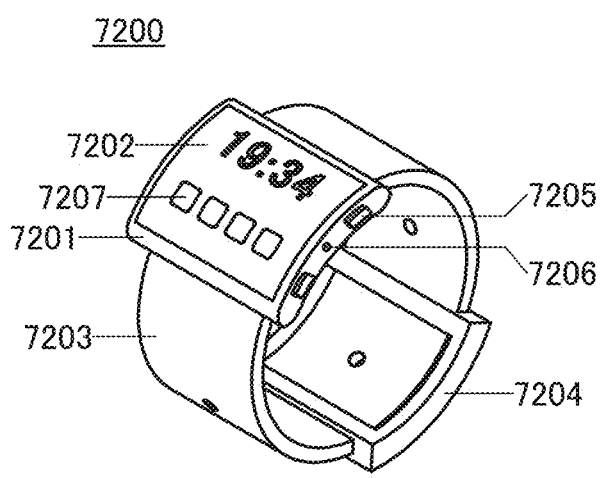

FIG. 26(F) illustrates an example of a wristwatch-type portable information terminal. A portable information terminal 7200 includes a housing 7201, a display portion 7202, a band 7203, a buckle 7204, an operation button 7205, an input output terminal 7206, and the like.

The portable information terminal 7200 is capable of executing a variety of applications such as mobile phone calls, e-mailing, viewing and editing texts, music reproduction, Internet communication, and a computer game.

The display surface of the display portion 7202 is curved, and images can be displayed on the curved display surface. In addition, the display portion 7202 includes a touch sensor, and operation can be performed by touching the screen with a finger, a stylus, or the like. For example, by touching an icon 7207 displayed on the display portion 7202, application can be started.

With the operation button 7205, a variety of functions such as time setting, on/off of the power, on/off of wireless communication, setting and cancellation of a silent mode, and setting and cancellation of a power saving mode can be performed. For example, the functions of the operation button 7205 can be set freely by the operating system incorporated in the portable information terminal 7200.

The portable information terminal 7200 can execute near field communication based on a communication standard. For example, mutual communication with a headset capable of wireless communication can be performed, and thus hands-free calling is possible.

Moreover, the portable information terminal 7200 includes the input output terminal 7206, and data can be directly exchanged with another information terminal via a connector. In addition, charging via the input output terminal 7206 is possible. Note that the charging operation may be performed by wireless power feeding without using the input output terminal 7206.

The display portion 7202 of the portable information terminal 7200 includes the power storage device with an electrode member of one embodiment of the present invention. For example, the power storage device 7104 illustrated in FIG. 26(E) can be incorporated in the housing 7201 in the state of being curved or in the band 7203 in the state of being capable of being curved.

Figure 26G:
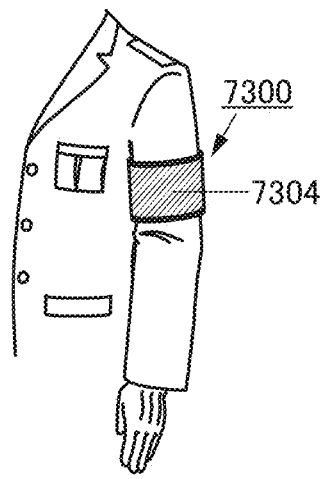

FIG. 26(G) illustrates an example of an armband display device. A display device 7300 includes a display portion 7304 and the power storage device of one embodiment of the present invention. The display device 7300 can include a touch sensor in the display portion 7304 and can serve as a portable information terminal.

The display surface of the display portion 7304 is curved, and images can be displayed on the curved display surface. A display state of the display device 7300 can be changed by, for example, near field communication based on a communication standard.

Moreover, the display device 7300 includes an input output terminal, and data can be directly exchanged with another information terminal via a connector. In addition, charging via the input output terminal is possible. Note that the charging operation may be performed by wireless power feeding without using the input output terminal.

This embodiment can be implemented in appropriate combinations with any of the other embodiments.

Embodiment 7

In this embodiment, examples of electronic devices in which the power storage device can be mounted will be described.

Figure 27A:
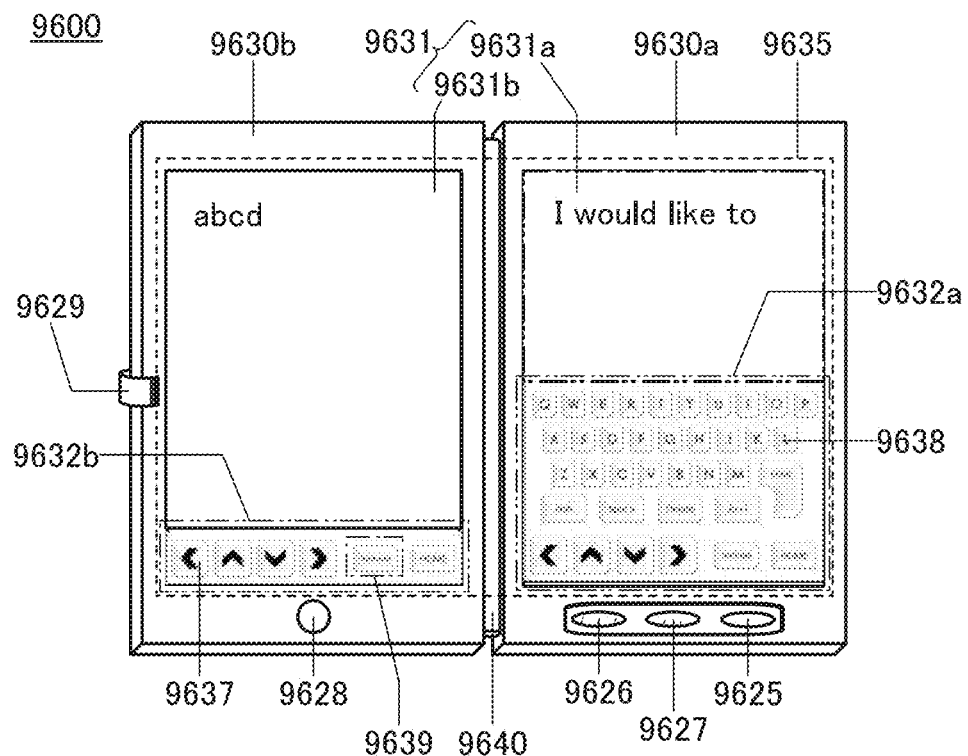
FIGS. 27A-27C Diagrams illustrating an example of an electronic device.
Figure 27B:
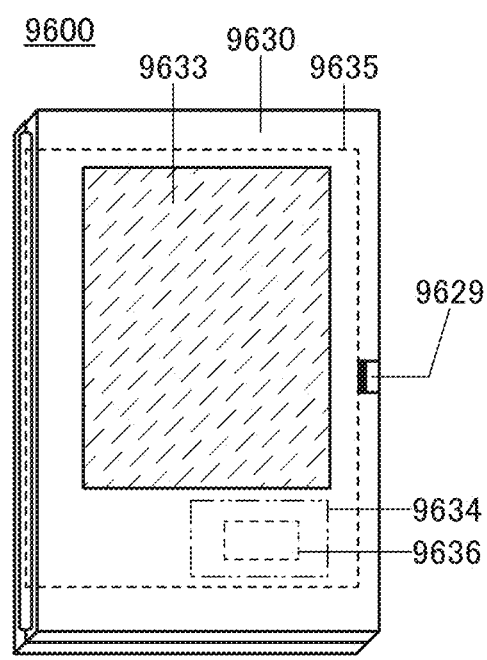

FIG. 27(A) and FIG. 27(B) illustrate an example of a tablet terminal that can be folded in half A tablet terminal 9600 illustrated in FIG. 27(A) and FIG. 27(B) includes a housing 9630a, a housing 9630b, a movable portion 9640 connecting the housing 9630a and the housing 9630b, a display portion 9631 including a display portion 9631a and a display portion 9631b, a display mode changing switch 9626, a power switch 9627, a power saving mode changing switch 9625, a fastener 9629, and an operation switch 9628.

FIG. 27(A) illustrates the tablet terminal 9600 that is opened, and FIG. 27(B) illustrates the tablet terminal 9600 that is closed.

The tablet terminal 9600 includes a power storage unit 9635 inside the housing 9630a and the housing 9630b. The power storage unit 9635 is provided across the housing 9630a and the housing 9630b, passing through the movable portion 9640.

Part of the display portion 9631a can be a touch panel region 9632a, and data can be input by touching operation keys 9638 that are displayed. Note that as an example, a structure in which half of the area of the display portion 9631a has only a display function and the other half of the area has a touch panel function is illustrated, but there is no limitation to this structure. All the area of the display portion 9631a may have a touch panel function. For example, all the area of the display portion 9631a can display keyboard buttons and serve as a touch panel while the display portion 9631b can be used as a display screen.

In the display portion 9631b, as in the display portion 9631a, part of the display portion 9631b can be a touch panel region 9632b. When a keyboard display switching button 9639 displayed on the touch panel is touched with a finger, a stylus, or the like, a keyboard button can be displayed on the display portion 9631b.

Touch input can be performed in the touch panel region 9632a and the touch panel region 9632b at the same time.

The display mode changing switch 9626 allows switching of the display orientation between a landscape mode and a portrait mode, switching between color display and black-and-white display, and the like. The power saving mode changing switch 9625 can control display luminance in accordance with the amount of external light in use, which is measured with an optical sensor incorporated in the tablet terminal 9600. In addition to the optical sensor, other detecting devices such as sensors for determining inclination, e.g., a gyroscope or acceleration sensor, may be incorporated in the tablet terminal.

Although FIG. 27(A) illustrates an example in which the display portion 9631a and the display portion 9631b have the same display area, there is no particular limitation to this example. One of them may be different in size from the other, or may be different in display quality. For example, one of them may be a display panel that can display higher resolution images than the other.

FIG. 27(B) is in a closed state, and the tablet terminal includes a housing 9630, a solar cell 9633, and a charge and discharge control circuit 9634 including a DCDC converter 9636. The power storage unit of one embodiment of the present invention is used as the power storage unit 9635.

Note that the tablet terminal 9600 can be folded in two and can therefore be folded such that the housing 9630a and the housing 9630b overlap with each other when not in use. By folding, the display portion 9631a and the display portion 9631b can be protected, which increases the durability of the tablet terminal 9600. In addition, the power storage unit 9635 using the storage unit of one embodiment of the present invention has flexibility and can be repeatedly bent without a large decrease in charge and discharge capacity. Thus, a highly reliable tablet terminal can be provided.

The tablet terminal illustrated in FIG. 27(A) and FIG. 27(B) can also have a function of displaying various data (e.g., a still image, a moving image, and a text image), a function of displaying a calendar, a date, the time, or the like on the display portion, a touch-input function of operating or editing data displayed on the display portion by touch input, a function of controlling processing by various kinds of software (programs), and the like.

The solar cell 9633, which is attached on the surface of the tablet terminal, supplies electric power to a touch panel, a display portion, an image signal processor, or the like. Note that the solar cell 9633 can be provided on one or both sides of the housing 9630 and the power storage unit 9635 can be charged efficiently. Note that the use of a lithium ion battery as the power storage unit 9635 is advantageous in downsizing or the like.

Figure 27C:
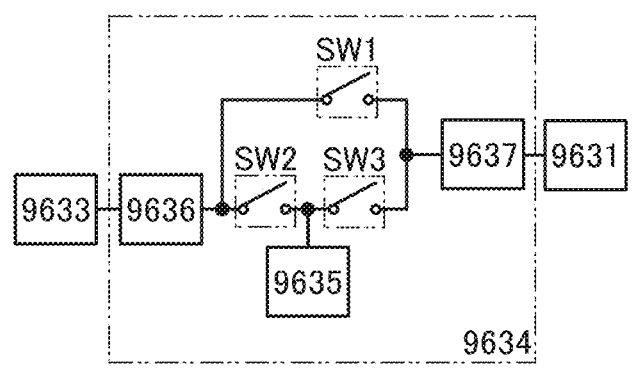

The structure and operation of the charge and discharge control circuit 9634 illustrated in FIG. 27(B) are described with reference to a block diagram of FIG. 27(C). The solar cell 9633, the power storage unit 9635, the DCDC converter 9636, a converter 9637, switches SW1 to SW3, and the display portion 9631 are illustrated in FIG. 27(C), and the power storage unit 9635, the DCDC converter 9636, the converter 9637, and the switches SW1 to SW3 correspond to the charge and discharge control circuit 9634 in FIG. 27(B).

First, an example of operation in the case where electric power is generated by the solar cell 9633 using external light will be described. The voltage of electric power generated by the solar cell is raised or lowered by the DCDC converter 9636 to a voltage for charging the power storage unit 9635. When the display portion 9631 operates with the electric power from the solar cell 9633, the switch SW1 is turned on and the voltage is raised or lowered by the converter 9637 to a voltage needed for the display portion 9631. When display on the display portion 9631 is not performed, the switch SW1 is turned off and the switch SW2 is turned on, so that the power storage unit 9635 can be charged.

Note that the solar cell 9633 is described as an example of a power generation means; however, there is no particular limitation. The power storage unit 9635 may be charged using another power generation means such as a piezoelectric element or a thermoelectric conversion element (Peltier element). For example, a non-contact power transmission module capable of performing charging by transmitting and receiving electric power wirelessly (without contact), or any of the other charge means may be used in combination.

Figure 28:
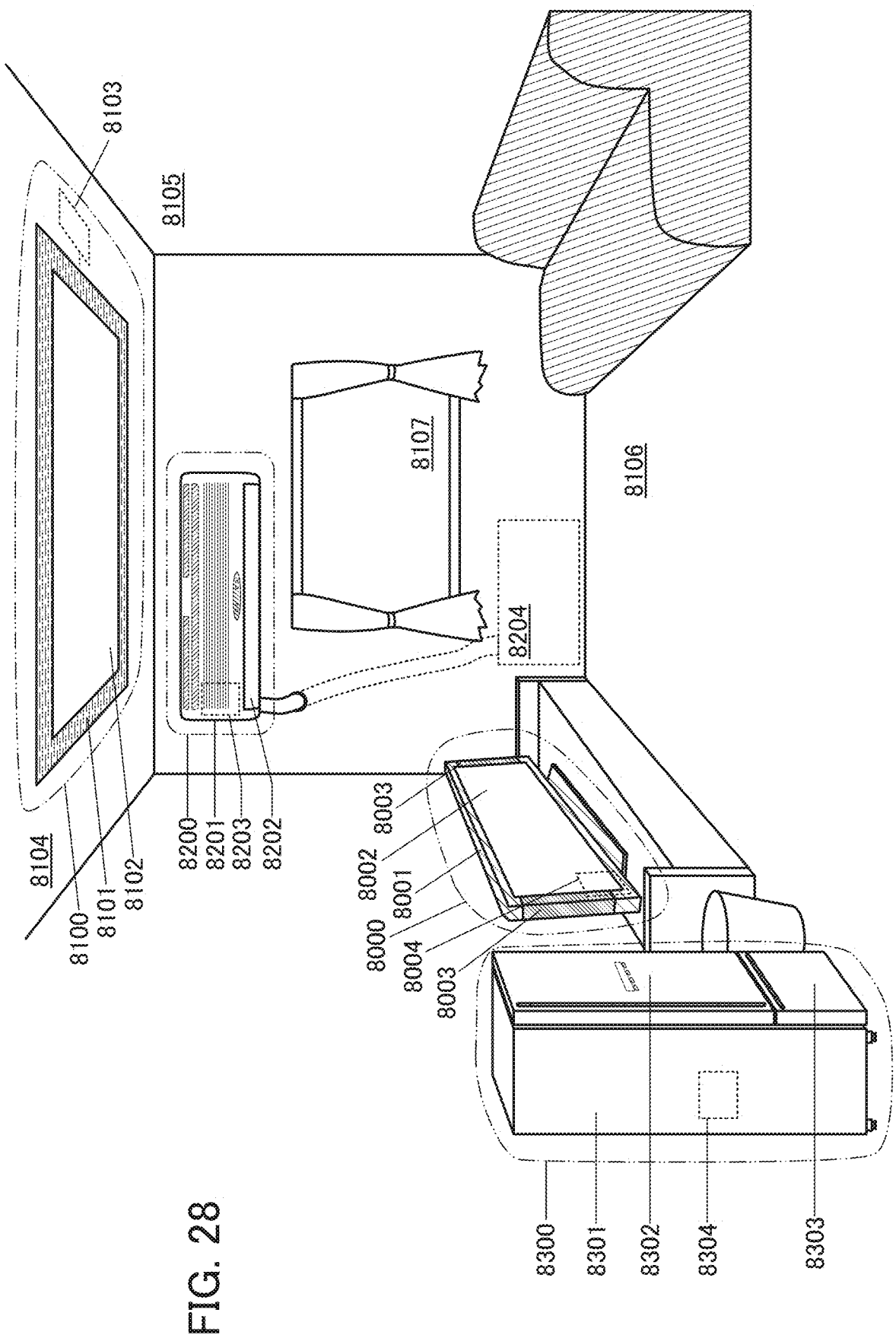
FIG. 28 A diagram illustrating examples of electronic devices.

FIG. 28 illustrates other examples of electronic devices. In FIG. 28, a display device 8000 is an example of an electronic device including a power storage device 8004 of one embodiment of the present invention. Specifically, the display device 8000 corresponds to a display device for TV broadcast reception and includes a housing 8001, a display portion 8002, speaker portions 8003, the power storage device 8004, and the like. The power storage device 8004 of one embodiment of the present invention is provided in the housing 8001. The display device 8000 can receive the supply of electric power from a commercial power supply, or can use electric power stored in the power storage device 8004. Thus, the display device 8000 can be utilized with the use of the power storage device 8004 of one embodiment of the present invention as an uninterruptible power supply even when electric power cannot be supplied from a commercial power supply due to power failure or the like.

A semiconductor display device such as a liquid crystal display device, a light-emitting device in which a light-emitting element such as an organic EL element is provided in each pixel, an electrophoresis display device, a DMD (Digital Micromirror Device), a PDP (Plasma Display Panel), or an FED (Field Emission Display) can be used for the display portion 8002.

Note that the display device includes all information display devices for personal computers, advertisement displays, and the like besides TV broadcast reception.

In FIG. 28, an installation lighting device 8100 is an example of an electronic device including a power storage device 8103 of one embodiment of the present invention. Specifically, the lighting device 8100 includes a housing 8101, a light source 8102, the power storage device 8103, and the like. Although FIG. 28 illustrates the case where the power storage device 8103 is provided in a ceiling 8104 on which the housing 8101 and the light source 8102 are installed, the power storage device 8103 may be provided in the housing 8101. The lighting device 8100 can receive the supply of electric power from a commercial power supply, or can use electric power stored in the power storage device 8103. Thus, the lighting device 8100 can be utilized with the use of the power storage device 8103 of one embodiment of the present invention as an uninterruptible power supply even when electric power cannot be supplied from a commercial power supply due to power failure or the like.

Note that although FIG. 28 illustrates, as an example, the installation lighting device 8100 provided in the ceiling 8104, the power storage device of one embodiment of the present invention can be used in an installation lighting device provided in, for example, a wall 8105, a floor 8106, or a window 8107 other than the ceiling 8104, or can be used in a tabletop lighting device or the like.

As the light source 8102, an artificial light source which emits light artificially by using electric power can be used. Specifically, an incandescent lamp, a discharge lamp such as a fluorescent lamp, and light-emitting elements such as an LED and an organic EL element can be given as examples of the artificial light source.

In FIG. 28, an air conditioner including an indoor unit 8200 and an outdoor unit 8204 is an example of an electronic device including a power storage device 8203 of one embodiment of the present invention. Specifically, the indoor unit 8200 includes a housing 8201, an air outlet 8202, the power storage device 8203, and the like. Although FIG. 28 illustrates the case where the power storage device 8203 is provided in the indoor unit 8200, the power storage device 8203 may be provided in the outdoor unit 8204. Alternatively, the power storage devices 8203 may be provided in both the indoor unit 8200 and the outdoor unit 8204. The air conditioner can receive the supply of electric power from a commercial power supply, or can use electric power stored in the power storage device 8203. Particularly in the case where the power storage devices 8203 are provided in both the indoor unit 8200 and the outdoor unit 8204, the air conditioner can be utilized with the use of the power storage devices 8203 of one embodiment of the present invention as an uninterruptible power supply even when electric power cannot be supplied from a commercial power supply due to power failure or the like.

Note that although FIG. 28 illustrates, as an example, the split-type air conditioner including the indoor unit and the outdoor unit, the power storage device of one embodiment of the present invention can also be used in an air conditioner in which the functions of an indoor unit and an outdoor unit are integrated in one housing.

In FIG. 28, an electric refrigerator-freezer 8300 is an example of an electronic device including a power storage device 8304 of one embodiment of the present invention. Specifically, the electric refrigerator-freezer 8300 includes a housing 8301, a refrigerator door 8302, a freezer door 8303, the power storage device 8304, and the like. The power storage device 8304 is provided in the housing 8301 in FIG. 28. The electric refrigerator-freezer 8300 can receive the supply of electric power from a commercial power supply, or can use electric power stored in the power storage device 8304. Thus, the electric refrigerator-freezer 8300 can be utilized with the use of the power storage device 8304 of one embodiment of the present invention as an uninterruptible power supply even when electric power cannot be supplied from a commercial power supply due to power failure or the like.

Note that among the electronic devices described above, a high-frequency heating apparatus such as a microwave and an electronic device such as an electric rice cooker require high electric power in a short time. The tripping of a circuit breaker of a commercial power supply in use of electronic devices can be prevented by using the power storage device of one embodiment of the present invention as an auxiliary power supply for supplying electric power which cannot be supplied enough by a commercial power supply.

In addition, in a time period when electronic devices are not used, specifically when a rate of actual use of electric power (referred to as a usage rate of electric power) with respect to the total amount of electric power which can be supplied by a commercial power supply source is low, electric power can be stored in the power storage device, whereby an increase in the usage rate of electric power in other than the above time period can be reduced. For example, in the case of the electric refrigerator-freezer 8300, electric power is stored in the power storage device 8304 at night time when the temperature is low and the refrigerator door 8302 and the freezer door 8303 are not opened or closed. Meanwhile, the power storage device 8304 is used as an auxiliary power supply in daytime when the temperature is high and the refrigerator door 8302 and the freezer door 8303 are opened and closed; thus, the usage rate of electric power in daytime can be reduced.

This embodiment can be implemented in appropriate combinations with any of the other embodiments.

(Embodiment 8) In this embodiment, examples of mounting the power storage device on vehicles will be described.

Mounting power storage devices on vehicles can lead to next-generation clean energy vehicles such as hybrid electric vehicles (HEVs), electric vehicles (EVs), and plug-in hybrid electric vehicles (PHEVs).

Figure 29A:
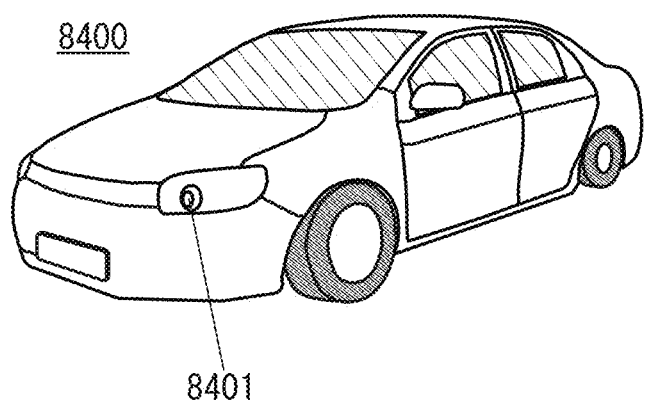
FIGS. 29A-29B Diagrams illustrating examples of electronic devices.

FIG. 29 illustrates an example of a vehicle using one embodiment of the present invention. An automobile 8400 illustrated in FIG. 29(A) is an electric vehicle which runs on the power of an electric motor. Alternatively, it is a hybrid electric vehicle which runs on either the electric motor or an engine as appropriate. One embodiment of the present invention achieves a high-mileage vehicle. The automobile 8400 includes the power storage device. The power storage device is used not only for driving the electric motor, but also for supplying electric power to a light-emitting device such as a headlight 8401 or a room light (not illustrated).

The power storage device can also supply electric power to a display device of a speedometer, a tachometer, or the like included in the automobile 8400. Furthermore, the power storage device can supply electric power to a semiconductor device included in the automobile 8400, such as a navigation system.

Figure 29B:
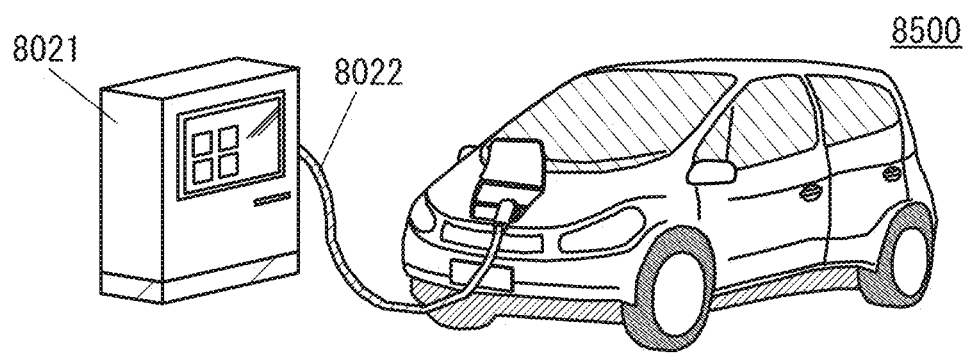

An automobile 8500 illustrated in FIG. 29(B) can be charged when the power storage device included in the automobile 8500 is supplied with electric power from external charging equipment by a plug-in method, a contactless power feeding method, or the like. FIG. 29(B) illustrates a state in which the power storage device mounted on the automobile 8500 is charged from a ground-based charging apparatus 8021 through a cable 8022. In charging, a predetermined method such as CHAdeMO (registered trademark) or Combo may be employed as a charging method, the standard of a connector, or the like as appropriate. The charging apparatus 8021 may be a charging station provided in a commercial facility or a power source in a house. For example, with the use of a plug-in technique, the power storage device (not illustrated) mounted on the automobile 8500 can be charged by being supplied with electric power from outside, for example. The charging can be performed by converting AC electric power into DC electric power through a converter such as an ACDC converter.

Furthermore, although not illustrated, the vehicle may be mounted with a power receiving device so as to be charged by being supplied with electric power from an above-ground power transmitting device in a contactless manner. In the case of the contactless power feeding method, by incorporating a power transmitting device in a road or an exterior wall, charging can be performed not only while the vehicle is stopped but also while the vehicle is moving. In addition, the contactless power feeding method may be utilized to perform transmission and reception of electric power between vehicles. Furthermore, a solar cell may be provided in the exterior of the vehicle to charge the power storage device while the vehicle is stopped or is moving. To supply electric power in such a contactless manner, an electromagnetic induction method or a magnetic resonance method can be used.

According to one embodiment of the present invention, the power storage device can have improved cycle characteristics and reliability. Furthermore, according to one embodiment of the present invention, the power storage device itself can be made more compact and lightweight as a result of improved characteristics of the power storage device. The compact and lightweight power storage device contributes to a reduction in the weight of a vehicle, and thus increases the driving distance. Furthermore, the power storage device mounted on the vehicle can be used as a power supply source for other than the vehicle. In such a case, the use of a commercial power source can be avoided at peak time of electric power demand.

This embodiment can be implemented in appropriate combinations with any of the other embodiments.

(Embodiment 9) In this embodiment, a battery management unit (BMU) which can be used in combination with a battery cell containing the material described in the above embodiment, and a transistor suitable for a circuit included in the battery management unit will be described with reference to FIG. 30 to FIG. 36. In this embodiment, a battery management unit of a power storage device that includes battery cells connected in series will be particularly described.

When a plurality of battery cells connected in series are charged and discharged repeatedly, each the capacities (output voltages) differ from one another depending on the variation in characteristics among the battery cells. Discharge capacities of all of the battery cells connected in series depend on a battery cell with small capacity. Capacity variation reduces the discharge capacities. Charging based on a battery cell with small capacity may cause insufficient charging. Charging based on a battery cell with high capacity may cause overcharge.

Thus, the battery management unit of the power storage device that includes the battery cells connected in series has a function of reducing capacity variation among the battery cells which causes insufficient charging or overcharge. Examples of circuit structures for reducing capacity variation among the battery cells include a resistive type, a capacitor type, and an inductor type; here, a circuit structure which can reduce capacity variation using a transistor with a low off-state current is given and explained as an example.

A transistor including an oxide semiconductor in its channel formation region (an OS transistor) is preferable as the transistor with a low off-state current. When an OS transistor with a low off-state current is used in the circuit structure of the battery management unit of the power storage device, the amount of electric charge leaking from a battery can be reduced, and reduction in capacity over time can be suppressed.

As the oxide semiconductor used in the channel formation region, an In-M-Zn oxide (M is Ga, Y, Zr, La, Ce, or Nd) is used. In the case where a target used for forming an oxide semiconductor film has an atomic ratio of the metal elements of In:M:Zn=$x_1$:$y_1$:$z_1$, $x_1/y_1$ is preferably greater than or equal to ⅓ and less than or equal to 6 and further preferably greater than or equal to 1 and less than or equal to 6, and $z_1/y_1$ is preferably greater than or equal to ⅓ and less than or equal to 6 and further preferably greater than or equal to 1 and less than or equal to 6. Note that when $z_1/y_1$ is greater than or equal to 1 and less than or equal to 6, a CAAC-OS film as the oxide semiconductor film is easily formed.

Here, a CAAC-OS film is described.

The CAAC-OS film is one of oxide semiconductor films having a plurality of c-axis aligned crystal parts.

By observation of a combined analysis image (also referred to as a high-resolution TEM image) of a bright-field image and a diffraction pattern of a CAAC-OS film with a transmission electron microscope (TEM), a plurality of crystal parts can be observed. However, even in the high-resolution TEM image, a boundary between crystal parts, that is, a grain boundary is not clearly observed. Thus, in the CAAC-OS film, a reduction in electron mobility due to the grain boundary is less likely to occur.

By observation of the high-resolution cross-sectional TEM image of the CAAC-OS film in a direction substantially parallel to a sample surface, it can be confirmed that metal atoms are arranged in a layered manner in the crystal parts. Each metal atom layer has a morphology reflecting unevenness of a surface where the film is formed (hereinafter also referred to as a formation surface) or a top surface of the CAAC-OS film, and is arranged parallel to the formation surface or the top surface of the CAAC-OS film.

On the other hand, by observation of the high-resolution plan-view TEM image of the CAAC-OS film in a direction substantially perpendicular to the sample surface, it can be confirmed that metal atoms are arranged in a triangular or hexagonal configuration in the crystal parts. However, there is no regularity of arrangement of metal atoms between different crystal parts.

When a CAAC-OS film is subjected to structural analysis with an X-ray diffraction (XRD) apparatus, for example, in analysis of the CAAC-OS film including an InGaZnO$_4$ crystal by an out-of-plane method, a peak appears in some cases when the diffraction angle (2θ) is around 31°. This peak is derived from the (009) plane of the InGaZnO$_4$ crystal, which confirms that crystals in the CAAC-OS film have c-axis alignment, and that the c-axes are aligned in a direction substantially perpendicular to the formation surface or the top surface.

Note that in analysis of the CAAC-OS film having the InGaZnO$_4$ crystal by an out-of-plane method, another peak appears in some cases when 2θ is around 36°, in addition to the peak at 2θ of around 31°. The peak at 2θ of around 36° indicates that a crystal having no c-axis alignment is included in part of the CAAC-OS film. It is preferable that in the CAAC-OS film, a peak appear when 2θ is around 31° and that a peak not appear when 2θ is around 36°.

The CAAC-OS film is an oxide semiconductor film having low impurity concentration. The impurity is an element other than the main components of the oxide semiconductor film, such as hydrogen, carbon, silicon, or a transition metal element. In particular, an element that has higher bonding strength to oxygen than a metal element included in the oxide semiconductor film, such as silicon, disturbs the atomic arrangement of the oxide semiconductor film by depriving the oxide semiconductor film of oxygen and causes a decrease in crystallinity. Furthermore, a heavy metal such as iron or nickel, argon, carbon dioxide, or the like has a large atomic radius (or molecular radius), and thus disturbs the atomic arrangement of the oxide semiconductor film and causes a decrease in crystallinity when it is contained in the oxide semiconductor film. Note that the impurity contained in the oxide semiconductor film might serve as a carrier trap or a carrier generation source.

The CAAC-OS film is an oxide semiconductor film having a low density of defect states. For example, in some cases, oxygen vacancies in the oxide semiconductor film serve as carrier traps or serve as carrier generation sources when hydrogen is captured therein.

Low impurity concentration and low density of defect states (few oxygen vacancies) are referred to as being highly purified and intrinsic or substantially highly purified and intrinsic. A highly purified intrinsic or substantially highly purified intrinsic oxide semiconductor film has few carrier generation sources, and thus can have a low carrier density. Therefore, a transistor including the oxide semiconductor film rarely has electrical characteristics with negative threshold voltage (also referred to as being normally on). The highly purified intrinsic or substantially highly purified intrinsic oxide semiconductor film has few carrier traps. Accordingly, the transistor including the oxide semiconductor film is a transistor having little variation in electrical characteristics and high reliability. Note that electric charge trapped by the carrier traps in the oxide semiconductor film takes a long time to be released and might behave like fixed electric charge. Thus, the transistor including the oxide semiconductor film having high impurity concentration and a high density of defect states has unstable electrical characteristics in some cases.

The transistor including the CAAC-OS film has little variation in the electrical characteristics due to irradiation with visible light or ultraviolet light.

Note that since the OS transistor has a wider band gap than a transistor including silicon in its channel formation region (a Si transistor), dielectric breakdown at the time when a high voltage is applied is unlikely to occur. Although a voltage of several hundreds of volts is generated when battery cells are connected in series, the above-described OS transistor is suitable for the circuit structure of the battery management unit, which is used for such battery cells, in the power storage device.

Figure 30:
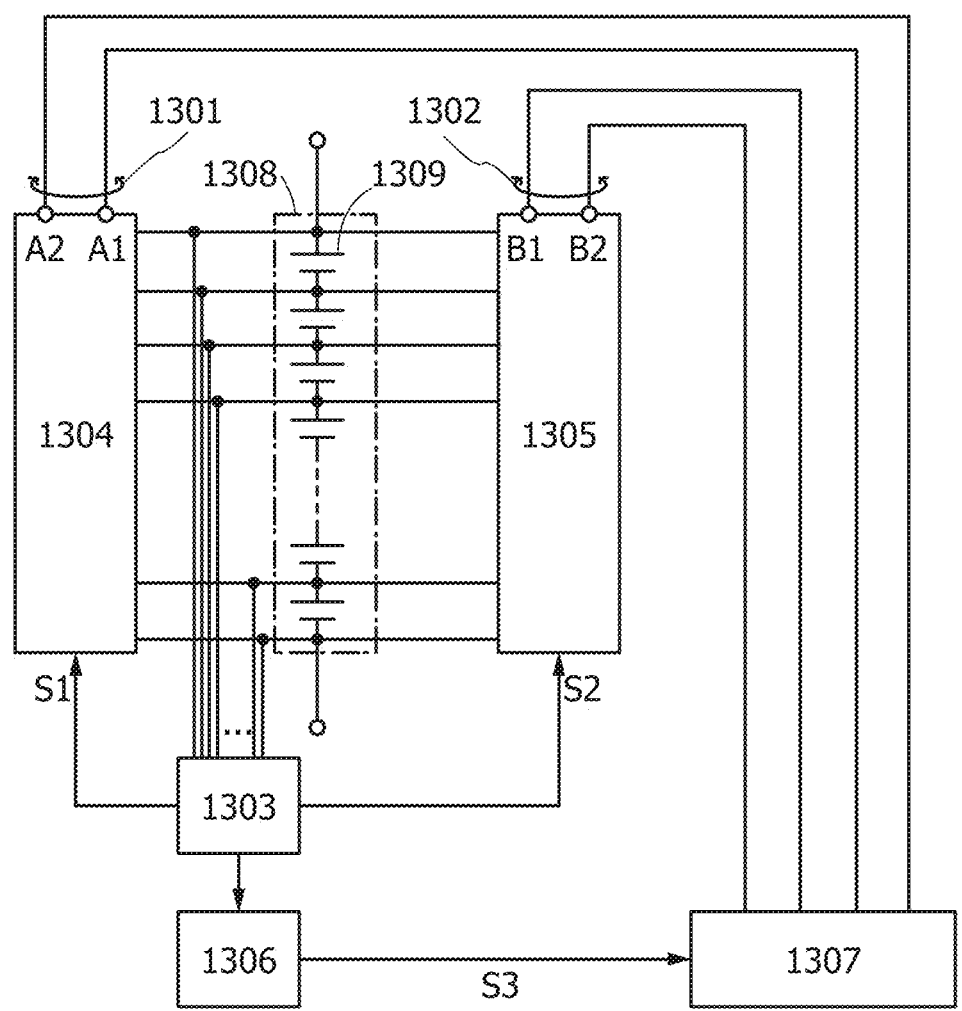
FIG. 30 A block diagram illustrating one embodiment of the present invention.

FIG. 30 is an example of a block diagram of the power storage device. A power storage device 1300 illustrated in FIG. 30 includes a terminal pair 1301, a terminal pair 1302, a switching control circuit 1303, a switching circuit 1304, a switching circuit 1305, a voltage transformation control circuit 1306, a voltage transformer circuit 1307, and a battery portion 1308 including a plurality of battery cells 1309 connected in series.

In the power storage device 1300 in FIG. 30, a portion including the terminal pair 1301, the terminal pair 1302, the switching control circuit 1303, the switching circuit 1304, the switching circuit 1305, the voltage transformation control circuit 1306, and the voltage transformer circuit 1307 can be referred to as a battery management unit.

The switching control circuit 1303 controls operations of the switching circuit 1304 and the switching circuit 1305. Specifically, the switching control circuit 1303 determines battery cells to be discharged (a discharge battery cell group) and battery cells to be charged (a charge battery cell group) in accordance with voltage measured for every battery cell 1309.

Furthermore, the switching control circuit 1303 outputs a control signal S1 and a control signal S2 on the basis of the determined discharge battery cell group and charge battery cell group. The control signal S1 is output to the switching circuit 1304. The control signal S1 is a signal that controls the switching circuit 1304 so that the terminal pair 1301 and the discharge battery cell group are connected to each other. The control signal S2 is output to the switching circuit 1305. The control signal S2 is a signal that controls the switching circuit 1305 so that the terminal pair 1302 and the charge battery cell group are connected to each other.

The switching control circuit 1303 generates the control signal S1 and the control signal S2 on the basis of structures of the switching circuit 1304, the switching circuit 1305, and the voltage transformer circuit 1307 so that terminals having the same polarity are connected to each other in the terminal pair 1302 and the charge battery cell group.

An operation of the switching control circuit 1303 is described in detail.

First, the switching control circuit 1303 measures the voltage of each of the battery cells 1309. Then, the switching control circuit 1303 determines the battery cell 1309 having a voltage higher than or equal to a predetermined threshold value as a high-voltage battery cell (high-voltage cell) and the battery cell 1309 having a voltage lower than the predetermined threshold value as a low-voltage battery cell (constant-voltage cell), for example.

Note that as a method for determining a high-voltage cell and a low-voltage cell, any of various methods can be employed. For example, the switching control circuit 1303 may determine whether each battery cell 1309 is a high-voltage cell or a low-voltage cell on the basis of the voltage of the battery cell 1309 having a highest voltage or a lowest voltage among the battery cells 1309. In this case, the switching control circuit 1303 can determine whether each battery cell 1309 is a high-voltage cell or a low-voltage cell by determining whether or not a ratio of a voltage of each battery cell 1309 to the reference voltage is the predetermined value or more, for example. Then, the switching control circuit 1303 determines a charge battery cell group and a discharge battery cell group on the basis of the determination result.

Note that high-voltage cells and low-voltage cells are possibly mixed in various states in the battery cells 1309. The switching control circuit 1303 determines a portion having the largest number of consecutive high-voltage cells connected in series as the discharge battery cell group of a mixture of high-voltage cells and low-voltage cells, for example. Furthermore, the switching control circuit 1303 determines a portion having the largest number of consecutive low-voltage cells connected in series as the charge battery cell group. In addition, the switching control circuit 1303 may preferentially select the battery cells 1309 which are nearly overcharged or overdischarged as the discharge battery cell group or the charge battery cell group.

Here, operation examples of the switching control circuit 1303 in this embodiment are described with reference to FIG. 31. FIG. 31 illustrates operation examples of the switching control circuit 1303. Note that FIG. 31 illustrates the case where four battery cells 1309 are connected in series as an example for convenience of explanation.

Figure 31A:
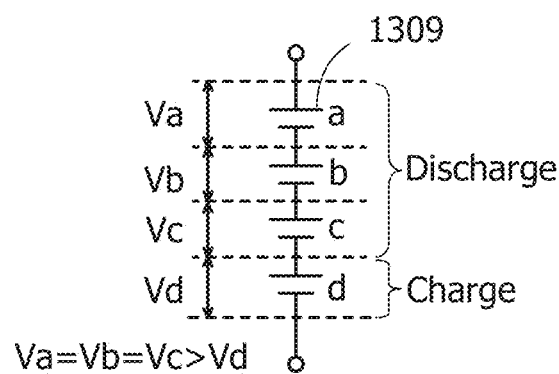
FIGS. 31A-31C Conceptual diagrams illustrating embodiments of the present invention.

First, an example in FIG. 31(A) shows the case where the relation Va=Vb=Vc>Vd is satisfied where voltage Va to voltage Vd are voltages of battery cells 1309 a to d. That is, three consecutive high-voltage cells a to c and one low-voltage cell d are connected in series. In that case, the switching control circuit 1303 determines the three consecutive high-voltage cells a to c as the discharge battery cell group. In addition, the switching control circuit 1303 determines the low-voltage cell D as the charge battery cell group.

Figure 31B:
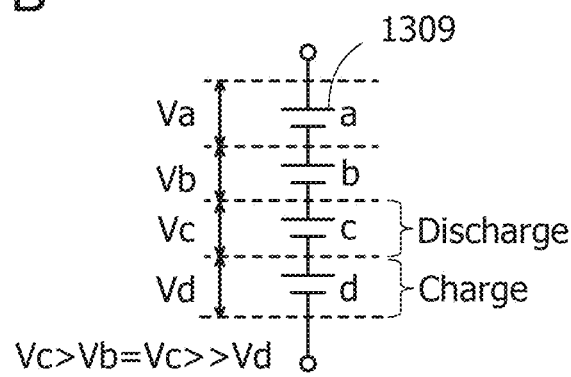

Next, an example in FIG. 31(B) shows the case where the relation Vc>Vb=Va>>Vd is satisfied. That is, two consecutive low-voltage cells a and b, one high-voltage cell c, and one low-voltage cell d which is nearly overdischarged are connected in series. In that case, the switching control circuit 1303 determines the high-voltage cell c as the discharge battery cell group. Since the low-voltage cell d is nearly overdischarged, the switching control circuit 1303 preferentially determines the low-voltage cell d as the charge battery cell group instead of the two consecutive low-voltage cells a and b.

Figure 31C:
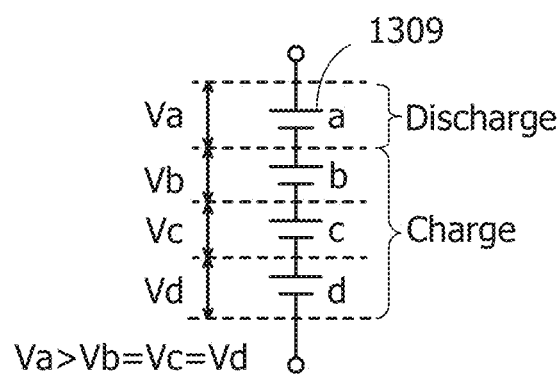

Lastly, an example in FIG. 31(C) shows the case where the relation Va>Vb=Vc=Vd is satisfied. That is, one high-voltage cell a and three consecutive low-voltage cells b to d are connected in series. In that case, the switching control circuit 1303 determines the high-voltage cell a as the discharge battery cell group. In addition, the switching control circuit 1303 determines the three consecutive low-voltage cells b to d as the charge battery cell group.

On the basis of the determination result shown in the examples in FIGS. 31(A) to (C), the switching control circuit 1303 outputs the control signal 51 in which information indicating the discharge battery cell group being the connection destination of the switching circuit 1304 is set and the control signal S2 in which information indicating the charge battery cell group being the connection destination of the switching circuit 1305 to the switching circuit 1304 and the switching circuit 1305, respectively.

The above is the detailed description of the operation of the switching control circuit 1303.

The switching circuit 1304 sets the discharge battery cell group, which is determined by the switching control circuit 1303, as the connection destination of the terminal pair 1301 in response to the control signal 51 output from the switching control circuit 1303.

The terminal pair 1301 includes a pair of terminals A1 and A2. The switching circuit 1304 sets the connection destination of the terminal pair 1301 by connecting one of the terminals A1 and A2 to a positive electrode terminal of the battery cell 1309 positioned on the most upstream side (on the high potential side) of the discharge battery cell group, and the other to a negative electrode terminal of the battery cell 1309 positioned on the most downstream side (on the low potential side) of the discharge battery cell group. Note that the switching circuit 1304 can recognize the position of the discharge battery cell group on the basis of the information which is set in the control signal S1.

The switching circuit 1305 sets the charge battery cell group, which is determined by the switching control circuit 1303, as the connection destination of the terminal pair 1302 in response to the control signal S2 output from the switching control circuit 1303.

The terminal pair 1302 includes a pair of terminals B1 and B2. The switching circuit 1305 sets the connection destination of the terminal pair 1302 by connecting one of the terminals B1 and B2 to a positive electrode terminal of the battery cell 1309 positioned on the most upstream side (on the high potential side) of the charge battery cell group, and the other to a negative electrode terminal of the battery cell 1309 positioned on the most downstream side (on the low potential side) of the charge battery cell group. Note that the switching circuit 1305 can recognize the position of the charge battery cell group on the basis of the information which is set in the control signal S2.

Figure 32:
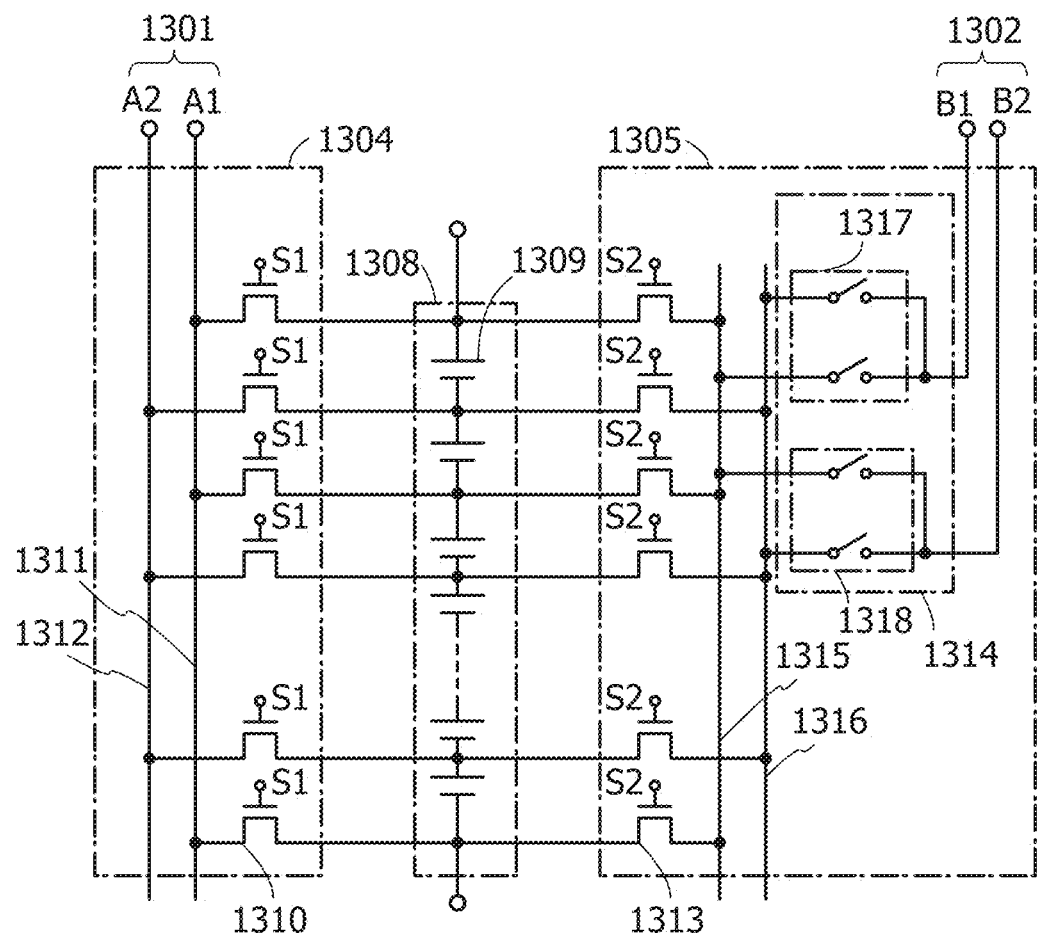
FIG. 32 A circuit diagram illustrating one embodiment of the present invention.
Figure 33:
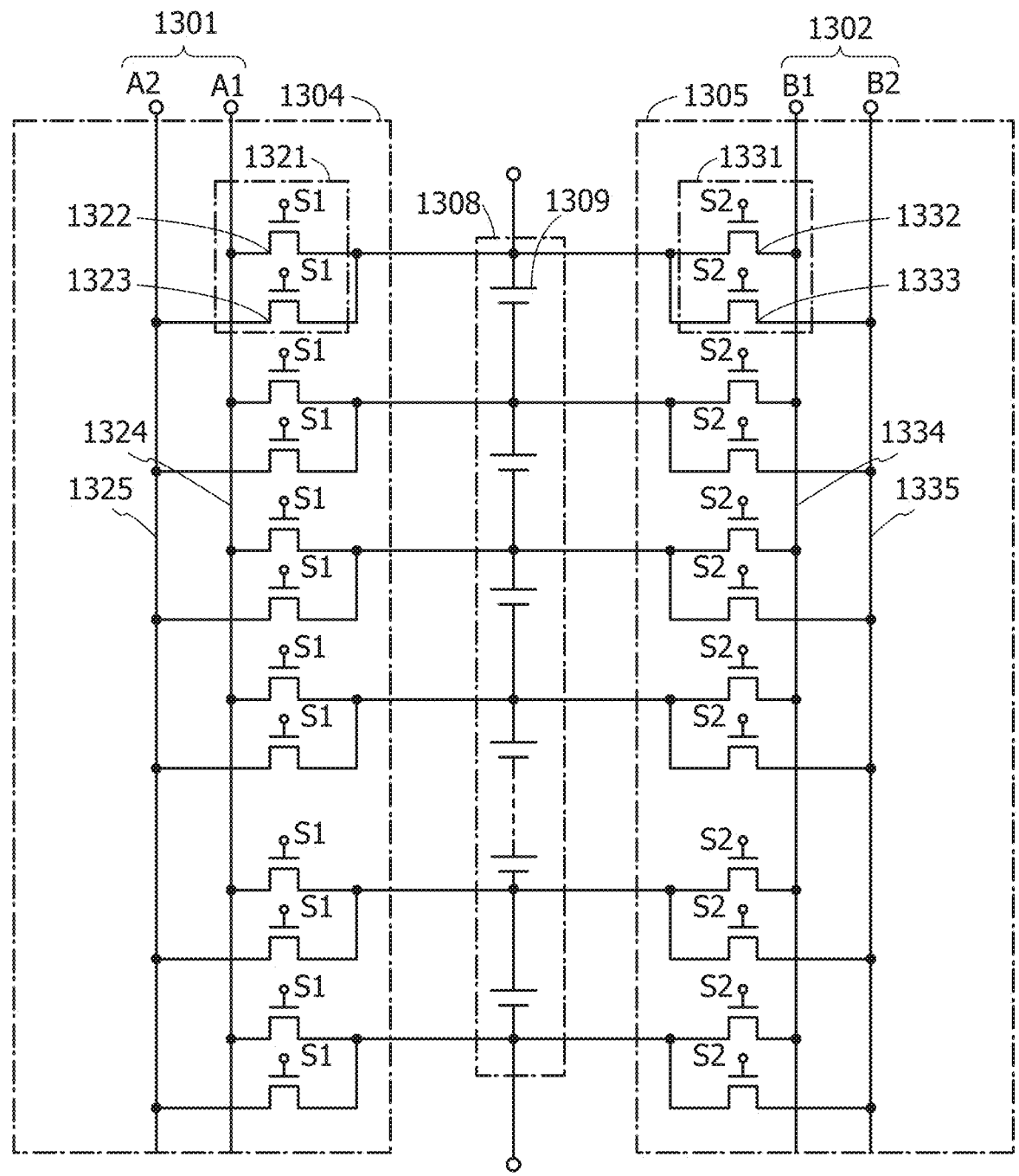
FIG. 33 A circuit diagram illustrating one embodiment of the present invention.

FIG. 32 and FIG. 33 are circuit diagrams showing configuration examples of the switching circuit 1304 and the switching circuit 1305.

In FIG. 32, the switching circuit 1304 includes a plurality of transistors 1310 and buses 1311 and 1312. The bus 1311 is connected to the terminal A1. The bus 1312 is connected to the terminal A2. Either sources or drains of the transistors 1310 are connected alternately to the bus 1311 and the bus 1312. The others of the sources or the drains of the transistors 1310 are each connected between two adjacent battery cells 1309.

Note that the other of the source or the drain of the transistor 1310 on the most upstream side of the transistors 1310 is connected to a positive electrode terminal of the battery cell 1309 on the most upstream side of the battery portion 1308. The other of the source or the drain of the transistor 1310 on the most downstream side of the transistors 1310 is connected to a negative electrode terminal of the battery cell 1309 on the most downstream side of the battery portion 1308.

The switching circuit 1304 connects the discharge battery cell group to the terminal pair 1301 by bringing one of a plurality of transistors 1310 which are connected to the bus 1311 and one of a plurality of transistors 1310 which are connected to the bus 1312 into an on state in response to the control signal S1 supplied to gates of the transistors 1310. Accordingly, the positive electrode terminal of the battery cell 1309 on the most upstream side of the discharge battery cell group is connected to one of the pair of terminals A1 and A2. In addition, the negative electrode terminal of the battery cell 1309 on the most downstream side of the discharge battery cell group is connected to the other of the pair of terminals A1 and A2 i.e., a terminal which is not connected to the positive electrode terminal.

An OS transistor is preferably used as the transistor 1310. Since the off-state current of the OS transistor is low, the amount of electric charge leaking from a battery cell which does not belong to the discharge battery cell group can be reduced, and reduction in capacity over time can be suppressed. In addition, dielectric breakdown in the OS transistor at the time when a high voltage is applied is unlikely to occur. Therefore, the battery cell 1309 and the terminal pair 1301, which are connected to the transistor 1310 in an off state, can be insulated from each other even when an output voltage of the discharge battery cell group is high.

In FIG. 32, the switching circuit 1305 includes a plurality of transistors 1313, a current control switch 1314, a bus 1315, and a bus 1316. The buses 1315 and 1316 are provided between the transistors 1313 and the current control switch 1314. Either sources or drains of the transistors 1313 are connected alternately to the bus 1315 and the bus 1316. The others of the sources or the drains of the transistors 1313 are each connected between two adjacent battery cells 1309.

Note that the other of the source or the drain of the transistor 1313 on the most upstream side of the transistors

1313 is connected to the positive electrode terminal of the battery cell 1309 on the most upstream side of the battery portion 1308. The other of the source or the drain of the transistor 1313 on the most downstream side of the transistors 1313 is connected to the negative electrode terminal of the battery cell 1309 on the most downstream side of the battery portion 1308.

An OS transistor is preferably used as the transistor 1313 like the transistor 1310. Since the off-state current of the OS transistor is low, the amount of electric charge leaking from the battery cell which does not belong to the charge battery cell group can be reduced, and reduction in capacity over time can be suppressed. In addition, dielectric breakdown in the OS transistor at the time when a high voltage is applied is unlikely to occur. Therefore, the battery cell 1309 and the terminal pair 1302, which are connected to the transistor 1313 in an off state, can be insulated from each other even when charging voltage of the charge battery cell group is high.

The current control switch 1314 includes a switch pair 1317 and a switch pair 1318. One end of the switch pair 1317 is connected to the terminal B1. The other end of the switch pair 1317 is connected to different buses, and one switch is connected to the bus 1315 and the other switch is connected to the bus 1316. One end of the switch pair 1318 is connected to the terminal B2. The other end of the switch pair 1318 is connected to different buses, and one switch is connected to the bus 1315 and the other switch is connected to the bus 1316.

OS transistors are preferably used for the switches included in the switch pair 1317 and the switch pair 1318 like the transistors 1310 and the transistors 1313.

The switching circuit 1305 controls the combination of on and off states of the transistors 1313 and the current control switch 1314 in response to the control signal S2 to connect the charge battery cell group and the terminal pair 1302.

The switching circuit 1305 connects the charge battery cell group and the terminal pair 1302 in the following manner, for example.

The switching circuit 1305 brings the transistor 1313 connected to the positive electrode terminal of the battery cell 1309 on the most upstream side of the charge battery cell group into an on state in response to the control signal S2 supplied to gates of the transistors 1313. In addition, the switching circuit 1305 brings the transistor 1313 connected to the negative electrode terminal of the battery cell 1309 on the most downstream side of the charge battery cell group into an on state in response to the control signal S2 supplied to the gates of the transistors 1313.

The polarities of voltages applied to the terminal pair 1302 might vary depending on the structures of the discharge battery cell group and the voltage transformer circuit 1307 connected to the terminal pair 1301. In order to supply current in a direction for charging the charge battery cell group, terminals with the same polarity need to be connected to each other in the terminal pair 1302 and the charge battery cell group. Thus, the current control switch 1314 is controlled by the control signal S2 so that the connection destination of the switch pair 1317 and that of the switch pair 1318 are separately changed depending on the polarities of the voltages applied to the terminal pair 1302.

The state where voltages are applied to the terminal pair 1302 so as to make the terminal B1 a positive electrode and the terminal B2 a negative electrode is described as an example. In the case where the battery cell 1309 on the most downstream side of the battery portion 1308 is in the charge battery cell group, the switch pair 1317 is controlled in response to the control signal S2 so as to be connected to the positive electrode terminal of the battery cell 1309. That is, the switch connected to the bus 1316 in the switch pair 1317 is turned on, and the switch connected to the bus 1315 in the switch pair 1317 is turned off. In contrast, the switch pair 1318 is controlled in response to the control signal S2 so as to be connected to the negative electrode terminal of the battery cell 1309. That is, the switch connected to the bus 1315 in the switch pair 1318 is turned on, and the switch connected to the bus 1316 in the switch pair 1318 is turned off. In this manner, terminals with the same polarity are connected to each other in the terminal pair 1302 and the charge battery cell group. Accordingly, the current which flows from the terminal pair 1302 is controlled so as to be supplied in a direction for charging the charge battery cell group.

Instead of the switching circuit 1305, the switching circuit 1304 may include the current control switch 1314. In that case, the polarities of the voltages applied to the terminal pair 1302 are controlled by controlling the polarities of the voltages applied to the terminal pair 1301 in response to the current control switch 1314 and the control signal S1. Thus, the current control switch 1314 controls the direction of current which flows to the charge battery cell group from the terminal pair 1302.

FIG. 33 is a circuit diagram illustrating structure examples of the switching circuit 1304 and the switching circuit 1305 which are different from those in FIG. 32.

In FIG. 33, the switching circuit 1304 includes a plurality of transistor pairs 1321, a bus 1324, and a bus 1325. The bus 1324 is connected to the terminal A1. The bus 1325 is connected to the terminal A2. One end of each of the transistor pairs 1321 is connected to different buses. A source or a drain of the transistor 1322 is connected to the bus 1324. A source or a drain of the transistor 1323 is connected to the bus 1325. In addition, the other end of each of the transistor pairs is connected between two adjacent battery cells 1309. Note that the other end of the transistor pair 1321 on the most upstream side of the transistor pairs 1321 is connected to a positive electrode terminal of the battery cell 1309 on the most upstream side of the battery portion 1308. The other end of the transistor pair 1321 on the most downstream side of the transistor pairs 1321 is connected to a negative electrode terminal of the battery cell 1309 on the most downstream side of the battery portion 1308.

The switching circuit 1304 switches the connection destination of the transistor pair 1321 to one of the terminal A1 and the terminal A2 by turning on or off the transistor 1322 and the transistor 1323 in response to the control signal S1. Specifically, when the transistor 1322 is turned on, the transistor 1323 is turned off, in which case the connection destination is the terminal A1. In contrast, when the transistor 1323 is turned on, the transistor 1322 is turned off, in which case the connection destination is the terminal A2. Which of the transistors 1322 and 1323 is turned on is determined by the control signal S1.

Two transistor pairs 1321 are used to connect the terminal pair 1301 and the discharge battery cell group. Specifically, the connection destinations of the two transistor pairs 1321 are determined on the basis of the control signal S1, and the discharge battery cell group and the terminal pair 1301 are connected to each other. The connection destinations of the two transistor pairs 1321 are controlled by the control signal S1 so that one of them is the terminal A1 and the other is the terminal A2.

The switching circuit 1305 includes a plurality of transistor pairs 1331 and buses 1334 and 1335. The bus 1334 is connected to the terminal B1. The bus 1335 is connected to the terminal B2. One end of each of the transistor pairs 1331 is connected to different buses. The one end connected through the transistor 1332 is connected to the bus 1334. The one end connected through the transistor 1333 is connected to the bus 1335. The other end of each of the transistor pairs 1331 is connected between two adjacent battery cells 1309. Note that the other end of the transistor pair 1331 on the most upstream side of the transistor pairs 1331 is connected to the positive electrode terminal of the battery cell 1309 on the most upstream side of the battery portion 1308. The other end of the transistor pair 1331 on the most downstream side of the transistor pairs 1331 is connected to the negative electrode terminal of the battery cell 1309 on the most downstream side of the battery portion 1308.

The switching circuit 1305 switches the connection destination of the transistor pair 1331 to one of the terminal B1 and the terminal B2 by turning on or off the transistor 1332 and the transistor 1333 in response to the control signal S2. Specifically, when the transistor 1332 is turned on, the transistor 1333 is turned off, in which case the connection destination is the terminal B1. In contrast, when the transistor 1333 is turned on, the transistor 1332 is turned off, in which case the connection destination is the terminal B2. Which of the transistors 1332 and 1333 is turned on is determined by the control signal S2.

Two transistor pairs 1331 are used to connect the terminal pair 1302 and the charge battery cell group. Specifically, the connection destinations of the two transistor pairs 1331 are determined on the basis of the control signal S2, and the charge battery cell group and the terminal pair 1302 are connected to each other. The connection destinations of the two transistor pairs 1331 are controlled by the control signal S2 so that one of them is the terminal B1 and the other is the terminal B2.

The connection destinations of the two transistor pairs 1331 are determined by the polarities of the voltages applied to the terminal pair 1302. Specifically, in the case where voltages which make the terminal B1 a positive electrode and the terminal B2 a negative electrode are applied to the terminal pair 1302, the transistor pair 1331 on the upstream side is controlled by the control signal S2 so that the transistor 1332 is turned on and the transistor 1333 is turned off. Meanwhile, the transistor pair 1331 on the downstream side is controlled by the control signal S2 so that the transistor 1333 is turned on and the transistor 1332 is turned off. In the case where voltages which make the terminal B1 a negative electrode and the terminal B2 a positive electrode are applied to the terminal pair 1302, the transistor pair 1331 on the upstream side is controlled by the control signal S2 so that the transistor 1333 is turned on and the transistor 1332 is turned off. Meanwhile, the transistor pair 1331 on the downstream side is controlled by the control signal S2 so that the transistor 1332 is turned on and the transistor 1333 is turned off. In this manner, terminals with the same polarity are connected to each other in the terminal pair 1302 and the charge battery cell group. Accordingly, the current which flows from the terminal pair 1302 is controlled to be supplied in a direction for charging the charge battery cell group.

The voltage transformation control circuit 1306 controls operation of the voltage transformer circuit 1307. The voltage transformation control circuit 1306 generates a voltage transformation signal S3 for controlling the operation of the voltage transformer circuit 1307 on the basis of the number of the battery cells 1309 included in the discharge battery cell group and the number of the battery cells 1309 included in the charge battery cell group and outputs it to the voltage transformer circuit 1307.

Note that in the case where the number of battery cells 1309 included in the discharge battery cell group is larger than the number of battery cells 1309 included in the charge battery cell group, it is necessary to prevent application of excessively high charging voltage to the charge battery cell group. Thus, the voltage transformation control circuit 1306 outputs the voltage transformation signal S3 for controlling the voltage transformer circuit 1307 so that a discharging voltage (Vdis) is lowered within a range where the charge battery cell group can be charged.

In the case where the number of the battery cells 1309 included in the discharge battery cell group is less than or equal to the number of the battery cells 1309 included in the charge battery cell group, a charging voltage necessary for charging the charge battery cell group needs to be secured. Therefore, the voltage transformation control circuit 1306 outputs the voltage transformation signal S3 for controlling the voltage transformer circuit 1307 so that the discharging voltage (Vdis) is raised within a range where excessive charging voltage is not applied to the charge battery cell group.

Note that the voltage value of the excessive charging voltage can be determined in the light of product specifications and the like of the battery cell 1309 used in the battery portion 1308. The voltage which is raised or lowered by the voltage transformer circuit 1307 is applied as a charging voltage (Vcha) to the terminal pair 1302.

Figure 34A:
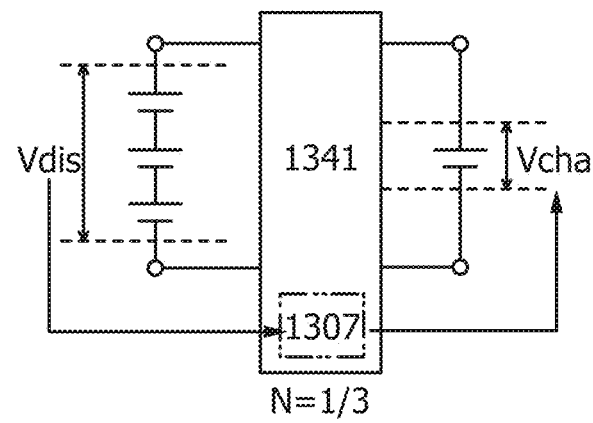
FIGS. 34A-34C Conceptual diagrams illustrating embodiments of the present invention.
Figure 34B:
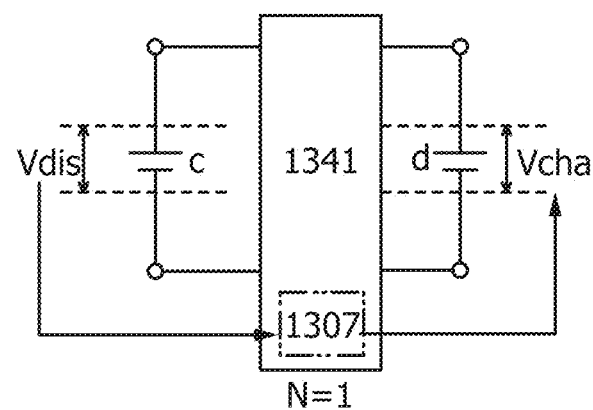
Figure 34C:
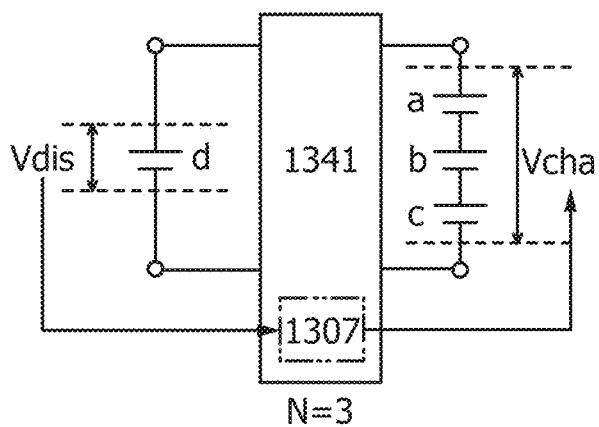

Here, operation examples of the voltage transformation control circuit 1306 in this embodiment are described with reference to FIGS. 34(A) to (C). FIGS. 34(A) to (C) are conceptual diagrams for explaining the operation examples of the voltage transformation control circuit 1306 which correspond to the discharge battery cell group and the charge battery cell group illustrated in FIGS. 31(A) to (C). Note that FIGS. 34(A) to (C) illustrate a battery management unit 1341. The battery management unit 1341 includes, as described above, the terminal pair 1301, the terminal pair 1302, the switching control circuit 1303, the switching circuit 1304, the switching circuit 1305, the voltage transformation control circuit 1306, and the voltage transformer circuit 1307.

In an example illustrated in FIG. 34(A), the three consecutive high-voltage cells a to c and one low-voltage cell d are connected in series as described with reference to FIG. 31(A). In that case, as described using FIG. 31(A), the switching control circuit 1303 determines the high-voltage cells a to c as the discharge battery cell group and the low-voltage cell d as the charge battery cell group. The voltage transformation control circuit 1306 calculates a ratio N for raising or lowering the discharging voltage (Vdis on the basis of the ratio of the number of the battery cells 1309 included in the charge battery cell group to the number of the battery cells 1309 included in the discharge battery cell group.

Note that in the case where the number of battery cells 1309 included in the discharge battery cell group is larger than the number of battery cells 1309 included in the charge battery cell group, when a discharging voltage is applied to the terminal pair 1302 without transforming the voltage, excessive voltage may be applied to the battery cells 1309 included in the charge battery cell group through the terminal pair 1302. Thus, in the case as illustrated in FIG. 34(A), it is necessary that a charging voltage (Vcha) applied to the terminal pair 1302 be lower than the discharging voltage. In addition, in order to charge the charge battery cell group, it is necessary that the charging voltage be higher than the total voltage of the battery cells 1309 included in the charge battery cell group. Thus, the transformation control circuit 1306 sets the discharge battery cell group voltage raising or lowering ratio N higher than the ratio of the number of the battery cells 1309 included in the charge battery cell group to the number of the battery cells 1309 included in the discharge battery cell group.

The voltage transformation control circuit 1306 preferably sets the voltage raising or lowering ratio N higher than the ratio of the number of the battery cells 1309 included in the charge battery cell group to the number of the battery cells 1309 included in the discharge battery cell group by approximately 1 to 10%. At that time, the charging voltage is made higher than the voltage of the charge battery cell group, but actual charging voltage is equal to the voltage of the charge battery cell group. Note that the voltage transformation control circuit 1306 feeds a current for charging the charge battery cell group in accordance with the voltage raising or lowering ratio N in order to make the voltage of the charge battery cell group equal to the charging voltage. The value of the current is set by the voltage transformation control circuit 1306.

Since the number of battery cells 1309 included in the discharge battery cell group is three and the number of battery cells 1309 included in the charge battery cell group is one in the example illustrated in FIG. 34(A), the voltage transformation control circuit 1306 calculates a value which is slightly greater than ⅓ as the voltage raising or lowering ratio N. Then, the voltage transformation control circuit 1306 outputs the voltage transformation signal S3, which lowers the discharging voltage in accordance with the voltage raising or lowering ratio N and converts the voltage into a charging voltage, to the voltage transformer circuit 1307. Then, the voltage transformer circuit 1307 applies the charging voltage which is transformed in response to the voltage transformation signal S3 to the terminal pair 1302. Then, the battery cell 1309 included in the charge battery cell group is charged with the charging voltage applied to the terminal pair 1302.

In each of examples illustrated in FIG. 34(B) and FIG. 34(C), the voltage raising or lowering ratio N is calculated in a manner similar to that of FIG. 34(A). In each of the examples illustrated in FIG. 34(B) and FIG. 34(C), since the number of battery cells 1309 included in the discharge battery cell group is less than or equal to the number of battery cells 1309 included in the charge battery cell group, the voltage raising or lowering ratio N is greater than or equal to 1. Therefore, in this case, the voltage transformation control circuit 1306 outputs the voltage transformation signal S3 for raising the discharging voltage and converting it into the power receiving voltage.

The voltage transformer circuit 1307 converts the discharging voltage applied to the terminal pair 1301 into a charging voltage on the basis of the voltage transformation signal S3. Then, the voltage transformer circuit 1307 applies the converted charging voltage to the terminal pair 1302. Here, the voltage transformer circuit 1307 electrically insulates the terminal pair 1301 and the terminal pair 1302 from each other. Accordingly, the voltage transformer circuit 1307 prevents a short circuit due to a difference between the absolute voltage of the negative electrode terminal of the battery cell 1309 on the most downstream side of the discharge battery cell group and the absolute voltage of the negative electrode terminal of the battery cell 1309 on the most downstream side of the charge battery cell group. Furthermore, the voltage transformer circuit 1307 converts the discharging voltage, which is the total voltage of the discharge battery cell group, into the charging voltage on the basis of the voltage transformation signal S3, as described above.

For example, an insulated DC (Direct Current)-DC converter or the like can be used in the voltage transformer circuit 1307. In that case, the voltage transformation control circuit 1306 outputs a signal for controlling the on/off ratio (duty ratio) of the insulated DC-DC converter as the voltage transformation signal S3 to control the charging voltage converted by the voltage transformer circuit 1307.

Note that examples of the insulated DC-DC converter include a flyback type, a forward type, an RCC (Ringing Choke Converter) type, a push-pull type, a half-bridge type, a full-bridge type, and the like. A suitable type is selected in accordance with the intended output voltage.

Figure 35:
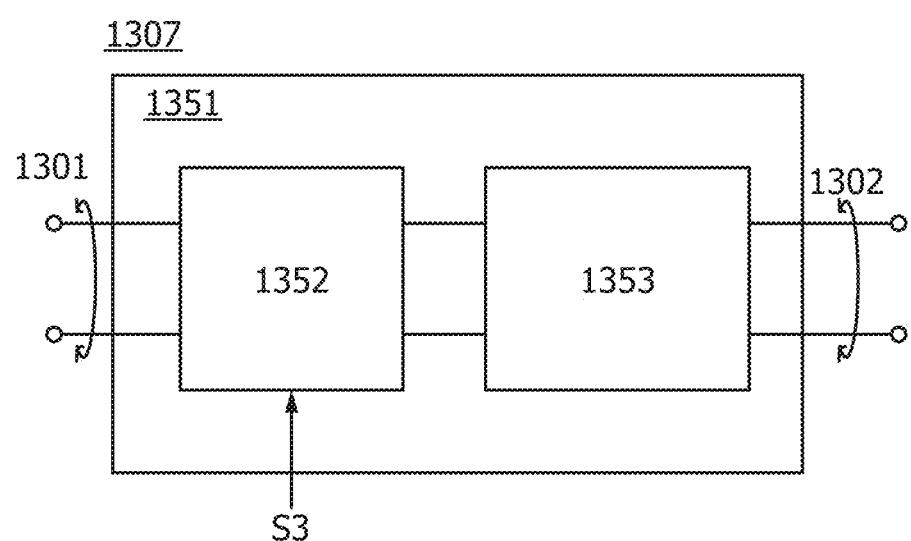
FIG. 35 A block diagram illustrating one embodiment of the present invention.

The structure of the voltage transformer circuit 1307 including the insulated DC-DC converter is illustrated in FIG. 35. An insulated DC-DC converter 1351 includes a switch portion 1352 and a transformer portion 1353. The switch portion 1352 is a switch for switching on/off the operation of the insulated DC-DC converter, and is achieved by using a MOSFET (Metal-Oxide-Semiconductor Field-Effect Transistor), a bipolar transistor, or the like. The switch portion 1352 periodically turns on and off the insulated DC-DC converter 1351 in accordance with the voltage transformation signal S3 which is output from the voltage transformation control circuit 1306 and is for controlling the on/off ratio. Note that the switch portion 1352 can have any of various structures depending on the type of the insulated DC-DC converter which is used. The transformer portion 1353 converts the discharging voltage applied from the terminal pair 1301 into the charging voltage. In detail, the transformer portion 1353 operates in conjunction with the on/off state of the switch portion 1352 and converts the discharging voltage into the charging voltage in accordance with the on/off ratio thereof. The charging voltage is increased as a period during which the switch portion 1352 is on becomes longer in its switching period. Meanwhile, the charging voltage is decreased as a period during which the switch portion 1352 is on becomes shorter in its switching period. Note that in the case of using the insulated DC-DC converter, the terminal pair 1301 and the terminal pair 1302 can be insulated from each other inside the transformer portion 1353.

Figure 36:
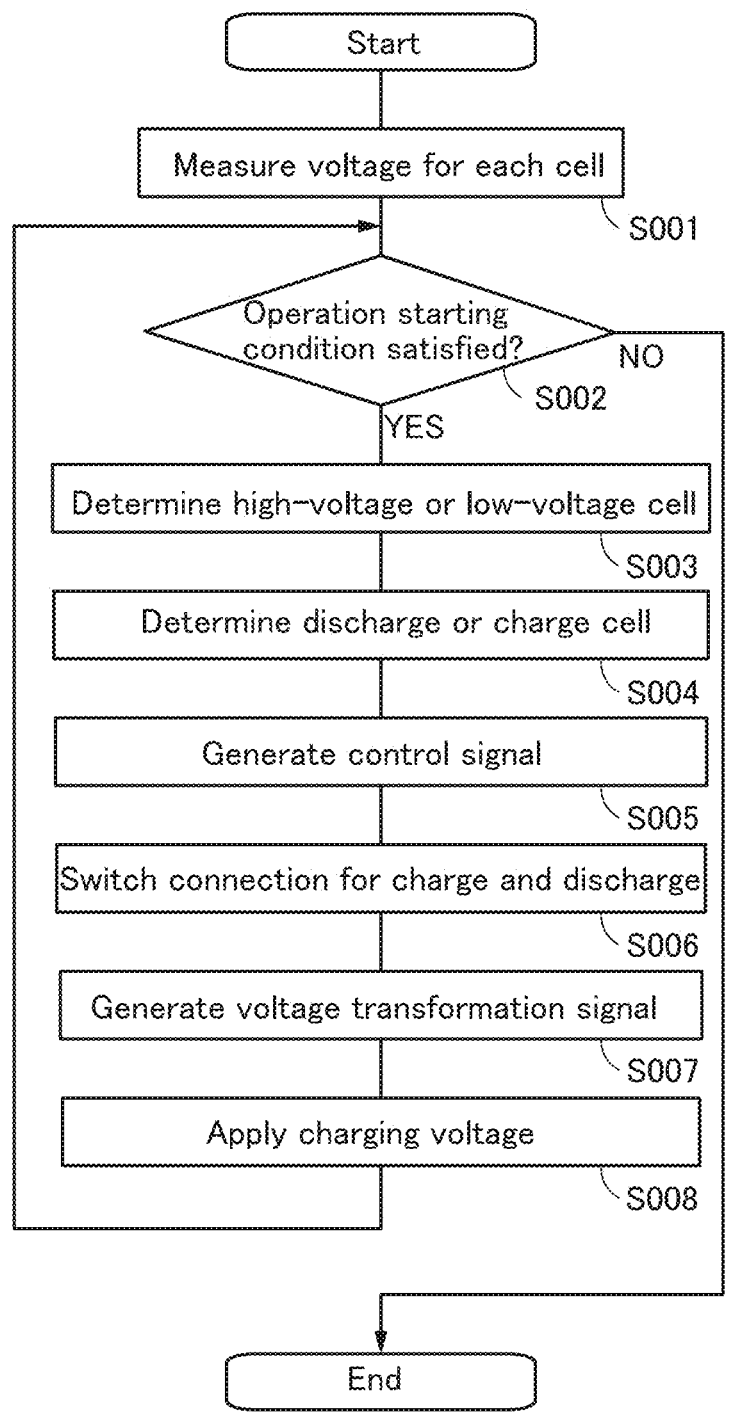
FIG. 36 A flow chart illustrating one embodiment of the present invention.

A procedure of operation of the power storage device 1300 of this embodiment is described with reference to FIG. 36. FIG. 36 is a flow chart illustrating the procedure of operation of the power storage device 1300.

First, the power storage device 1300 obtains voltages measured for the battery cells 1309 (Step S001). Then, the power storage device 1300 determines whether or not the condition for starting the operation of matching voltages of the battery cells 1309 is satisfied (Step S002). An example of the starting condition can be that the difference between the maximum value and the minimum value of the voltages measured for the battery cells 1309 is higher than or equal to the predetermined threshold value. In the case where the starting condition is not satisfied (Step S002: NO), the power storage device 1300 does not perform the subsequent steps because voltages of the battery cells 1309 are well balanced. In contrast, in the case where the starting condition is satisfied (Step S002: YES), the power storage device 1300 performs the operation of matching the voltages of the battery cells 1309. In this operation, the power storage device 1300 determines whether each battery cell 1309 is a high-voltage cell or a low-voltage cell on the basis of the measured voltage of each cell (Step S003). Then, the power storage device 1300 determines a discharge battery cell group and a charge battery cell group on the basis of the determination result (Step S004). In addition, the power storage device 1300 generates the control signal 51 for setting the determined discharge battery cell group as the connection destination of the terminal pair 1301, and the control signal S2 for setting the determined charge battery cell group as the connection determination of the terminal pair 1302 (Step S005). The power storage device 1300 outputs the generated control signal 51 and control signal S2 to the switching circuit 1304 and the switching circuit 1305, respectively. Then, the switching circuit 1304 connects the terminal pair 1301 and the discharge battery cell group to each other, and the switching circuit 1305 connects the terminal pair 1302 and the discharge battery cell group to each other (Step S006). The power storage device 1300 generates the voltage transformation signal S3 on the basis of the number of the battery cells 1309 included in the discharge battery cell group and the number of the battery cells 1309 included in the charge battery cell group (Step S007). Then, the power storage device 1300 converts the discharging voltage applied to the terminal pair 1301 into a charging voltage on the basis of the voltage transformation signal S3 and applies it to the terminal pair 1302 (Step S008). In this manner, an electric charge of the discharge battery cell group is transferred to the charge battery cell group.

Although a plurality of steps are shown in order in the flow chart of FIG. 36, the execution order of the steps is not limited to the shown order.

With this embodiment, unlike in a capacitor type, a structure for temporarily storing an electric charge from the discharge battery cell group and then releasing it to the charge battery cell group is unnecessary to transfer an electric charge from the discharge battery cell group to the charge battery cell group. Accordingly, the charge transfer efficiency per unit time can be increased. In addition, the switching circuit 1304 and the switching circuit 1305 switch the discharge battery cell group and the charge battery cell group separately.

Furthermore, the voltage transformer circuit 1307 converts the discharging voltage applied to the terminal pair 1301 into the charging voltage on the basis of the number of the battery cells 1309 included in the discharge battery cell group and the number of the battery cells 1309 included in the charge battery cell group, and applies it to the terminal pair 1302. Thus, even when any battery cell 1309 is selected as the discharge battery cell group and the charge battery cell group, an electric charge can be transferred without any problems.

Furthermore, the use of OS transistors as the transistor 1310 and the transistor 1313 can reduce the amount of electric charge leaking from the battery cell 1309 which does not belong to the charge battery cell group or the discharge battery cell group. Accordingly, a decrease in capacity of the battery cell 1309 which does not contribute to charging or discharging can be suppressed. In addition, the variation in characteristics of the OS transistor due to heat is smaller than that of a Si transistor. Accordingly, an operation such as turning them on or off in response to the control signals S1 and S2 can be performed normally even when the temperature of the battery cells 1309 is increased.

Example 1

One embodiment of the present invention is specifically described below with an example. This example shows results of fabrication of a positive electrode by the method described in Embodiment 2. Note that the present invention is not limited only to the example below.

A lithium-manganese complex oxide was synthesized as a positive electrode active material. $Li_2CO_3$, $MnCO_3$, and NiO were used as starting materials and each weighed so that Li:Mn:Ni=1.68:0.8062:0.318 (molar ratio) was satisfied.

Next, ethanol was added to the NiO powder, and after that, grinding was performed in a ball mill at a peripheral speed of 12 m/sec for a grinding time of 0.5 hours. Then, the weighed $Li_2CO_3$, $MnCO_3$, and NiO were mixed, and grinding was performed at a peripheral speed of 10 m/sec for a grinding time of 0.5 hours.

Next, the ethanol in the mixed material was volatilized, and after that, it was put into a crucible to synthesize a material. Here, firing was performed under conditions at 1000° C. for 10 hours. The firing atmosphere was air, and the gas flow rate was 10 L/min.

Subsequently, crushing treatment was performed to separate the sintered fired particles. The crushing treatment was performed in a ball mill at a peripheral speed of 12 m/sec and the crushing treatment for 10 hours after ethanol was added.

After the crushing treatment, heating was performed to volatilize the ethanol, so that a lithium-manganese complex oxide containing nickel was obtained. This was a first mixture.

In addition, graphene oxide (GO) which is a conductive additive was further mixed with the first mixture to coat particles of the lithium-manganese complex oxide containing nickel. The mixing was performed so that the ratio of GO to the lithium-manganese complex oxide containing nickel was 2 weight %, under conditions at a mixing rotational speed of 80 rpm for a mixing time of 30 minutes twice. Drying was performed under conditions at 70° C. for 12 hours after the mixing. This was a second mixture.

Then, for reduction treatment on GO, L-ascorbic acid which was dissolved in a small amount of water was added to and mixed with the second mixture, and heating was performed at 60° C., so that the graphene oxide was reduced. This was a third mixture.

The first mixture was mixed with water at a weight ratio of 1:10 for measurement of the hydrogen-ion concentration of the first mixture. This was an aqueous solution A.

The second mixture was mixed with water at a weight ratio of 1:10 for measurement of the hydrogen-ion concentration of the second mixture. This was an aqueous solution B.

The third mixture was mixed with water at a weight ratio of 1:10 for measurement of the hydrogen-ion concentration of the third mixture. This was an aqueous solution C.

The relationship between the hydrogen-ion concentration of the aqueous solutions A, B, and C and the fluidity of slurries fabricated by addition of acetylene black (AB) as a conductive additive at 5 weight % and PVdF as a binder at 5 weight % to the first mixture, the second mixture, and the third mixture is shown in Table 1. In Table 1, "NG" means that gelation easily occurs when the binder is added, and "OK" means that gelation hardly occurs. The aqueous solution A had a high pH of 11.6 and a pH at which gelation occurs was observed when PVdF which is weak against basicity was used as a binder. In contrast, the aqueous solutions B and C had a pH of less than or equal to 11 and had a pH at which gelation of PVdF hardly occurs.

TABLE 1

| | Hydrogen-ion concentration (pH) | Fluidity of slurry |
|---|---|---|
| First mixture | 11.6 | NG |
| Second mixture | 11 | OK |
| Third mixture | 10.8 | OK |

Lastly, an electrode was fabricated using the obtained third mixture. The third mixture was used as an active material, acetylene black (AB) was used as a conductive additive, and PVdF was used as a binder. First, PVdF and AB were mixed with NMP (N-methyl-2-pyrrolidone) which was a polar solvent. The mixing rotational speed was 2000 rpm, and the mixing time was 5 minutes each. Furthermore, the sample C was added as an active material and mixed. The mixing rotational speed was 2000 rpm, the mixing time was 5 minutes each, and this was repeated five times. Moreover, NMP was added and mixed. The mixing rotational speed was 2000 rpm, the mixing time was 10 minutes each, and this was repeated twice. Through the above steps, a slurry electrode mixture composition was obtained. The compounding weight ratio in the electrode mixture composition was the third mixture:AB:PVdF=90:5:5.

The basicity was reduced by mixing graphene oxide with the first mixture. As a result, it was confirmed that the fluidity of the slurry was improved without a neutralization step.

Example 2

In this example, an electrode was fabricated using the slurry fabricated in Example 1, and a half cell was fabricated.

The electrode mixture composition was applied to aluminum foil which was a current collector. Note that a surface of the aluminum foil was covered with an undercoat in advance. After that, drying was performed at 80° C. for 30 minutes in a circulation drying furnace.

Then, the electrode was pressed with a roller press machine. This was performed while the press pressure was adjusted so that the thickness after application of the electrode was reduced by 20%. The press temperature was 120° C.

After that, another heat treatment was performed. The treatment was performed in a reduced pressure atmosphere (1 kPa) at 270° C. for 10 hours as heat treatment conditions. Through the above process, an electrode X including the "particles containing the lithium-manganese composite oxide" of one embodiment of the present invention was obtained.

Next, a half cell was fabricated using the obtained electrode X. For the cell, a coin cell was used. Lithium was used for a counter electrode of the half cell. As an electrolytic solution, a mixed solution in which $LiPF_6$ was used as an electrolyte and EC and DEC, which are aprotic organic solvents, were mixed at a volume ratio of 1:1 was used. As the separator, polypropylene (PP) was used.

Figure 37A:
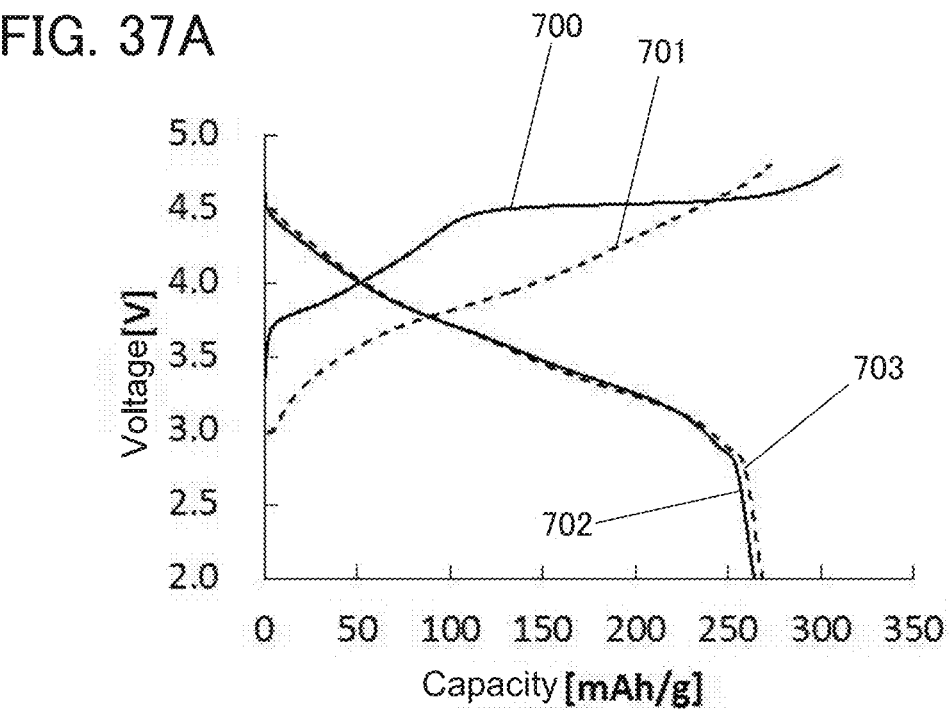
FIGS. 37A-37B Diagrams illustrating charge and discharge characteristics and cycle characteristics in Example 2.
Figure 37B:
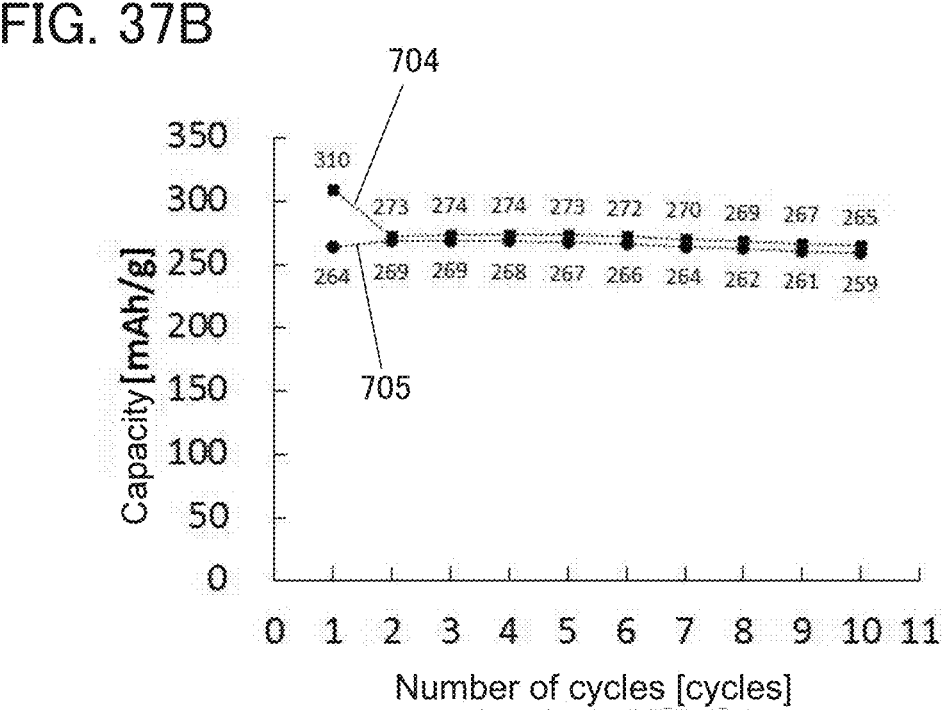

Then, the fabricated half cell was subjected to measurement of charge and discharge characteristics at 25° C. Charging was performed with a constant current of 30 mA/g with the upper voltage limit set to 4.8 V, and discharging was performed with a constant current of 30 mA/g with the lower voltage limit set to 2 V. The obtained charge and discharge curves are shown in FIG. 37(A), and the cycle characteristics are shown in FIG. 37(B). In FIG. 37, 700 indicates charge characteristics in the first cycle; 701, charge characteristics in the second cycle; 702, discharge characteristics in the first cycle; 703, discharge characteristics in the second cycle; 704, cycle characteristics of charge capacity; and 705, cycle characteristics of discharge capacity. With the use of the particles containing the lithium-manganese complex oxide of one embodiment of the present invention, a high discharge capacity over 260 mAh/g and high cycle characteristics that enable 98% of the initial discharge capacity to be maintained even after 10 cycles were obtained.

EXPLANATION OF REFERENCE NUMERALS

SW1 switch
SW2 switch
SW3 switch
S1 control signal
S2 control signal
S3 voltage transformation signal
A1 terminal
A2 terminal
B1 terminal
B2 terminal
100a storage battery
100b storage battery
103 separator
103a region
103b region
107 exterior body
111 positive electrode
111a positive electrode
115 negative electrode
115a negative electrode
120 sealing layer
121 positive electrode lead
125 negative electrode lead
130 electrode assembly
131 electrode assembly
200 electrode
201 current collector
202 active material layer
203 active material layer
204 graphene
300 storage battery
301 positive electrode can
302 negative electrode can
303 gasket
304 positive electrode
305 positive electrode current collector
306 positive electrode active material layer
307 negative electrode
308 negative electrode current collector
309 negative electrode active material layer
310 separator
500 storage battery
501 positive electrode current collector
502 positive electrode active material layer
503 positive electrode
504 negative electrode current collector
505 negative electrode active material layer
506 negative electrode
507 separator
508 electrolytic solution
509 exterior body
510 positive electrode lead electrode
511 negative electrode lead electrode
512 welding region
513 bent portion 514 sealing portion
600 storage battery
601 positive electrode cap
602 battery can
603 positive electrode terminal
604 positive electrode
605 separator
606 negative electrode
607 negative electrode terminal
608 insulating plate
609 insulating plate
610 gasket
611 PTC element
612 safety valve mechanism
700 charge characteristic in the first cycle
701 charge characteristic in the second cycle
702 discharge characteristic in the first cycle
703 discharge characteristic in the second cycle
704 cycle characteristics of charge capacity
705 cycle characteristics of discharge capacity
900 circuit board
910 label
911 terminal
912 circuit
913 storage battery
914 antenna
915 antenna
916 layer
917 layer
918 antenna
919 terminal
920 display device
921 sensor
922 terminal
951 terminal
952 terminal
1300 power storage device
1301 terminal pair
1302 terminal pair
1303 switching control circuit
1304 switching circuit
1305 switching circuit
1306 voltage transformation control circuit
1307 voltage transformer circuit
1308 battery portion
1309 battery cell
1310 transistor
1311 bus
1312 bus
1313 transistor
1314 current control switch
1315 bus
1316 bus
1317 switch pair
1318 switch pair
1321 transistor pair
1322 transistor
1323 transistor
1324 bus
1325 bus
1331 transistor pair
1332 transistor
1333 transistor
1334 bus
1335 bus
1341 battery management unit
1351 insulated DC-DC converter
1352 switch portion
1353 transformer portion
1700 curved surface
1701 plane
1702 curve
1703 radius of curvature
1704 center of curvature
1800 center of curvature
1801 film
1802 radius of curvature
1803 film
1804 radius of curvature
7100 portable display device
7101 housing
7102 display portion
7103 operation button
7104 power storage device
7200 portable information terminal
7201 housing
7202 display portion
7203 band
7204 buckle
7205 operation button
7206 input output terminal
7207 icon
7300 display device
7304 display portion
7400 mobile phone
7401 housing
7402 display portion
7403 operation button
7404 external connection port
7405 speaker
7406 microphone
7407 power storage device
7408 lead electrode
7409 current collector
8000 display device
8001 housing
8002 display portion
8003 speaker portion
8004 power storage device
8021 charging apparatus
8022 cable
8100 lighting device
8101 housing
8102 light source
8103 power storage device
8104 ceiling
8105 wall
8106 floor
8107 window
8200 indoor unit
8201 housing
8202 air outlet
8203 power storage device
8204 outdoor unit
8300 electric refrigerator-freezer
8301 housing
8302 refrigerator door
8303 freezer door
8304 power storage device
8400 automobile
8401 headlight
8500 automobile
9600 tablet terminal
9625 switch 9626 switch
9627 power switch
9628 operation switch
9629 fastener
9630 housing
9630a housing
9630b housing
9631 display portion
9631a display portion
9631b display portion
9632a region
9632b region
9633 solar cell
9634 charge and discharge control circuit
9635 power storage unit
9636 DCDC converter
9637 converter
9638 operation key
9639 button
9640 movable portion

The invention claimed is:

1. A method for manufacturing an active material, comprising:
    forming a first mixture comprising a lithium-manganese complex oxide coated with graphene oxide by adding the lithium-manganese complex oxide to an aqueous solution of the graphene oxide;
    performing a reduction treatment on the graphene oxide by a heat treatment to the first mixture; and
    drying after the reduction treatment.

2. The method for manufacturing the active material according to claim 1, wherein a concentration of the graphene oxide in the aqueous solution is higher than or equal to 0.5 wt % and lower than or equal to 5 wt %.

3. The method for manufacturing the active material according to claim 1, wherein the lithium-manganese complex oxide exhibits basicity.

4. The method for manufacturing the active material according to claim 1, wherein the aqueous solution of the graphene oxide exhibits acidity.

5. The method for manufacturing the active material according to claim 1, wherein the drying step is performed at a temperature higher than or equal to 50° C. and lower than 500° C.

6. A method for manufacturing an active material, comprising:
    forming a first mixture comprising a lithium-manganese complex oxide coated with graphene oxide by adding the lithium-manganese complex oxide to an aqueous solution of the graphene oxide;
    performing a reduction treatment on the graphene oxide by reacting the first mixture in a solvent comprising a reducing agent; and
    drying after the reduction treatment.

7. The method for manufacturing the active material according to claim 6, wherein a concentration of the graphene oxide in the aqueous solution is higher than or equal to 0.5 wt % and lower than or equal to 5 wt %.

8. The method for manufacturing the active material according to claim 6, wherein the lithium-manganese complex oxide exhibits basicity.

9. The method for manufacturing the active material according to claim 7, wherein the aqueous solution of the graphene oxide exhibits acidity.

10. The method for manufacturing the active material according to claim 7, wherein the drying step is performed at a temperature higher than or equal to 50° C. and lower than 500° C.

* * * * *